US006347086B1

(12) United States Patent
Strachan

(10) Patent No.: US 6,347,086 B1
(45) Date of Patent: Feb. 12, 2002

(54) PICK POOLS SYSTEM AND METHOD USING PACKET-SWITCHED NETWORK

(76) Inventor: Richard B. Strachan, 10225 Kensington Pkwy., Apt. 204, Kensington, MD (US) 20895

(*) Notice: Subject to any disclaimer, the term of this patent is extended or adjusted under 35 U.S.C. 154(b) by 0 days.

(21) Appl. No.: 09/148,162

(22) Filed: Sep. 4, 1998

(51) Int. Cl.[7] ............................ H04L 12/28; A63F 9/24
(52) U.S. Cl. ......................................... 370/389; 463/16
(58) Field of Search ............................. 463/16, 40, 42; 370/352, 389, 395

(56) References Cited

U.S. PATENT DOCUMENTS 5,957,775 A * 9/1999 Cherry ........................ 463/16
6,092,806 A * 7/2000 Follis .......................... 463/16
6,104,815 A * 8/2000 Alcorn et al. ................. 463/16
6,120,376 A * 9/2000 Cherry ........................ 463/16
6,210,277 B1 * 4/2001 Stefan ........................ 463/16

* cited by examiner

*Primary Examiner*—Salvatore Cangialosi
(74) *Attorney, Agent, or Firm*—Nixon & Vanderhye P.C.

(57) ABSTRACT

Pick pools on sports events may be created via a server which is accessible by a plurality of different users over a packet-switched digital data network. Pools allow a number of users in a particular pool to compete against one another, with "winners" being those who make the most correct selections regarding a predetermined number of sporting events. An improved system and method for implementing such pools is provided.

8 Claims, 9 Drawing Sheets

Pick Pools Flow Chart

```
PPPPPP proofoot-form.hmx

<HTML>
<HEAD>
<BASE HREF="http://www.insideodds.com/members/">
<!-- BASE HREF="http://localhost/" -->
<META NAME="keywords" CONTENT="Sports, Football, NCAA, NFL, Basketball, NBA,
Odds, Spreads, Line, Picks, Scores, Statistics, Win, Loss">
<TITLE>Inside Odds - Members Only - Pick Pools '97</TITLE>
</HEAD>

<BODY BACKGROUND="back.gif" TEXT=#000000 BGCOLOR=#FFFFFF LINK=#0000FF
VLINK=#0000FF ALINK=#FF0000>

<!-- Inside Odds Home Page Revision 3 -->
<!-- Author: Bret Strachan -->
<!-- Web Design: Andrew Ventura/Bret Strachan -->
<!-- Programming: Dave Anderson -->

%gset(inc, D:/CBuilder/htdocs/odds/timing.inc)
%expand(%include(%inc%))
%setDT()
%if(%equal(%form(records), %null%),
  %gset(records, 0),  %gset(records, %form(records))
)
%define(showform,
  %gset(teamlist, %null%)
  %set(sqlstmt2, "SELECT * FROM ProfootLine ORDER BY GameID")
  %set(async-sql, T)
  %try(
    %sql(SportsTicker, %sqlstmt2%,
      %gset(spread, %null%)
      %if(%equal(%left(%column(Spread), 1), -),
        %gset(spread, %gettoken(%column(Spread), "-", 0))
        %gset(homespread, -%spread%)      %gset(awayspread, +%spread%)
      ,
        %gset(spread, %column(Spread))
        %gset(homespread, +%spread%)      %gset(awayspread, -%spread%)
      )
      %if(%equal(%column(OverUnder), 200.0), %gset(OvUn, 0.0), %gset(OvUn,
%column(OverUnder)))
      %checkone()
      %if(%equal(%show%, "YES"),
        %gset(teamlist, %teamlist%<OPTION
VALUE=\"%column(GameID)#%column(HomeID)#%column(HomeName)#%homespread%#%OvUn%\">
%column(GameID):%column(HomeName):%homespread%:%OvUn%%cr%)
        %gset(teamlist, %teamlist%<OPTION
VALUE=\"%column(GameID)#%column(AwayID)#%column(AwayName)#%awayspread%#%OvUn%\">
%column(GameID):%column(AwayName):%awayspread%:%OvUn%%cr%)
      )
    )

    <FORM METHOD=GET ACTION="profoot-verify.hmx">
    <INPUT TYPE=HIDDEN NAME="system" VALUE="InsideOdds">
    <INPUT TYPE=HIDDEN NAME="process" VALUE="CHECK">
    <INPUT TYPE=HIDDEN NAME="userinfo" VALUE=\"%client-authname%#%pickpool%\">
    <INPUT TYPE=HIDDEN NAME="records" VALUE=\"%records%\">
```

Pick Pools Flow Chart

HOME PAGE

REVIEW PICK
- 3 options
- choose "Make Another Pick"

END PAGE
- all picks were succesfully submitted to the system

PICK POOLS SYSTEM AND METHOD USING PACKET-SWITCHED NETWORK

This invention relates to a system and method for implementing sports pools on a packet-switched network such as the internet. More particularly, this invention relates to a system and method for providing users/players with the ability to form sports pick pools for non-monetary gambling simulation and/or entertainment via the internet.

BACKGROUND OF THE INVENTION

Gambling on sports has been known for years. For example, many casinos and other facilities in Las Vegas, Nev., take bets on football games, basketball games, baseball games, hockey games, and the like. In modern years, "fantasy football" leagues have also been set up, where each participants picks select players, with the winner being determined as a function of which participant's players perform best in a given season.

However, there are fundamental problems with the two aforesaid sports gambling/entertainment systems. First, gambling is restricted to certain geographical areas of the country, such as the State of Nevada. Additionally, gambling may be addictive and is not desired by all sports fans. With regard to fantasy football leagues, Nevada-style sports gambling is not simulated by them, they are burdensome and time consuming to put together, and often suffer due to their fragmented design.

In view of the above, there exists a need in the art to create a system and/or method for enabling users to set up or join sports pick pools via a packet-switched data network such as the internet. This will enable users to enjoy a fun and legal alternative to sports gambling, while still realizing the entertainment value of given sports.

This invention will now be described with respect to certain embodiments thereof, accompanied by certain illustrations.

SUMMARY OF THE INVENTION

Generally speaking, this invention fulfills the above described needs in the art by providing a method of setting up pools and wagering points on sporting events, the method comprising the steps of:

providing at least one server;

providing an asynchronous packet switched digital data network, the digital data network being in communication with the server;

utilizing a plurality of computers which are in communication with the packet switched digital data network;

associating each of the plurality of computers with a user;

a user accessing the server via the asynchronous packet switched digital data network, via the user's computer;

the server assigning the user to a given pool so that the pool includes a plurality of users designated as being associated therewith;

the server causing a pick screen to be displayed to the user on a display of the user's computer;

the pick screen enabling the user to browse through a plurality of different sporting events and review odds and over/under lines on the different sporting events;

the user utilizing the pick screen in picking a sporting event and wager a number of points on the sporting event by way of at least one of a straight pick, a tease pick, a parlay pick and a reverse pick (in certain embodiments, each of these four types of picks may include up to three different options—over, under, and/or spread);

the user submitting the pick made in said picking step to the server;

the server causing the results of the pick to be displayed to the user via the packet switched digital data network at a point in time after the sporting event of said picking step has been completed; and the server causing results of picks made by other users in the pool to be displayed to the user via the packet switched digital data network at a point in time after the sporting event of said picking step has been completed.

This invention will now be described with respect to certain embodiments thereof, along with reference to the accompanying illustrations.

IN THE DRAWINGS

FIG. 1 is a block diagram of an embodiment of this invention.

DETAILED DESCRIPTION OF CERTAIN EMBODIMENTS OF THIS INVENTION

Figure 2:
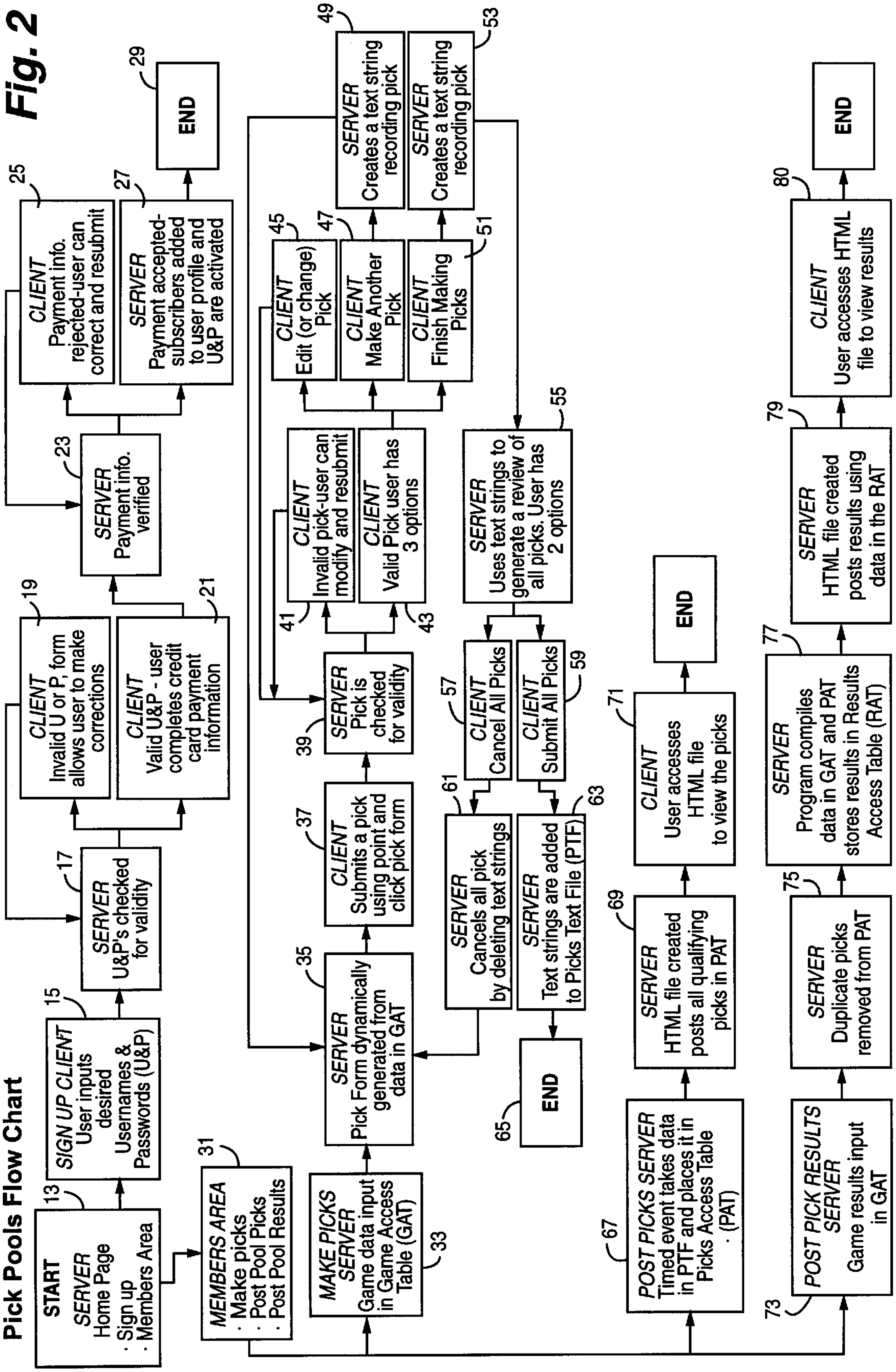
FIG. 2 is a flow chart illustrating how a particular embodiment of this invention is implemented.

Referring now more particularly to the accompanying drawings in which like reference numerals indicate like parts throughout the several figures/views.

Certain embodiments of this pick pool invention were designed to create a fun and legal alternative to "Las Vegas style" sports gambling. The concept of a pick pool is to use a data network (e.g. digital packet-switched data network such as the internet) to provide users with a non-monetary and/or intangible entertainment value of sports gambling. By placing users in "pools," the participants' or users' entertainment experience is enhanced through the spirit of competition with other users in the same pool.

A system and corresponding method utilizing a packet-switched digital data network allows users to make point wagers on football games (or other sports games such as basketball games) that are similar or identical in nature (except for no money is bet) to money wagers which may be made in Nevada sports gambling industries. Points won or lost in a pick pool serve only as a means of measuring the performance of participants or users within a particular pool. For example, at the end of a week, or at the end of a football season, the participants in a given pool may see who "won" by seeing who had the most points accumulated.

Many different pools may be formed, with each pool including a plurality of different participants or users. Participants determine who is performing the best or worst (i.e. winning or losing) in a given pool by the number of points accumulated by a particular participant at the end of the week, season, or other predetermined period of time.

With regard to internet embodiments of this invention, users or participants may sign up to be part of a particular sports pick pool as follows. A particular user may sign up as part of a large group (e.g. eight or more people) which places the user in a private pool along with friends and associates, or alternatively the user may sign up as an individual or in a small group (from one to seven people) and be randomly placed in a pool with other individuals or small groups. Whether a user signs up as part of a large predetermined group, or individually or as part of a small group, only one person (i.e. the group leader) has to complete the sign-up process for a group of users. This is efficient. The sign-up process in particular embodiments is as follows: first, the user logs onto the internet and travels or proceeds to a particular website (e.g. www.insideodds.com). The user then clicks on the "sign-up" button or icon (e.g. see FIG. 3, reference numeral 83). The user (i.e. group leader) fills in the desired user names and passwords for each person in the group for which the leader is signing up. The user then fills-in the background information for the "group leader," including the leader's name, address, e-mail, credit card number, etc. The group leader is responsible for paying the fee for the service in certain embodiments. Finally, the group leader completes a payment or credit card form to complete the signing-up process for either the group leader as an individual or for a group which he/she is representing.

According to certain embodiments of this invention, once payment has been received for a particular group, that group's user name(s) and password(s) will be activated by a server. To use the service, the user goes to the applicable website and clicks on the "members only" button or icon (e.g. see FIG. 3, reference numeral 81) and enters his/her user name and password. Once in the "members" area of the website, a user will have three basic options: (i) make at least one pick(s) for the week, (ii) view picks made your pool, or (iii) view the results of your pool.

Figure 4:
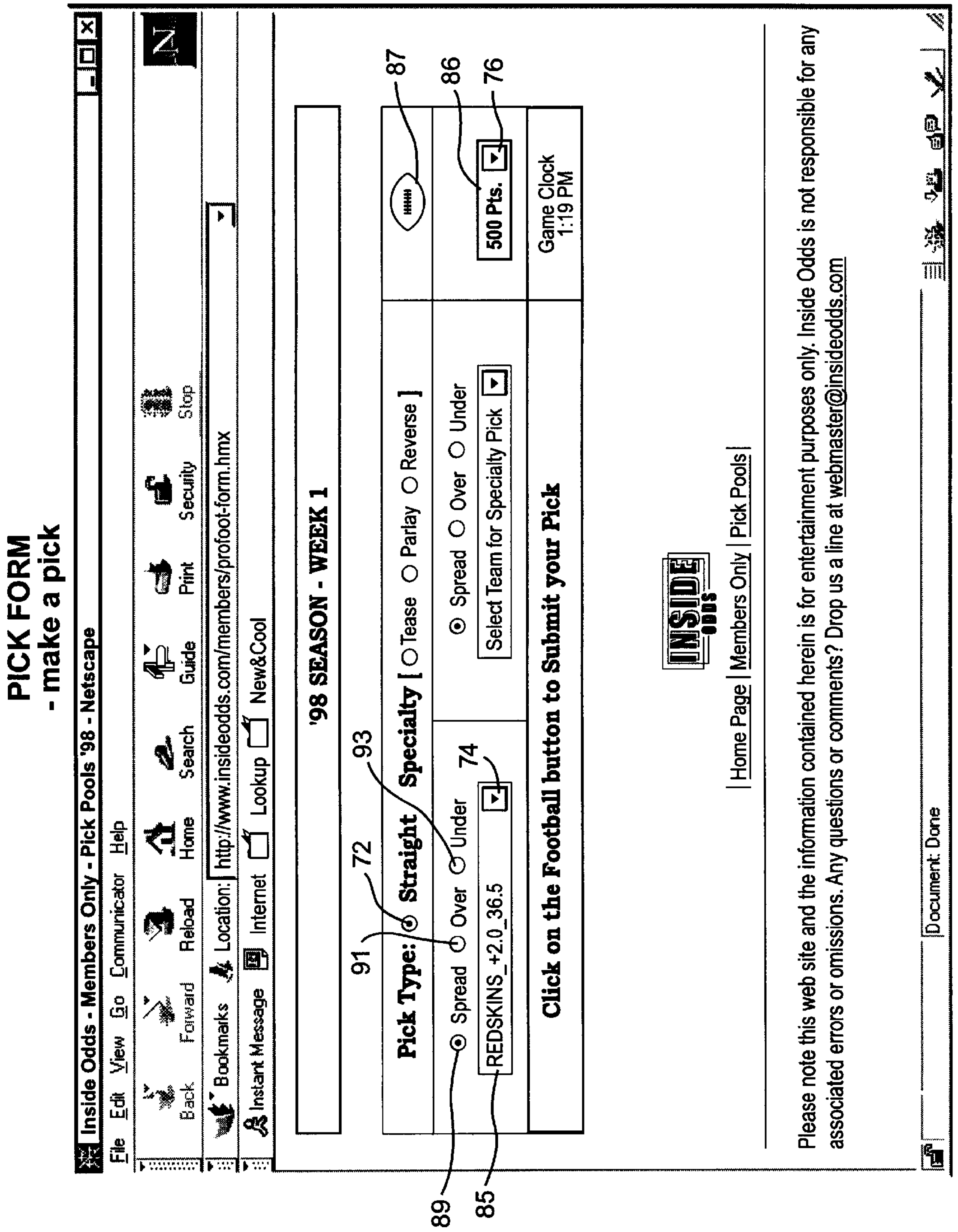
FIG. 4 is an exemplary "pick form" screen shown to the user via the user's display screen according to an embodiment of this invention.
Figure 5:
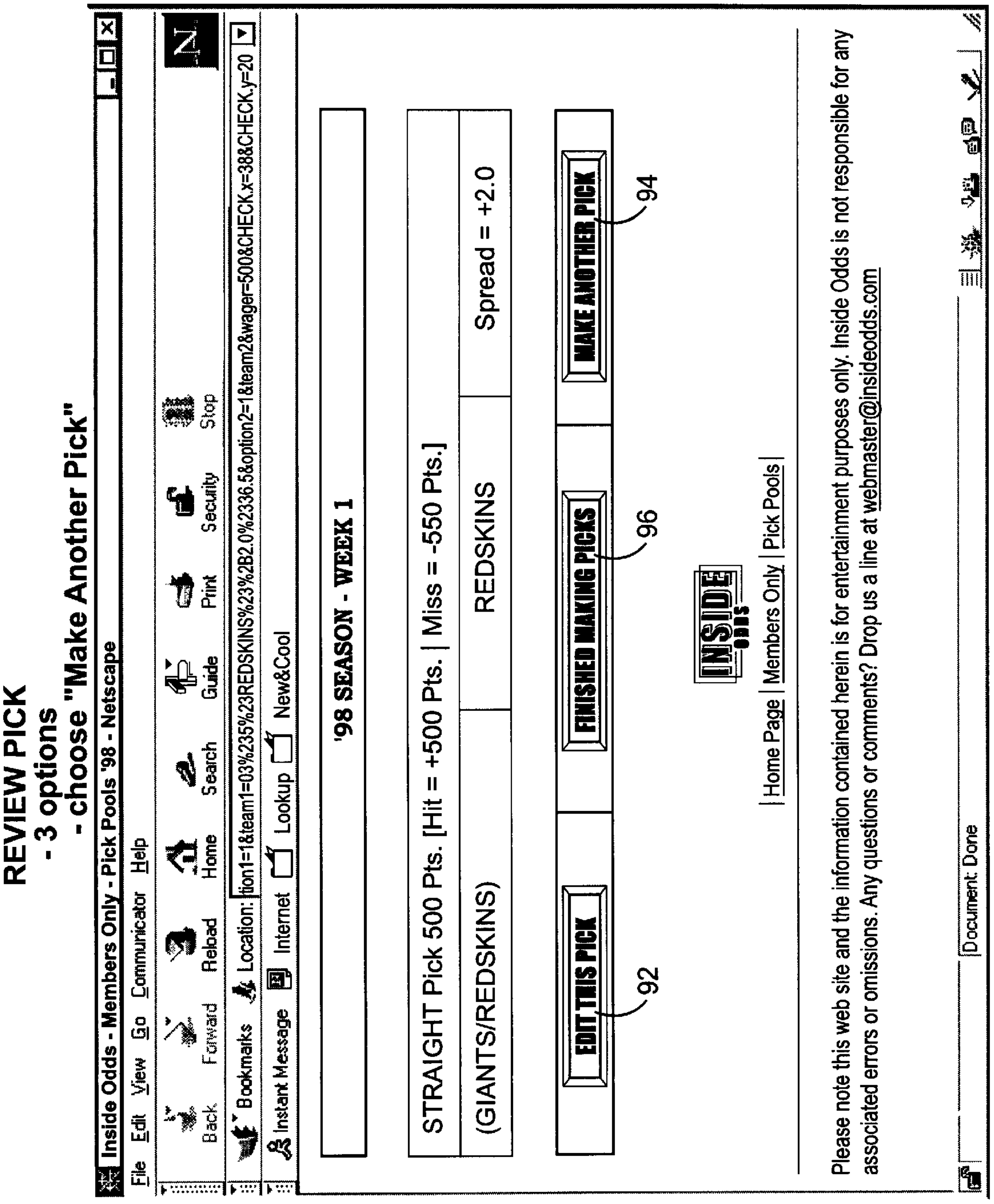
FIG. 5 is an exemplary review pick form screen shown to the user, to allow the user to review his/her pick made in the FIG. 4 screen and potentially make another pick, according to an embodiment of this invention.

In the first option (i.e. make picks for this week), the user follows a link at the website to reach the "pick form" [see FIG. 4] which is a combination of drop down boxes (e.g. 85 in FIG. 4) and toggle options that allows the user to make picks on pro or college football (or other sports such as basketball) games. The types of picks available to users are identical or similar to the types of monetary wages typically in sports gambling, i.e. spreads, overs, unders, teases, parlays, and reverses. In addition to making a pick the user must associate a point wager (e.g. see box 86 in FIG. 4 where the user inputs the points wager) with the pick. In football embodiments, each weekly NFL and NCAA match-up is captured on the "pick form" with each game's respective Las Vegas line (e.g. see the line of +2.0/36.5 shown in box 85 in FIG. 4). After a user submits a pick by selecting a predetermined area on the pick form (e.g. area 87 in FIG. 4), the user is given the opportunity to review (e.g. see FIG. 5) that pick for its accuracy. User's then have the choice, as shown in FIG. 5, to (i) edit the pick by selecting box or area 92, (ii) make another pick by selecting area 94 in FIG. 5, or (iii) finish making picks by selecting area 96 in FIG. 5. Once the user is satisfied that the desired pick or picks have been made, the user clicks the "finished making picks" button or icon 96.

Figure 8:
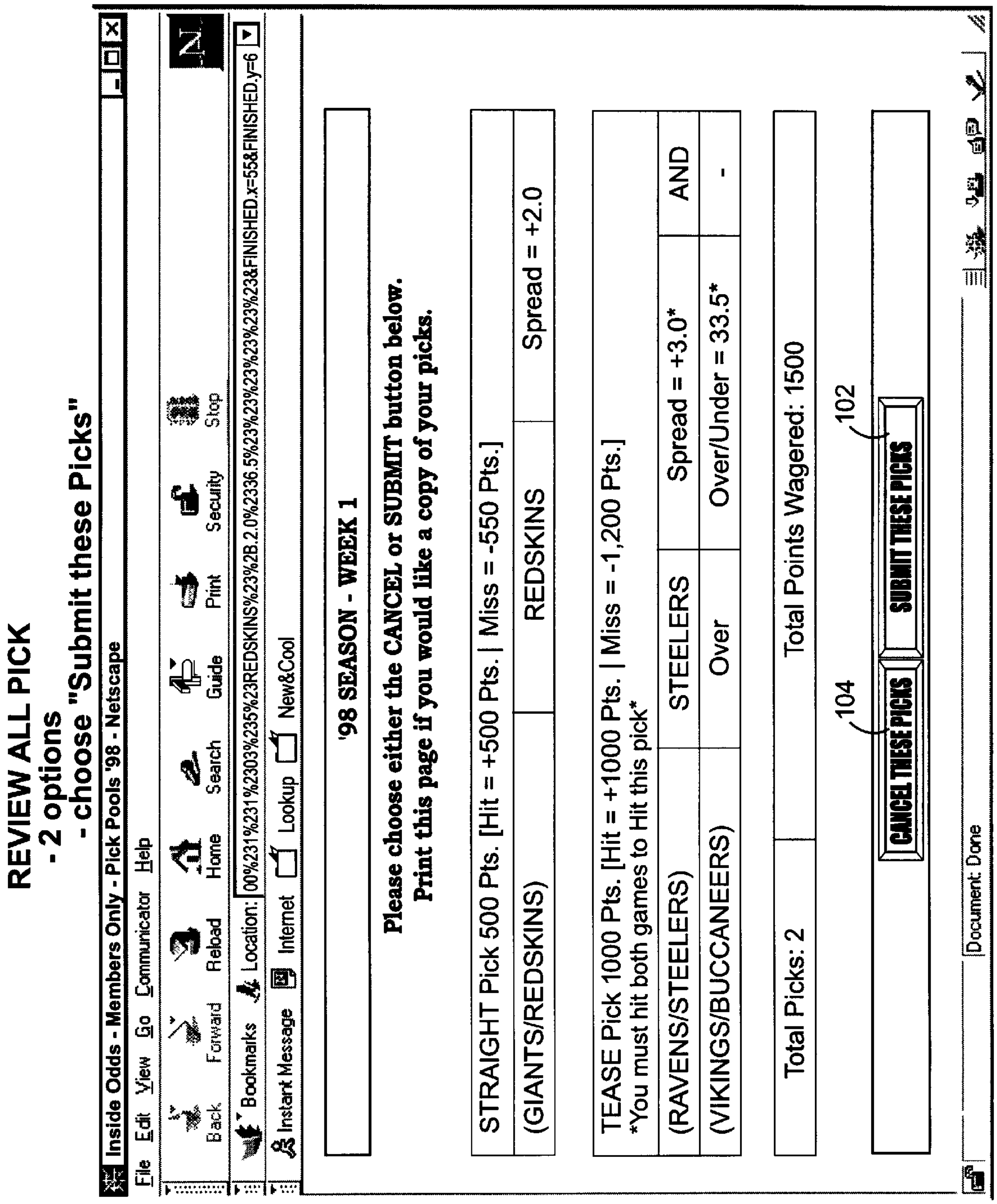
FIG. 8 is a review all picks screen shown to the user on the user's PC screen according to an embodiment of this invention, this screen presenting to the user two options, namely canceling all the shown picks or submitting the picks for final.

The user, via a screen such as that of FIG. 8, is then given one last chance to review all the picks that thus far were made. If the user is satisfied, then the user clicks on the "submit" button (area 102 in FIG. 8) which is the user's final submission. The user also has the option to cancel all the picks and restart the process if so desired by selecting button or area 104 on the FIG. 8 form.

Users may log onto the website and make picks as many times during the week as they desire. In certain embodiments, the system will not accept picks under any, all, or any combination of the following conditions: (a) picks pertaining to games that have already started will not be accepted/validated, (b) picks not conforming to the same restrictions applied to the like name wagers in Nevada sports gambling will not be accepted/validated, (c) picks in excess of twenty-five college or twenty-five pro picks by a single user will not be accepted/validated, and (d) picks that are duplicated by a user will not be accepted/validated by the programming.

With regard to the second option (view picks made in your pool), the user may view what his/her competing pool members have selected as their picks. The system in certain embodiments only allows competing users to view other user's picks when those picks pertain to games either in progress or completed. However in alternative embodiments of this invention, a user may view picks of others in his/her pool relating to games which have not yet started. In certain embodiments, only picks from others in the same pool of a given user may be viewed and analyzed. However, in certain alternative embodiments, the server may allow the user to view the picks (and the results of) of users who are assigned to other pools.

With regard to option number 3 (view the results of your pool), at a predetermined point in time (e.g. after each week's Monday night NFL game), the system via the server 11 tallies the results of all picks which were made for a predetermined number of games (e.g. NFL games which were played that week, or basketball games played in a single day or in the previous week) in the respective pools. A "results page" shows both a current week's performance and a performance year-to-date for each pool member. Results track the number of picks hit or missed and the corresponding point value won or lost (points values may be assigned as will be discussed below) by each member of a pool. In order to promote privacy, a given user can only access a results page for the pool(s) in which that user is a member. However, in alternative embodiments, a user may access and review results of picks of users in other pools. In still further embodiments, server 11 may determine from all of the users from all of the pools which user won the most points in a given period, and award a grand prize to such a user. It is noted that in certain embodiments, the server limits users to a given number of points per pick, and/or per predetermined time period.

Point value calculations mirror, simulate, or are similar to the calculations used to determine monetary winnings and losses associated with like named wagers in Nevada sports gambling. In certain embodiments, the odds for sports games may be automatically downloaded by server 11 from a remote source via the internet, such as from a Nevada odds source, in order to keep the odds updated on a continual basis. In other embodiments, a controller with a given password may access server 11 and manually insert or program into the server particular odds on football or basketball games.

Accordingly, pick pools embodiments of this invention use a packet-switched digital data network (e.g. the internet) to create a competition that simulates in many respects (in some cases all gambling respects), already popular and established Nevada sports gambling/gaming systems. However, in contrast to prior art gaming, certain embodiments of this invention create a competition among users via a "pool" concept, eliminate financial risks and rewards associated with wagering on athletic events in certain embodiments, utilize a digital packet-switched data network in certain embodiments, and overall provide a much needed efficient and simple system for use by sports fans or followers.

Referring to FIG. 1, according to certain embodiments of this invention different users each may have his/her own personal computer (PC) or the like 1, 3, and 5. While PCs are the preferred way of users accessing server 11 via digital data communications network 7, it is also possible for the different suer to access server 11 via the network by using telephones instead of Pcs, with pick information being inputted to the system via DTMF tones or voice input and corresponding voice recognition software at the server.

Personal computers 1, 3, and 5 are in communication with packet-switched digital data network 7 via communication links 9 in certain embodiments of this invention. Communication links 9 may be fiber optic cable, telephone lines, wireless infrared or microwave communication channels, radio frequency wireless channels, or any other conventional link. Links 9 enable users 1, 3, and 5 to access digital data network 7 and thus server 11 via PCs, telephones, or the like. Server 11 houses access databases which include database tables, and also stores software programming code (set forth below) and webpages which may be viewed by users 1, 3, and 5. Thus, users 1, 3, and 5 may use their illustrated personal computers and a corresponding modem to connect to network 7. Web browsing software is used to allow the users to interface with server 11.

Digital data network 7 (e.g. the internet) is asynchronous in design and utilizes no centralized control. Network 7 may, in certain embodiments, combine the advantages of existing local telephone networks 9 to enable cost effective and efficient communication between the personal computers and server 11. In certain embodiments, server 11 may correspond to or be connected to an existing communication link 9 (telephone line) by way of a private branch exchange (PBX) so that a multiplicity of potential users can access server 11 simultaneously or in proximity with one another. Alternatively, a channel service unit may be used instead of a PBX to permit communication between multiple users and server 11 at the same time. Still further, a conventional T1 link 9 may be interposed between server 11 and network 7. Server 11 includes bus or busses which interconnect at least one memory, a central processing unit (processor), and an interface for enabling network 7 and server 11 to communicate with one another. A network interface such as an ethernet or FDDI network access card may be used in certain embodiments of this invention. Multiple network adapter cards may be used when server 11 serves many lines, the number of access cards required being a function of the network band width.

In certain embodiments, server 11 may be a Dell Power Edge 4400 server, with a Pentium II processor, 266 MHz, 128 MG RAM, 4GB hard drive, tape backup, and redundant power supply. However, it will be recognized that other types and models of servers may instead be used as server 11.

Packetized data to be sent over packet switching digital data network 7 may be formatted by way of conventional TCP/UDP/IP based protocols. Network 7 may be a collection of thousands of computer networks, tens of thousands of computers, and many users who share a compatible means for interacting with one another to exchange digital data. Network 7 is composed of many network providers interconnected via routers. One method for transferring files on network 7 is known as the file transfer protocol (FTP). Personal computers 1, 3, and 5 typically access network 7 via interface cards such as ethernet and FDDI, or may also do so indirectly by way of data modems. Packet-switching in network 7 is a way in which different network segments can share a common transmission media. Rather than send a large block of data over a "dedicated" line directly to the destination computer, a packet-switching network breaks the data into small chunks, each chunk being sent along a common transmission line in a "packet" that also contains source and destination information. This allows many packets to flow through the same network, all reaching their appropriate destination. Dedicated network components called packet-switching nodes within network 7 route these packets from source to destination, using the information contained in the packet itself. After all packets from a particular transmission of data from a particular PC (e.g. 3) reach a destination at server 11, for example, or vice versa, the source and destination information is removed and the packets are reassembled into their original data. In this way, packets from any number of computers can share the same network 7. It is noted that server 11 is a bidirectional communicating device, in that it receives communications from the users via network 7, and can also send data (e.g. display screens and/or prompts) to the users via network 7.

In certain embodiments of this invention, it is possible for certain users (e.g. user 5 in FIG. 1) to have another link 10 to server 11. Link 10 may be a telephone line, fiber optic cable, T1 trunk, or wireless radio frequency or microwave link. In such a manner, for example, the user from 5 may send data directly to server 11 via link 10, and the server may send screens back to the user via network 7. This resulting in faster response time in certain embodiments, and also for more privacy. Alternatively, the server 11 may send screens and/or prompts directly to user 5 via link 10, and the user may send picks, requests, and the like to the server via network 7. It is of course also possible for other users to have direct links 10 with server 7, although all are preferably still in communication with server 11 via asynchronous data communication network 7.

FIG. 2 is a flow chart of how a particular embodiment of this invention is implemented. In step 13 (i.e. the "start" step), a user from a particular personal computer or the like 1, 3, or 5, via internet 7, accesses a given website in communication with server 11. Server 11 causes a home page and sign-up information to be displayed to the user via the display screen on the user's PC (e.g see FIG. 3). On this screen (FIG. 3), a "members area" icon 81 is shown to the user on the user's display screen in step 13. If the user wishes to "sign-up," and is not already a member, then the user selects area 83 in FIG. 3 and inputs desired user name(s) and/or password(s) in step 15 when prompted by server 11 to do SO. This information may be input either from a keyboard at the user's PC, by way of DTMF from a phone, or by way of voice recognition software which may be employed or utilized by the user's computer and/or server 11. Server 11 checks the entered user name(s) and password (s) at step 17. If the server detects that the user name and/or password is invalid, then the system proceeds to step 19 which presents a screen to the user enabling the user to make corrections and informs the user that the user name and/or password was invalid. However, if in step 17 the server detects that the user name and password(s) are valid, then the server proceeds to step 21 where the user via his PC and corresponding screen completes credit card information and forwards same to server 11. Then, at step 23 server 11 verifies the payment information by any standard method such as checking with the credit card company identified by the user regarding that particular credit card. After the payment information has been verified, the server proceeds to step 25 and displays payment information to the user. At step 25, the user has the ability to reject the proposed payment information. If the client wishes to accept the proposed payment information, then the server returns to step 23 and then goes on to step 27 where payment is accepted and the subscriber is added to the user profile of a particular pool and the user name and password are activated. Thus, at step 29 the particular user or group of users has/have become a member in a particular "pool" of users.

Figure 3:
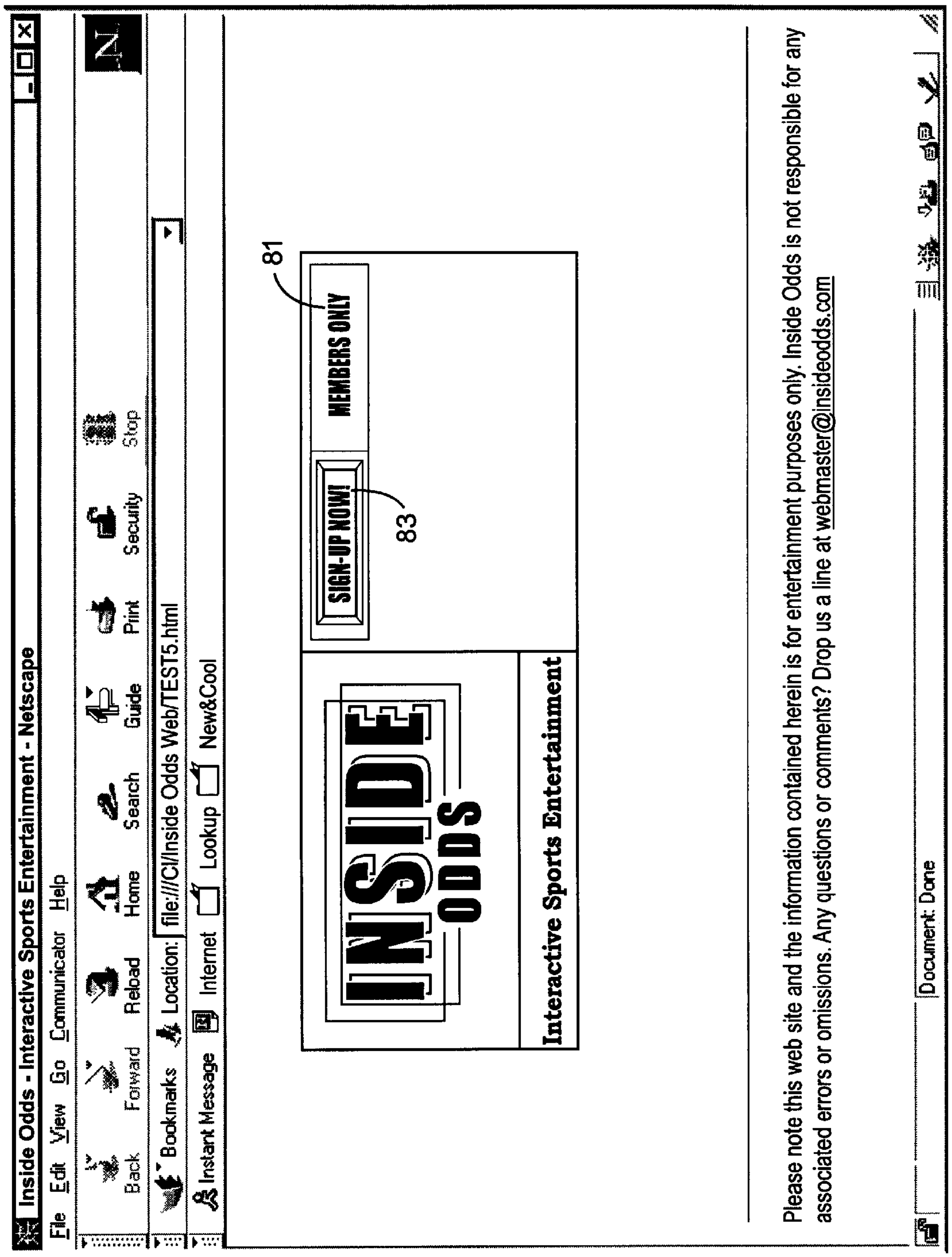
FIG. 3 is an exemplary "home page" screen shown to a user on the user's display screen according to an embodiment of this invention.

Still referring to FIG. 2, after a user becomes a member, when the user accesses the website in step 13, he can click on the "members" area icon 81 as shown in FIG. 3 and proceed into the system at step 31. As discussed above, once into the system via step 31 the user has three options.

When the user decides to choose the first option, to make at least one pick, the server in step 33 accesses game data input from a memory (e.g. regarding all stored games that may be wager-simulated on) in the server and also accesses game access table from a memory in the server. Then, in step 35 the server generates a pick form (e.g. see FIG. 4) which is dynamically generated from data in the game access table, this form being portrayed to the user on his or her personal computer screen as shown in FIG. 4 for example. Then, in step 37 the user submits a pick by pointing to and clicking on a particular area or areas in the pick form via the user's mouse or other position pointer. Referring to FIG. 4, the user may make a straight bet [spread, over, or under] (using points instead of money) by selecting item 72, and may scan through different potential games to bet on and their odds by selecting scroll button 74. The user may alter the number of points he/she wants to wager on a pick by selectively activating scroll button 76, so that the points to be wagered are shown in block 86. The pick, once selected in box 85 with the number of points in box 86, is selected by clicking on or selecting football shaped icon/area 87.

Thereafter, referring to FIG. 2, in step 39 the pick made in step 37 is checked for validity. In certain embodiments of this invention, the server may determine in step 39 that picks are invalid when any of (a) a pick pertains to a game that has already started, (b) a pick does not conform to the same restrictions applied to like named wagers in known sports gambling or per a predetermined system, (c) the pick is in excess of a predetermined number (e.g. 25) of college or professional game picks by a single user in a given period of time, or (d) the pick is a duplication of a previous pick by the same user. This invalidation or non-acceptance of certain picks may take place in the server at step 39, although in other embodiments it may take place at step 75, or any other point in the process.

If the server determines that the pick or picks are invalid in step 39, then in step 41 the user can modify and resubmit the pick. The server checks for the validity of the resubmitted pick again in step 39. Whenever the server in step 39 determines that a pick is valid, then a review pick screen is portrayed on the user's display (e.g. see FIG. 5) in step 43 and the user has three options: (a) edit or change the pick by selecting area 92 in FIG. 5, (b) make another pick by selecting area 94 in FIG. 5, and (c) indicated that the user is finished making picks for the time being by selecting area 96 on the FIG. 5 screen. If the user decides to choose option (a) by selecting area 92, then the user edits or changes the pick at step 45 and the validation process regarding the changed pick is started again at step 39. If the user chooses option (b) (make another pick), then another picks form is displayed to the user (e.g. see FIG. 6) so that the user may make another pick in addition to the first one, and also when area 94 is selected in step 47 then the server in step 49 creates a text string or the like for recording the pick that already has been made (e.g. one text string per pick is in certain embodiments) . The user may then make another pick via the screen of FIG. 6, and click on area 87 so that the validation process regarding this next pick (from the FIG. 6 screen) is again started in step 39. The user then reviews this second pick via the screen of FIG. 7. When the user chooses option (c) [e.g. clicks on box 96] at 51, the user selects this option 51 indicating that the user is finished making picks and the server in step 53 creates a text string recording the most recent pick that has been made. Thus, a string is recorded in a memory of the server for each pick made by the user.

The server in step 55 then uses the text string(s) created in steps 49 and 53 to generate a review of all picks made by the user. An exemplar screen for reviewing all picks that may be shown to a user on the user's display is found in FIG. 8. The user has two options at this point, namely cancelling all of his picks by selecting area 104 at step 57 or submitting all of his or her picks by selecting (clicking on) area 102 at step 59. If the user decides to cancel all the picks, then the server does so in step 61 by deleting the applicable text strings and the system goes back to step 35 where the pick form is presented to the user for selection. However, if the user decides in step 55 to submit all of the picks, then the user selects this option at step 59 by selecting box 102 and the server at step 63 adds all of the text strings representing the picks to the pick's text file (PTF) and the pick making process ends at step 65.

When the user enters the members area at 31, and decides to pick the second option (post pool picks option), then the server at step 67 retrieves data from the PTF file and places it in the picks access table (PAT). In certain embodiments, this retrieving of data from the PTF and placing it into the PAT may be done every so often per a predetermined schedule (e.g. every five minutes). The server then in step 69 creates an HTML file which posts all qualifying picks that were retrieved from the PAT. The user then may access the HTML file in step 71 in order to view the picks. In such a manner, this option may be utilized by a user to view either that particular user's previous picks that are pending or have already been decided, or alternatively may be used to view the picks of other users in the user's pool, or any other pool.

With regard to the third option selectable from the members area at step 31, when the user requests the review results option, the results may be reviewded provided that the server 11 at step 73 has retrieved sports game results (e.g. results from football games and/or basketball games) from the GAT. Such retrieval may be done every so often on a set schedule for example. Then, in step 75 the server 11 removes duplicate picks from the PAT. In step 77, the server then compiles data in the GAT and PAT and stores results in the results access table (RAT). In step 79, the server creates an HTML file for posting the results using data from the RAT. The user may then access the HTML file created in steps 79 in step 80, in order to view the pick results for a predetermined period of time (e.g. from the previous week).

FIG. 3 illustrates an exemplary display screen that is shown to the user at step 13 (i.e. the home page). As shown in the right-hand side, there is a "members only" selectable area 81 and a selectable "sign-up" area 83. Either of these selectable areas on the display screen may be selected by the user positioning the screen cursor over the selectable area via a mouse or the like, and clicking on same. When area 81 is selected, the system proceeds to step 31, while when area 83 is selected, the system proceeds to step 15.

FIG. 4 illustrates an exemplary pick form that is shown on the screen of a user's PC in picking step 37. As shown on the screen, there is an area designated "pick type" which enables the user to select whether his or her pick will be of the "straight" type, or a specialty type such as a tease, parlay, or reverse. These bet types are explained below. There is also an area 85 which displays the team being picked, and the odds or over/under at issue. For example, if the Washington Redskins were playing the N.Y Giants in a professional NFL football game as shown in FIGS. 4–5, and the user wished to pick the Redskins to win versus the 2 point spread, then the user would manipulate area 85 until the Redskins came up as shown in FIG. 4, and click on spread area 89. The user would select the number of points wagered by scrolling at 76 until the number of points (e.g. 500) to be wagered was shown in box 86. The user would then click on football area 87 in order to submit the pick in step 37. The screen illustrated in FIG. 4 is set up for the user selecting a team versus the "spread" as illustrated at 89. However, if the user wished to select an over/under, i.e. whether the combined points scored by both teams would be over or under 36.5, then the user could select or click on the appropriate over or under area 91 or 93, respectively. In such a manner, a variety of different types of picks may be submitted. It is also noted that while the "straight" bet box 72 was selected in FIG. 4, it is possible to instead select any of the tease, parlay or reverse boxes illustrated on the pick form in order to make any of these types of picks.

Figure 6:
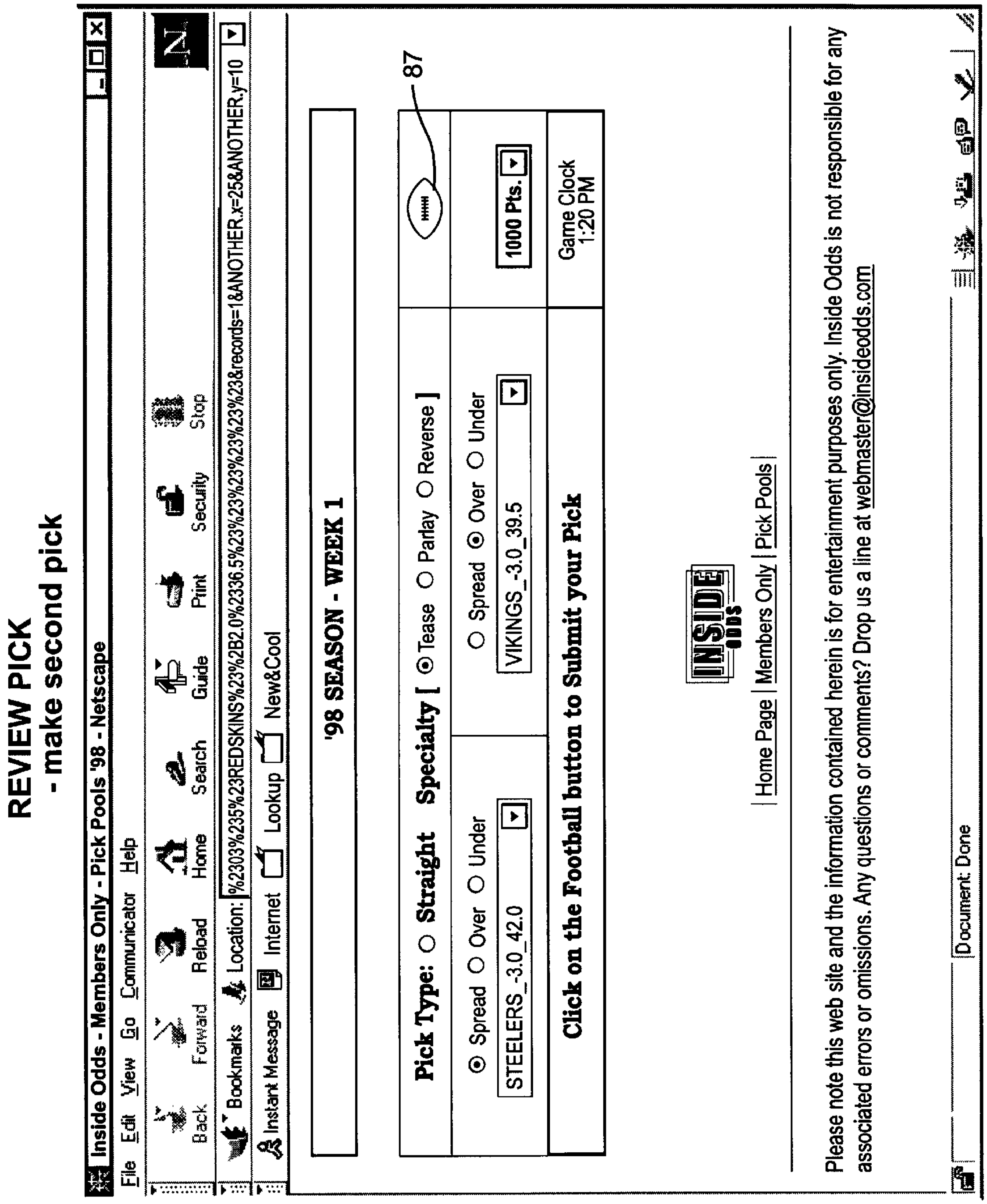
FIG. 6 is another exemplary pick form screen which may be shown to the user according to an embodiment of this invention.

FIG. 5 is an exemplary review pick display screen that is shown to the user on the user's personal computer screen in step 43. If the user in FIG. 5 selects the make another pick area 94, then another pick form will be displayed to the user as shown in FIG. 6. FIG. 6 illustrates the user picking a "tease" bet, including the "over" [i.e. combined points in the game picked to exceed 39.5 points] in the Vikings game and the Steelers versus the 3 point spread in another game. 1000 points is shown as being wagered in the FIG. 6 pick.

Figure 7:
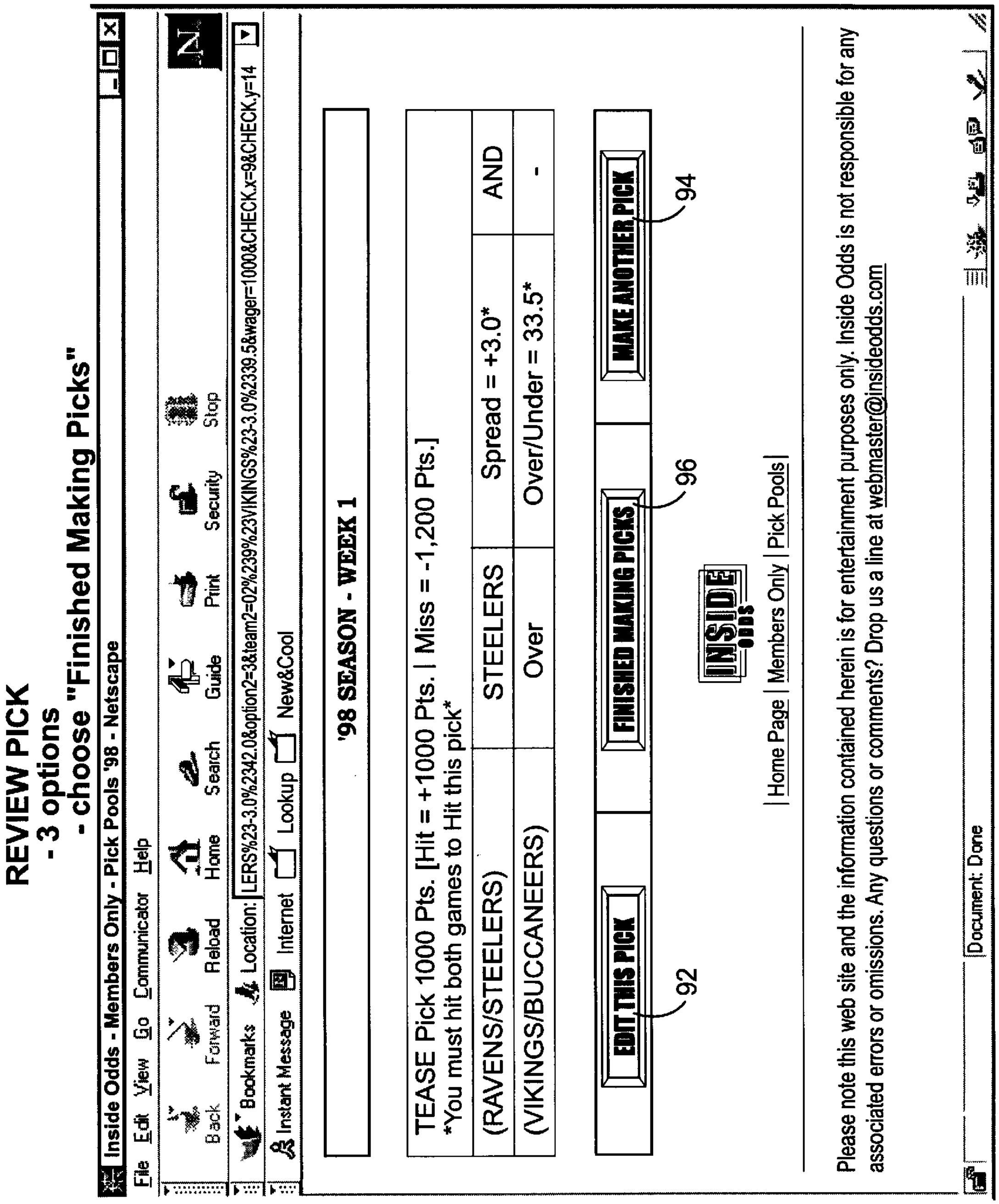
FIG. 7 is an exemplary review pick form screen shown to the user on the user's display screen according to an embodiment of this invention, this screen being similar to the FIG. 5 screen, except that the FIG. 7 screen shows another pick being made/processed.

FIG. 7 is an exemplary screen which may be shown to the user after the FIG. 6 tease pick was made, as caused by server 11, in step 43. If the user selects the finished making picks area 96 in FIG. 7, then the next screen shown to the user is the FIG. 8 screen. FIG. 7 screen also shows how the server causes the display to show the user how many points the user would win/lose given the proposed pick.

FIG. 8 is an exemplary screen which may showed to the user in step 55 in which the user can review all picks. As shown in FIG. 8, the screen indicates that the user has wagered 1500 points [1000 points from the FIG. 6 pick and 500 from the FIG. 4 pick], and has picked both a "straight" [FIG. 4] and a "tease" [FIG. 6]. In the straight pick, the user has wagered 500 points and picked the Redskins to beat the spread of 2 points versus the Giants. In the tease pick, the user has wagered 1,000 points, has picked the over (over 33.5 points, down from 39.5 due to the tease) in the Vikings/Buccaneers game, and picked the Steelers to beat the spread of 3 points (from an original −3 due to the tease) versus the Ravens in this NFL game. As illustrated in FIG. 8, the user can either cancel all of these picks by selecting cancel area 104 or can submit all of these picks (final selection) by selecting "submit" area 102.

Figure 9:
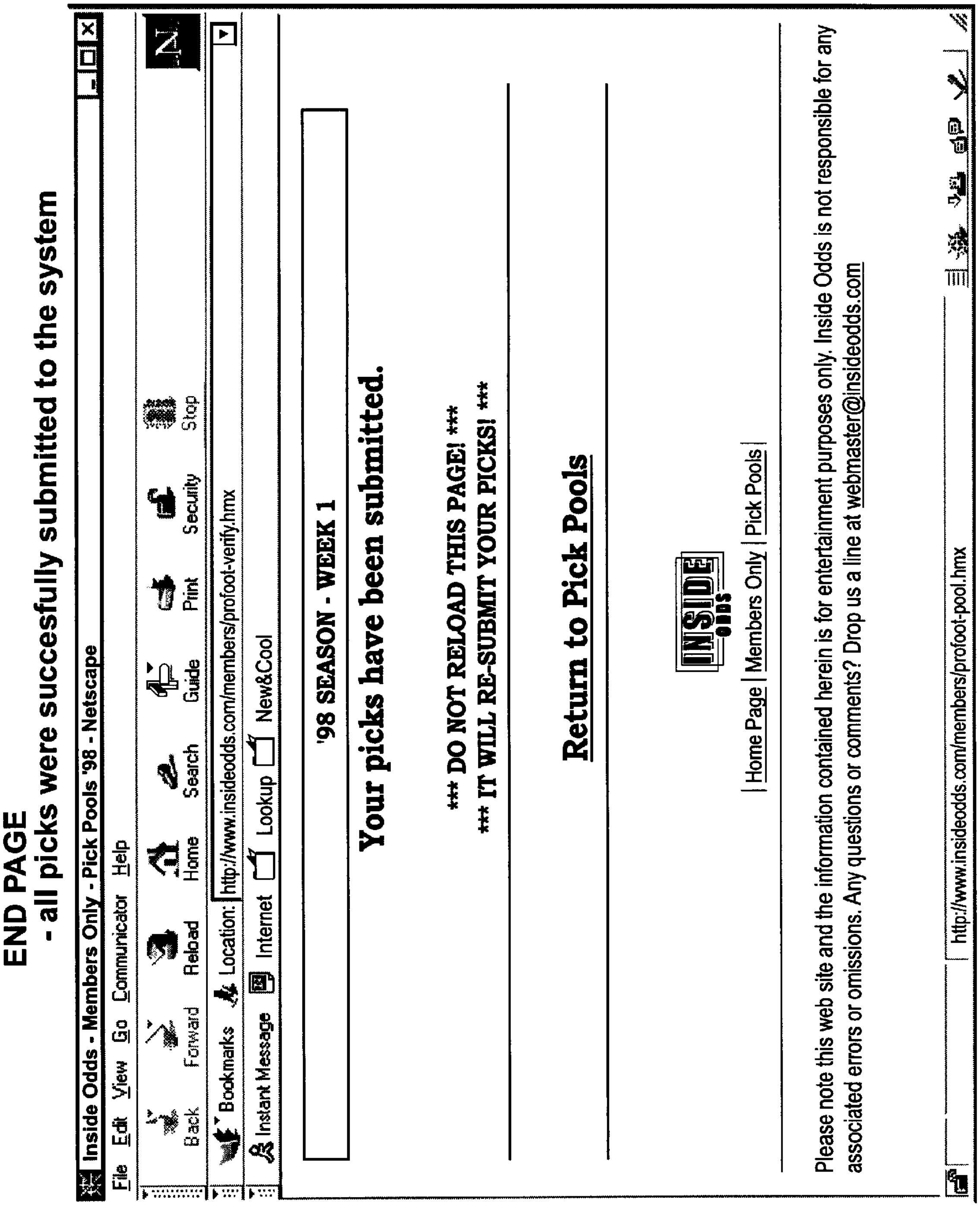
FIG. 9 is an end page screen shown to a user on the user's PC screen according to an embodiment of this invention, where all picks were successfully submitted to the system. It is noted that FIGS. 3–9 illustrate how a user can make two picks according to one embodiment of this invention.

FIG. 9 is an exemplary screen shown to the user on his/her PC screen in "end" step 65. This screen indicates to the user that the user's picks have been submitted, and allows the user to return to pick pools step 33 in certain embodiments. Alternatively, the user may exit the system from the screen shown in FIG. 9.

Many different types of picks may be made according to the different embodiments of this invention. For example, there are three types of "straight" picks which may be made. These "straight" picks include a spread pick, an over pick, and an under pick In a spread pick, the user picks a team to win versus the spread. For example, the user may pick Chicago and the spread is −10, which means that Chicago must win by more than 10 points in order for the user to hit this pick. In an over pick, the user picks a game where the total points scored will be greater than the over/under line. For example, if the user picks the "over" in the Redskins/Dallas game and the over/under is 42, then the total points scored in the game must be greater than 42 for the user to hit this pick (i.e. win this pick). In the "under" type of straight pick, the user picks a game and wagers that the total points scored will be less than that of the over/under line. For example, if the user picks the under in the Redskins/Dallas game when the over/under line is 42, then the total points scored in that game must be less than 42 for the user to hit or win that pick. According to certain embodiments of this invention, if a user hits a straight pick, the user wins a predetermined number of points, such as even points (e.g. a win on a 100 point wager pick results in the user winning 100 points). If a user misses a straight pick, then the user loses the points wagered plus a given. number of pints or percentage of the wagered points [e.g. ten percent (e.g. a loss or miss on a 100 point wager results in the user losing 110 points)]. Alternatively, if a user "pushes" a pick, meaning that it is a tie (i.e. Chicago −10 spread and Chicago wins by exactly 10, or Redskins/Dallas over 42 and the total scores equals exactly 42) then no points are won or lost.

Tease picks may also be chosen in certain embodiments of this invention as discussed above. In a tease, the user makes two straight picks, but in each pick the spread or over/under as it may be, moves a given number of points (e.g. 6 points) in favor of your pick. In order to win points, you must hit both picks in a tease, and pushes are considered losses. A tease may consist of any combination of two straight picks. If you is hit a tease, you hit (or win) both picks, and thus you win even points (e.g. a 100 point win or hit, results in the user wining 100 points). However, if you miss a tease, i.e. you miss or push at least one of the two picks, then the user loses the points plus a percentage of the wager such as twenty percent (a 100 point miss or loss, results in the user losing 120 points). In certain embodiments, the percentage of the wager lost when a user loses a pick, in addition to the amount of the wager, is greater for a tease than a typical straight pick.

The user may also make "parlay" picks according to certain embodiments of this invention. A parlay is simply any two (or more in certain other embodiments) straight picks. If the user hits both of them, the user wins a given number of points (e.g. 12 points) for every other given number of points (e.g. 5 points) wagered. If the user misses or pushes either of the two picks, then the user loses only the amount of the wager. For example, a 500 point parlay wins 1,200 points, while a 500 point parlay loses only 500 points.

Users may also make "reverse" picks according to certain embodiments of this invention. When making a reverse pick, the user makes any two straight picks. If the user hits both, then the user wins a given amount pursuant to a particular odds ratio (e.g. 4 to 1). However, if the user misses or pushes one of the two picks, then the user loses the wager plus a given percentage of the wager such as twenty percent, or if the user misses or pushes both of the two picks then the user loses the wager plus the given percentage (e.g. twenty percent) times two (one for each pick).

It is to be kept in mind that the points utilized above in discussing picks and the results of wins and losses therefrom, are exemplary in nature. Different numbers of points, and different odds, may be used. Users may wager any number of points on any pick, but point ceilings and/or floors are put in place by the server in certain embodiments.

Once given the above disclosure, many other features, modifications, and improvements will become apparent to the skilled artisan. Such other features, modifications, and improvements are, therefore, considered to be a part of this invention, the scope of which is to be determined by the following claims.

Set forth below is a listing of software (programming language is SMX or Server Macro Expansion) which may be utilized in conjunction with server 11 to implement certain embodiments of this invention.

PPPPPP proofoot-form.hmx

```
<HTML>
<HEAD>
<BASE HREF="http://www.insideodds.com/members/">
<!-- BASE HREF="http://localhost/" -->
<META NAME="keywords" CONTENT="Sports, Football, NCAA, NFL, Basketball, NBA,
Odds, Spreads, Line, Picks, Scores, Statistics, Win, Loss">
<TITLE>Inside Odds - Members Only - Pick Pools '97</TITLE>
</HEAD>

<BODY BACKGROUND="back.gif" TEXT=#000000 BGCOLOR=#FFFFFF LINK=#0000FF
VLINK=#0000FF ALINK=#FF0000>

<!-- Inside Odds Home Page Revision 3 -->
<!-- Author: Bret Strachan -->
<!-- Web Design: Andrew Ventura/Bret Strachan -->
<!-- Programming: Dave Anderson -->

%gset(inc, D:/CBuilder/htdocs/odds/timing.inc)
%expand(%include(%inc%))
%setDT()
%if(%equal(%form(records), %null%),
  %gset(records, 0),  %gset(records, %form(records))
)
%define(showform,
  %gset(teamlist, %null%)
  %set(sqlstmt2, "SELECT * FROM ProfootLine ORDER BY GameID")
  %set(async-sql, T)
  %try(
    %sql(SportsTicker, %sqlstmt2%,
      %gset(spread, %null%)
      %if(%equal(%left(%column(Spread), 1), -),
        %gset(spread, %gettoken(%column(Spread), "-", 0))
        %gset(homespread, -%spread%)      %gset(awayspread, +%spread%)
      ,
        %gset(spread, %column(Spread))
        %gset(homespread, +%spread%)      %gset(awayspread, -%spread%)
      )
      %if(%equal(%column(OverUnder), 200.0), %gset(OvUn, 0.0), %gset(OvUn,
%column(OverUnder)))
      %checkone()
      %if(%equal(%show%, "YES"),
        %gset(teamlist, %teamlist%<OPTION
VALUE=\"%column(GameID)#%column(HomeID)#%column(HomeName)#%homespread%#%OvUn%\">
%column(GameID):%column(HomeName):%homespread%:%OvUn%%cr%)
        %gset(teamlist, %teamlist%<OPTION
VALUE=\"%column(GameID)#%column(AwayID)#%column(AwayName)#%awayspread%#%OvUn%\">
%column(GameID):%column(AwayName):%awayspread%:%OvUn%%cr%)
      )
    )

    <FORM METHOD=GET ACTION="profoot-verify.hmx">
    <INPUT TYPE=HIDDEN NAME="system" VALUE="InsideOdds">
    <INPUT TYPE=HIDDEN NAME="process" VALUE="CHECK">
    <INPUT TYPE=HIDDEN NAME="userinfo" VALUE=\"%client-authname%#%pickpool%\">
    <INPUT TYPE=HIDDEN NAME="records" VALUE=\"%records%\">
```

```
%set(step, 1)
%while(%lte(%step%, %records%),
  <INPUT TYPE=HIDDEN NAME=\"pick%step%\" VALUE=\"%form(pick%step%)\">
  %set(step, %iadd(%step%, 1))
)
<TABLE BORDER=1 WIDTH=98%>
<TR><TH COLSPAN=3>%proweek%</TH></TR>
<TR>
<TD COLSPAN=2 ALIGN=CENTER>
  <FONT COLOR=#008000><B>Pick Type:</B></FONT>
  <INPUT TYPE=RADIO NAME=\"type\" VALUE="1" CHECKED>Straight
  <INPUT TYPE=RADIO NAME=\"type\" VALUE="2">Tease
  <INPUT TYPE=RADIO NAME=\"type\" VALUE="5">Parlay
  <INPUT TYPE=RADIO NAME=\"type\" VALUE="6">Reverse
</TD>
<TD ALIGN=CENTER><INPUT TYPE=IMAGE NAME="CHECK" SRC="fball.gif"
BORDER=0></TD>
</TR>
<TR>
<TD VALIGN=TOP ALIGN=CENTER>
  <INPUT TYPE=RADIO NAME=\"option1\" VALUE="1" CHECKED>Spread  <INPUT
TYPE=RADIO NAME=\"option1\" VALUE="3">Over  <INPUT TYPE=RADIO NAME=\"option1\"
VALUE="4">Under
  <SELECT NAME=\"team1\">
    <OPTION VALUE="">Select a Team
    %teamlist%
  </SELECT>
</TD>
<TD VALIGN=TOP ALIGN=CENTER>
  <INPUT TYPE=RADIO NAME=\"option2\" VALUE="1" CHECKED>Spread  <INPUT
TYPE=RADIO NAME=\"option2\" VALUE="3">Over  <INPUT TYPE=RADIO NAME=\"option2\"
VALUE="4">Under
  <SELECT NAME=\"team2\">
    <OPTION VALUE="">Tease/Parlay/Reverse Selection
    %teamlist%
  </SELECT>
</TD>
<TD VALIGN=BOTTOM ALIGN=CENTER>
  <BR>
  <SELECT NAME=\"wager\">
    <OPTION VALUE="">Wager
    <OPTION VALUE="500">500 Pts.
    <OPTION VALUE="1000">1000 Pts.
    <OPTION VALUE="1500">1500 Pts.
    <OPTION VALUE="2000">2000 Pts.
  </SELECT>
</TD>
</TR>
<TR>
  <TD BGCOLOR=#C0C0C0 ALIGN=CENTER COLSPAN=2><B> Click on the Football
button to Submit your Pick </B></TD>
  <TD BGCOLOR=#C0C0C0 ALIGN=CENTER>%showtime%</TD>
</TR>
</TABLE>
</FORM>
,
<H2><FONT COLOR=FF0000>ERROR Connecting to Game Database</FONT></H2>
```

36

```
    <H3>Message: %exception-msg%</H3>
    <H3>Please contact <A
HREF="mailto:webmaster@insideodds.com">webmaster@insideodds.com</A>
    immediately with this problem.<BR>Be sure to include the error message
above.</H3>
  )
)

%set(async-sql, T)  %gset(passed, %null%)
%set(sqlstmt, "SELECT * FROM Profile WHERE UserID = '%client-authname%'")
%try(
  %sql(IO Members, %sqlstmt%,
    %if(%equal(%column(ProFootPick), 1),
      %gset(passed, "YES")  %gset(pickpool, %column(PickPool))
    )
  )
,
  <FONT COLOR=FF0000>ERROR Connecting to Members Database<BR>
  Type: %exception-type% | %exception-msg%</FONT>
  Please contact <A
HREF="mailto:webmaster@insideodds.com">webmaster@insideodds.com</A>
  immediately with this problem.<BR> Be sure to include the error message
above.<P>
)
%if(%equal(%passed%, %null%),
  <H2><FONT COLOR=#FF0000>You have not registered for access to this feature.
</FONT></H2><P>
  <H3><FONT COLOR=#FF0000>If you believe you have received this message in error
please<BR>
  contact system administration at </FONT> <A
HREF="mailto:webmaster@insideodds.com">webmaster@insideodds.com</A></H3>
  ,
  %showform()
)

<BR><BR>
<CENTER>
<A HREF="/index.html"><IMG SRC="/home.gif" BORDER="0" WIDTH="83"
HEIGHT="45"></A><BR>
| <A HREF="/index.html">Home Page</A> | <A HREF="index.html">Members Only</A> |
<A HREF="profoot-pool.hmx">Pick Pools</A> |
</CENTER>

<HR>
<P>
<FONT SIZE="2">
Please note this web site and the information contained herein is for
entertainment purposes only. Inside Odds is not responsible for any
associated errors or omissions. Any questions or comments? Drop us a line at
<A HREF="mailto:webmaster@insideodds.com">webmaster@insideodds.com</A>
</FONT>
</P>

</BODY>
</HTML>
```

```
PPPPPP profoot-games.hmx

<HTML>
<HEAD>
<BASE HREF="http://www.insideodds.com/members/">
<!-- BASE HREF="http://localhost/" -->
<META NAME="keywords" CONTENT="Sports, Football, NCAA, NFL, Basketball, NBA,
Odds, Spreads, Line, Picks, Scores, Statistics, Win, Loss">
<TITLE>Inside Odds - Members Only - NFL Lines</TITLE>
</HEAD>

<BODY BACKGROUND="back.gif" TEXT=#000000 BGCOLOR=#FFFFFF LINK=#0000FF
VLINK=#0000FF ALINK=#FF0000>

<!-- Inside Odds Home Page Revision 3 -->
<!-- Author: Bret Strachan -->
<!-- Web Design: Andrew Ventura/Bret Strachan -->
<!-- Programming: Dave Anderson -->

%gset(inc, D:/CBuilder/htdocs/odds/timing.inc)
%expand(%include(%inc%))
%setDT()
%gset(created, %Month% %Day% @ %showtime%)
<TABLE BORDER=3 WIDTH=98%>
<TR><TH BGCOLOR=#C0C0C0 COLSPAN=5>%proweek%</TH></TR>
<TR><TH COLSPAN=5>Line as of %created%</TH></TR>
<TR><TH BGCOLOR=#C0C0C0>HOME</TH><TH BGCOLOR=#C0C0C0>SPR</TH><TH
BGCOLOR=#C0C0C0>AWAY</TH><TH BGCOLOR=#C0C0C0>OV/UN</TH><TH
BGCOLOR=#C0C0C0>TIME</TH></TR>
%set(sqlstmt, "SELECT * FROM ProfootLine ORDER BY GameID")
%set(async-sql, T)
%try(
  %sql(SportsTicker, %sqlstmt%,
    %gset(showall, "TRUE")
    %checkone()
    %if(%equal(%show%, "YES"),
      %gset(spread, %null%)
      %if(%equal(%left(%column(Spread), 1), -),
      %gset(spread, %gettoken(%column(Spread), "-", 0))
      %gset(homespread, -%spread%)      %gset(awayspread, +%spread%).
      ,
        %gset(spread, %column(Spread))
        %gset(homespread, +%spread%)      %gset(awayspread, -%spread%)
      )
      %if(%equal(%column(OverUnder), 200.0), %gset(OvUn, -), %gset(OvUn,
%column(OverUnder)))
      %if(%equal(%column(Spread), 200.0), %gset(Spread, <B>NO LINE</B>)
%gset(OvUn, -), %gset(Spread, %homespread%))
      <TR>
      <TD ALIGN=CENTER><B>%column(HomeName)</B></TD><TD ALIGN=CENTER><FONT
COLOR=#FF0000><B>%Spread%</B></FONT></TD>
      <TD ALIGN=CENTER><B>%column(AwayName)</B></TD><TD ALIGN=CENTER><FONT
COLOR=#0000FF><B>%OvUn%</B></FONT></TD>
      %gset(GHour, %gettoken(%column(Time), ":", 0))  %gset(GMinute,
%gettoken(%column(Time), ":", 1))
      %if(%gt(%GHour%,12), %gset(GAmPm, "PM")  %gset(GHour, %isub(%GHour%, 12)))
      %if(%equal(%GHour%, 12), %gset(GAmPm, "PM"))
```

```
      <TD ALIGN=CENTER><B>%column(Day)\, %column(Date)</B>  @ %GHour%:%GMinute%
%GAmPm%</TD>
      </TR>
    )
  )
,
  <H2><FONT COLOR=FF0000>ERROR Connecting to Games Database</FONT></H2>
  <H3>Message: %exception-msg%</H3>
  <H3>Please contact <A
HREF="mailto:webmaster@insideodds.com">webmaster@insideodds.com</A>
  immediately with this problem.<BR>Be sure to include the error message
above.</H3>
)

</TABLE>

<BR><BR>
<CENTER>
<A HREF="/index.html"><IMG SRC="/home.gif" BORDER="0" WIDTH="83"
HEIGHT="45"></A><BR>
| <A HREF="/index.html">Home Page</A> | <A HREF="index.html">Members Only</A> |
</CENTER>

<HR>
<P>
<FONT SIZE="2">
Please note this web site and the information contained herein is for
entertainment purposes only. Inside Odds is not responsible for any
associated errors or omissions. Any questions or comments? Drop us a line at
<A HREF="mailto:webmaster@insideodds.com">webmaster@insideodds.com</A>
</FONT>
</P>

</BODY>
</HTML>

PPPPPP  profoot-pool.hmx


<HTML>
<HEAD>
<BASE HREF="http://www.insideodds.com/members/">
<!-- BASE HREF="http://localhost/" -->
<META NAME="keywords" CONTENT="Sports, Football, NCAA, NFL, Basketball, NBA,
Odds, Spreads, Line, Picks, Scores, Statistics, Win, Loss">
<TITLE>Inside Odds - Members Only - Pick Pool '97</TITLE>
</HEAD>

<BODY BACKGROUND="back.gif" TEXT=#000000 BGCOLOR=#FFFFFF LINK=#0000FF
VLINK=#0000FF ALINK=#FF0000>

<!-- Inside Odds Home Page Revision 3 -->
<!-- Author: Bret Strachan -->
<!-- Web Design: Andrew Ventura/Bret Strachan -->
<!-- Programming: Dave Anderson -->
```

```
<H2><IMG SRC="/fball.gif"> 1997 Professional Football Pick Pool <IMG
SRC="/fball.gif"><HR></H2>

%define(show,
<CENTER>
| <A HREF="profoot-games.hmx" TARGET="_new"> View this weeks match-ups</A> | <A
HREF="picktype.html" TARGET="_new"> Explanation of different Pick Types</A> |
<P>

<FONT COLOR=#FF0000>*** The new weekly match-ups will be loaded each Tuesday
***</FONT>
</CENTER>
<P>

<TABLE BORDER=1 CELLPADDING=3 WIDTH=98%>
  <TR><TH><FONT COLOR=#008000>My Pick Pool</FONT></TH><TH><FONT
COLOR=#008000>Other Pick Pools</FONT></TH></TR>
  <TR><TD ALIGN=CENTER>
    <A HREF="profoot-form.hmx">Make my Picks for this Week</A><P>
    <A HREF="show.hmx?file=profoot-%pickpool%-picks.hmx">View all Picks in my
pool</A><P>
    <A HREF="show.hmx?file=foot-%pickpool%-results.hmx">View the latest Results
in my pool</A>
  </TD>
  <TD ALIGN=CENTER>
    <A HREF="show.hmx?file=profoot-picks.html">View all Picks from other
pools</A><P>
    <A HREF="show.hmx?file=foot-results.html">View the latest Results from other
pools</A>
  </TD>
  </TR>
</TABLE>
)

%gset(inc, D:/CBuilder/htdocs/odds/members/pickpool.inc)
%expand(%include(%inc%))

<BR><BR>
<CENTER>
<A HREF="/index.html"><IMG SRC="/home.gif" BORDER="0" WIDTH="83"
HEIGHT="45"></A><BR>
| <A HREF="/index.html">Home Page</A> | <A HREF="index.html">Members Only</A> |
</CENTER>

<HR>
<P>
<FONT SIZE="2">
Please note this web site and the information contained herein is for
entertainment purposes only. Inside Odds is not responsible for any
associated errors or omissions. Any questions or comments? Drop us a line at
<A HREF="mailto:webmaster@insideodds.com">webmaster@insideodds.com</A>
</FONT>
</P>

</BODY>
</HTML>
```

40

```
PPPPPP  profoot-verify.hmx

<HTML>
<HEAD>
<BASE HREF="http://www.insideodds.com/members/">
<!-- BASE HREF="http://localhost/" -->
<META NAME="keywords" CONTENT="Sports, Football, NCAA, NFL, Basketball, NBA,
Odds, Spreads, Line, Picks, Scores, Statistics, Win, Loss">
<TITLE>Inside Odds - Members Only - Pick Pools '97</TITLE>
</HEAD>

<BODY BACKGROUND="back.gif" TEXT=#000000 BGCOLOR=#FFFFFF LINK=#0000FF
VLINK=#0000FF ALINK=#FF0000>

<!-- Inside Odds Home Page Revision 3 -->
<!-- Author: Bret Strachan -->
<!-- Web Design: Andrew Ventura/Bret Strachan -->
<!-- Programming: Dave Anderson -->

%null(%enumform('%name%=%value%<BR>%crlf%))
%gset(inc, D:/CBuilder/htdocs/odds/timing.inc)
%expand(%include(%inc%))
%setDT()
<TABLE BORDER=1 CELLPADDING=3 WIDTH=98%>
  <TR><TH BGCOLOR=#C0C0C0 COLSPAN=3>%proweek%</TH></TR>
</TABLE>
%define(maketeams,
  %gset(teamlist, %null%)  %gset(gamenum, 0)
  %set(sqlstmt2, "SELECT * FROM ProfootLine ORDER BY GameID")
  %set(async-sql, T)
  %try(
    %sql(SportsTicker, %sqlstmt2%,
      %gset(gamenum, %iadd(%gamenum%, 1))
      %gset(spread, %null%)
      %if(%equal(%left(%column(Spread), 1), -),
        %gset(spread, %gettoken(%column(Spread), "-", 0))
        %gset(homespread, -%spread%)      %gset(awayspread, +%spread%)
      ,
        %gset(spread, %column(Spread))
        %gset(homespread, +%spread%)      %gset(awayspread, -%spread%)
      )
      %if(%equal(%column(OverUnder), 200.0), %gset(OvUn, 0.0), %gset(OvUn,
%column(OverUnder)))
      %checkone()
      %if(%equal(%show%, "YES"),
        %gset(teamlist, %teamlist%<OPTION
VALUE=\"%column(GameID)#%column(HomeID)#%column(HomeName)#%homespread%#%OvUn%\">
%column(GameID):%column(HomeName):%homespread%:%OvUn%%cr%)
        %gset(teamlist, %teamlist%<OPTION
VALUE=\"%column(GameID)#%column(AwayID)#%column(AwayName)#%awayspread%#%OvUn%\">
%column(GameID):%column(AwayName):%awayspread%:%OvUn%%cr%)
        %if(%lt(%gamenum%, 10), %gset(num, 0%gamenum%), %gset(num, %gamenum%))
        %gset(game%num%,
%column(Date)#%column(Time)#%column(AwayID)#%column(AwayName)#%awayspread%#%OvUn
%#%column(HomeID)#%column(HomeName)#%homespread%#%OvUn%)
      )
```

```
    )
  ,
    <H2><FONT COLOR=FF0000>ERROR Connecting to Game Database</FONT></H2>
    <H3>Message: %exception-msg%</H3>
    <H3>Please contact <A
HREF="mailto:webmaster@insideodds.com">webmaster@insideodds.com</A>
    immediately with this problem.<BR>Be sure to include the error message
above.</H3>
  )
)
%define(varload,
  %gset(type, %form(type))  %gset(wager, %form(wager))
  %gset(option1, %form(option1))  %gset(option2, %form(option2))
  %gset(gameid1, %gettoken(%form(team1), "#", 0))
  %gset(team1, %gettoken(%form(team1), "#", 1))
  %gset(name1, %gettoken(%form(team1), "#", 2))
  %gset(spread1, %gettoken(%form(team1), "#", 3))
  %gset(ovun1, %gettoken(%form(team1), "#", 4))
  %gset(gameid2, %gettoken(%form(team2), "#", 0))
  %gset(team2, %gettoken(%form(team2), "#", 1))
  %gset(name2, %gettoken(%form(team2), "#", 2))
  %gset(spread2, %gettoken(%form(team2), "#", 3))
  %gset(ovun2, %gettoken(%form(team2), "#", 4))
)
%define(pickload,
  %gset(wager, %gettoken(%form(pick%step%), "#", 0))
  %gset(type, %gettoken(%form(pick%step%), "#", 1))
  %gset(option1, %gettoken(%form(pick%step%), "#", 2))
  %gset(gameid1, %gettoken(%form(pick%step%), "#", 3))
  %gset(team1, %gettoken(%form(pick%step%), "#", 4))
  %gset(name1, %gettoken(%form(pick%step%), "#", 5))
  %gset(spread1, %gettoken(%form(pick%step%), "#", 6))
  %gset(ovun1, %gettoken(%form(pick%step%), "#", 7))
  %gset(option2, %gettoken(%form(pick%step%), "#", 8))
  %gset(gameid2, %gettoken(%form(pick%step%), "#", 9))
  %gset(team2, %gettoken(%form(pick%step%), "#", 10))
  %gset(name2, %gettoken(%form(pick%step%), "#", 11))
  %gset(spread2, %gettoken(%form(pick%step%), "#", 12))
  %gset(ovun2, %gettoken(%form(pick%step%), "#", 13))
)
%define(newload,
  %gset(type, %form(pick%step%type))  %gset(wager, %form(pick%step%wager))
  %gset(option1, %form(pick%step%option1))  %gset(option2,
%form(pick%step%option2))
  %gset(gameid1, %gettoken(%form(pick%step%team1), "#", 0))
  %gset(team1, %gettoken(%form(pick%step%team1), "#", 1))
  %gset(name1, %gettoken(%form(pick%step%team1), "#", 2))
  %gset(spread1, %gettoken(%form(pick%step%team1), "#", 3))
  %gset(ovun1, %gettoken(%form(pick%step%team1), "#", 4))
  %gset(gameid2, %gettoken(%form(pick%step%team2), "#", 0))
  %gset(team2, %gettoken(%form(pick%step%team2), "#", 1))
  %gset(name2, %gettoken(%form(pick%step%team2), "#", 2))
  %gset(spread2, %gettoken(%form(pick%step%team2), "#", 3))
  %gset(ovun2, %gettoken(%form(pick%step%team2), "#", 4))
)
%define(options,
  %gset(rdate, %gettoken(%expand(%game%gameid1%%), "#", 0))
```

```
%gset(rtime, %gettoken(%expand(%game%gameid1%%), "#", 1))
%gset(rteam1, %gettoken(%expand(%game%gameid1%%), "#", 2))
%gset(rname1, %gettoken(%expand(%game%gameid1%%), "#", 3))
%if(%equal(%team1%, %null%), %gset(name1, %rname1%))
%gset(rspread1, %gettoken(%expand(%game%gameid1%%), "#", 4))
%if(%equal(%team1%, %null%), %gset(spread1, %rspread1%))
%gset(rovun1, %gettoken(%expand(%game%gameid1%%), "#", 5))
%if(%equal(%team1%, %null%), %gset(ovun1, %rovun1%))
%gset(rteam2, %gettoken(%expand(%game%gameid1%%), "#", 6))
%gset(rname2, %gettoken(%expand(%game%gameid1%%), "#", 7))
%if(%equal(%team2%, %null%), %gset(name2, %rname2%))
%gset(rspread2, %gettoken(%expand(%game%gameid1%%), "#", 8))
%gset(rovun2, %gettoken(%form(game%gameid1%), "#", 9))

%gset(sdate, %gettoken(%expand(%game%gameid2%%), "#", 0))
%gset(stime, %gettoken(%expand(%game%gameid2%%), "#", 1))
%gset(steam1, %gettoken(%expand(%game%gameid2%%), "#", 2))
%gset(sname1, %gettoken(%expand(%game%gameid2%%), "#", 3))
%gset(sspread1, %gettoken(%expand(%game%gameid2%%), "#", 4))
%gset(sovun1, %gettoken(%expand(%game%gameid2%%), "#", 5))
%gset(steam2, %gettoken(%expand(%game%gameid2%%), "#", 6))
%gset(sname2, %gettoken(%expand(%game%gameid2%%), "#", 7))
%gset(sspread2, %gettoken(%expand(%game%gameid2%%), "#", 8))
%gset(sovun2, %gettoken(%expand(%game%gameid2%%), "#", 9))
%case(
  %equal(%type%, 1),
    %gset(showtype, "STRAIGHT")
    %gset(win, %wager%)      %gset(loss, %fmt(%mult(%wager%,-1.1),0,,))
  ,
  %equal(%type%, 2),
    %gset(showtype, "TEASE")
    %gset(win, %wager%)      %gset(loss, %fmt(%mult(%wager%,-1.2),0,,))
  ,
  %equal(%type%, 5),
    %gset(showtype, "PARLAY")
    %gset(win, %fmt(%mult(%div(%wager%, 5), 12),0,,))  %gset(loss,
%fmt(%mult(%wager%,-1.0),0,,))
  ,
  %equal(%type%, 6),
    %gset(showtype, "REVERSE")
    %gset(win, %fmt(%mult(%wager%, 4),0,,))
    %gset(loss, "<FONT COLOR=#008000>(miss 1)</FONT> ")
    %gset(loss1, %fmt(%mult(%wager%,-1.2),0,,))
    %gset(loss, %concat(%loss%, %loss1%))
    %gset(loss2, %fmt(%mult(%wager%,-2.4),0,,))
    %gset(loss, %concat(%loss%, " Pts. / "))
    %gset(loss, %concat(%loss%, "<FONT COLOR=#008000>(miss both)</FONT> "))
    %gset(loss, %concat(%loss%, %loss2%))
)
%if(%equal(%type%, 2),
  %case(
    %equal(%option1%, 1),  %gset(showspread1, %spread1%)  %gset(showspread1,
%fmt(%add(%showspread1%, 6),1,".",))
      %if(%not(%equal(%left(%showspread1%, 1), -)),
        %gset(showspread1, +%showspread1%)
      )
      %gset(showspread1, %concat(%showspread1%, "*"))
```

```
      ,
      %equal(%option1%, 3),  %gset(showovun1, %ovun1%)  %gset(showovun1,
%fmt(%sub(%showovun1%, 6),1,".",)) %gset(showovun1, %concat(%showovun1%, "*")),
      %equal(%option1%, 4),  %gset(showovun1, %ovun1%)  %gset(showovun1,
%fmt(%add(%showovun1%, 6),1,".",)) %gset(showovun1, %concat(%showovun1%, "*"))
    )
    %case(
      %equal(%option2%, 1),  %gset(showspread2, %spread2%)  %gset(showspread2,
%fmt(%add(%showspread2%, 6),1,".",))
        %if(%not(%equal(%left(%showspread2%, 1), -)),
          %gset(showspread2, +%showspread2%)
        )
        %gset(showspread2, %concat(%showspread2%, "*"))
      ,
      %equal(%option2%, 3),  %gset(showovun2, %ovun2%)  %gset(showovun2,
%fmt(%sub(%showovun2%, 6),1,".",)) %gset(showovun2, %concat(%showovun2%, "*")),
      %equal(%option2%, 4),  %gset(showovun2, %ovun2%)  %gset(showovun2,
%fmt(%add(%showovun2%, 6),1,".",)) %gset(showovun2, %concat(%showovun2%, "*"))
    )
  ,
    %gset(showspread1, %spread1%)    %gset(showspread2, %spread2%)
    %gset(showovun1, %ovun1%)        %gset(showovun2, %ovun2%)
  )
)
%define(verify,
  %null(### START VERIFY ###)
  <FORM METHOD=GET ACTION="profoot-verify.hmx">
  <INPUT TYPE=HIDDEN NAME="system" VALUE="InsideOdds">
  <INPUT TYPE=HIDDEN NAME="process" VALUE="VERIFY">
  <INPUT TYPE=HIDDEN NAME="userinfo" VALUE="%form(userinfo)">
  %gset(hidepick, "NO")  %gset(hideteam, "YES")  %gset(ready, "YES")
  %gset(recs, %form(records))  %gset(number, %form(records))
  %gset(temp, %iadd(%number%, 1))
  %varload()  %options()  %checkdata()
  %if(%and(%equal(%error%, %null%), %equal(%skip%, "NO")),
    %pass()
  ,
    %if(%not(%equal(%error%, %null%)),
      %fail()
    )
  )
  %if(%equal(%errors%, "YES"),
    %set(step, 1)
    %while(%lte(%step%, %form(records)),
      <INPUT TYPE=HIDDEN NAME=\"pick%step%\" VALUE=\"%form(pick%step%)\">
      %set(step, %iadd(%step%, 1))
    )
  ,
    %if(%equal(%skip%, "YES"),
      <CENTER><H2>NO PICK SELECTED</H2></CENTER>
      %gset(ready, "NO")
    ,
      %gset(ready, "YES")
    )
  )
)
%define(checkdata,
```

```
  %null(### START CHECKDATA ###)
  %gset(skip, "NO")  %gset(error, %null%)  %gset(skip, "NO")
  %checktwo()
  %if(%equal(%show1%, "NO"),
    %gset(error, %error% <FONT COLOR=#FF0000>*** Selected game started @ %rtime%
***</FONT><BR>)
  )
  %if(%and(%not(%equal(%team2%, %null%)), %equal(%show2%, "NO")),
    %gset(error, %error% <FONT COLOR=#FF0000>*** Selected game started @ %stime%
***</FONT><BR>)
  )
  %if(%equal(%type%, 999),
     %gset(skip, "YES")      %gset(recs, %isub(%recs%, 1))
  )
  %if(%and(%equal(%team1%, %null%), %equal(%type%, %null%), %equal(%option1%,
%null%), %equal(%team2%, %null%), %equal(%option2%, %null%), %equal(%wager%,
%null%)),
     %gset(skip, "YES")
  )
  %if(%and(%equal(%team1%, %null%), %equal(%type%, 1), %equal(%option1%, 1),
%equal(%team2%, %null%), %equal(%option2%, 1), %equal(%wager%, %null%)),
    %gset(skip, "YES")
    ,
    %if(%or(%equal(%option1%, 3), %equal(%option1%, 4)),
      %if(%equal(%ovun1%, 0.0),
        %gset(error, %error% <FONT COLOR=#FF0000>*** Las Vegas has not set an
Over/Under for this game ***</FONT><BR>)
      )
    )
    %if(%or(%equal(%option2%, 3), %equal(%option2%, 4)),
      %if(%equal(%ovun2%, 0.0),
        %gset(error, %error% <FONT COLOR=#FF0000>*** Las Vegas has not set an
Over/Under for this game ***</FONT><BR>)
      )
    )
    %if(%equal(%wager%, %null%),
      %gset(error, %error% <FONT COLOR=#FF0000>*** Must choose a wager for this
pick ***</FONT><BR>)
    )
    %if(%equal(%team1%, %null%),
      %gset(error, %error% <FONT COLOR=#FF0000>*** Must choose a team from the
first drop down box for this pick ***</FONT><BR>)
    )
    %if(%and(%equal(%type%, 1), %not(%equal(%team2%, %null%))),
      %gset(error, %error% <FONT COLOR=#FF0000>*** Must choose a team ONLY from
the first drop down box ***</FONT><BR>)
    )
    %if(%or(%equal(%type%, 2), %equal(%type%, 5), %equal(%type%, 6)),
      %if(%equal(%team2%, %null%),
        %gset(error, %error% <FONT COLOR=#FF0000>*** Must choose a team in both
drop down boxes for this pick ***</FONT><BR>)
      )
      %if(%and(%equal(%gameid1%, %gameid2%) , %not(%equal(%team1%, %team2%)),
%equal(%option1%, %option2%)),
        %gset(error, %error% <FONT COLOR=#FF0000>*** Pick options CANNOT be
identical if the teams in the drop down boxes are playing each other
***</FONT><BR>)
```

```
      )
      %if(%and(%equal(%gameid1%, %gameid2%) , %equal(%team1%, %team2%),
%equal(%option1%, %option2%)),
        %gset(error, %error% <FONT COLOR=#FF0000>*** Pick options CANNOT be
identical if the teams in the drop down boxes are the same ***</FONT><BR>)
      )
    )
  )
)
%define(pass,
  %null(### START PASS ###)
  <TABLE BORDER=1 CELLPADDING=3 WIDTH=98%>
  %if(%equal(%type%, 1),
    <TR><TD COLSPAN=3><B>%showtype% Pick</B> <FONT COLOR=#008000><B>%wager%
Pts.</B></FONT> [Hit = <B>+%win% Pts.</B> | <FONT COLOR=#FF0000>Miss = <B>%loss%
Pts.</B></FONT>]</TD></TR>
    <TR><TD>(%rname2%/%rname1%)</TD>
    %case(
      %equal(%option1%, 1),  <TD ALIGN=CENTER><FONT
COLOR=#008000><B>%name1%</B></FONT></TD><TD ALIGN=CENTER>Spread = <FONT
COLOR=#008000><B>%spread1%<B></FONT> ,
      %equal(%option1%, 3),  <TD ALIGN=CENTER><FONT
COLOR=#008000><B>Over</B></FONT></TD><TD ALIGN=CENTER>Over/Under = <FONT
COLOR=#008000><B>%ovun1%</B></FONT> ,
      %equal(%option1%, 4),  <TD ALIGN=CENTER><FONT
COLOR=#008000><B>Under</B></FONT></TD><TD ALIGN=CENTER>Over/Under = <FONT
COLOR=#008000><B>%ovun1%</B></FONT>
    )
   ,
    %if(%or(%equal(%type%, 2), %equal(%type%, 5), %equal(%type%, 6)),
      <TR><TD COLSPAN=4><B>%showtype% Pick</B> <FONT COLOR=#008000><B>%wager%
Pts.</B></FONT> [Hit = <B>+%win% Pts.</B> | <FONT COLOR=#FF0000>Miss = <B>%loss%
Pts.</B></FONT>] %if(%or(%equal(%type%, 2), %equal(%type%, 5)), <FONT
COLOR=#008000><BR>*<B>You must hit both games to Hit this
pick</B>*</FONT>)</TD></TR>
      <TR><TD >(%rname2%/%rname1%)</TD>
      %case(
        %equal(%option1%, 1),  <TD ALIGN=CENTER><FONT
COLOR=#008000><B>%name1%</B></FONT></TD><TD ALIGN=CENTER >Spread = <FONT
COLOR=#008000><B>%showspread1%<B></FONT></TD><TD ALIGN=CENTER > <B>AND</B> </TD>
,
        %equal(%option1%, 3),  <TD ALIGN=CENTER><FONT
COLOR=#008000><B>Over</B></FONT></TD><TD ALIGN=CENTER >Over/Under = <FONT
COLOR=#008000><B>%showovun1%</B></FONT></TD><TD ALIGN=CENTER > <B>AND</B> </TD>
,
        %equal(%option1%, 4),  <TD ALIGN=CENTER><FONT
COLOR=#008000><B>Under</B></FONT></TD><TD ALIGN=CENTER >Over/Under = <FONT
COLOR=#008000><B>%showovun1%</B></FONT></TD><TD ALIGN=CENTER > <B>AND</B> </TD>
      )
      <TR><TD >(%sname2%/%sname1%)</TD>
      %case(
        %equal(%option2%, 1),  <TD ALIGN=CENTER ><FONT
COLOR=#008000><B>%name2%</B></FONT></TD><TD ALIGN=CENTER >Spread = <FONT
COLOR=#008000><B>%showspread2%<B></FONT></TD><TD ALIGN=CENTER > - ,
        %equal(%option2%, 3),  <TD ALIGN=CENTER ><FONT
COLOR=#008000><B>Over</B></FONT></TD><TD ALIGN=CENTER >Over/Under = <FONT
COLOR=#008000><B>%showovun2%</B></FONT></TD><TD ALIGN=CENTER > - ,
```

```
        %equal(%option2%, 4),  <TD ALIGN=CENTER ><FONT
COLOR=#008000><B>Under</B></FONT></TD><TD ALIGN=CENTER >Over/Under = <FONT
COLOR=#008000><B>%showovun2%</B></FONT></TD><TD ALIGN=CENTER > -
        )
      )
    )
  %if(%equal(%hideteam%, "YES"),
    <INPUT TYPE=HIDDEN NAME=\"type\" VALUE=\"%type%\">
    <INPUT TYPE=HIDDEN NAME=\"wager\" VALUE=\"%wager%\">
    <INPUT TYPE=HIDDEN NAME=\"option1\" VALUE=\"%option1%\">
    <INPUT TYPE=HIDDEN NAME=\"option2\" VALUE=\"%option2%\">
    <INPUT TYPE=HIDDEN NAME=\"team1\" VALUE=\"%form(team1)\">
    <INPUT TYPE=HIDDEN NAME=\"team2\" VALUE=\"%form(team2)\">
  )
  %if(%equal(%hidepick%, "YES"),
    %if(%equal(%type%, 1),
      <INPUT TYPE=HIDDEN NAME=\"pick%temp%\"
VALUE=\"%wager%#%type%#%option1%#%gameid1%#%team1%#%name1%#%spread1%#%ovun1%####
##\">
    ,
      <INPUT TYPE=HIDDEN NAME=\"pick%temp%\"
VALUE=\"%wager%#%type%#%option1%#%gameid1%#%team1%#%name1%#%spread1%#%ovun1%#%op
tion2%#%gameid2%#%team2%#%name2%#%spread2%#%ovun2%\">
    )
  )
  </TD></TR>
  </TABLE><BR>
)
%define(fail,
  %null(### START FAIL ###)
  %gset(ready, "NO")  %gset(errors, "YES")
  <TABLE BORDER=1 CELLPADDING=3 WIDTH=98%>
    %if(%not(%equal(%error%, %null%)),
      <TR><TD COLSPAN=3 ALIGN=CENTER> %error% </TD></TR>
    )
  <TR>
  <TD COLSPAN=2 ALIGN=CENTER >
    <FONT COLOR=#008000><B>Pick Type:</B></FONT>
    <INPUT TYPE=RADIO NAME=\"type\" VALUE=\"1\" %if(%equal(%type%, 1),
CHECKED)>Straight
    <INPUT TYPE=RADIO NAME=\"type\" VALUE=\"2\" %if(%equal(%type%, 2),
CHECKED)>Tease
    <INPUT TYPE=RADIO NAME=\"type\" VALUE=\"5\" %if(%equal(%type%, 5),
CHECKED)>Parlay
    <INPUT TYPE=RADIO NAME=\"type\" VALUE=\"6\" %if(%equal(%type%, 6),
CHECKED)>Reverse
  </TD>
  <TD ALIGN=CENTER ><INPUT TYPE=IMAGE NAME="CHECK" SRC="fball.gif"
BORDER=0></TD>
  </TR>
  <TR>
  <TD VALIGN=TOP ALIGN=CENTER >
    <INPUT TYPE=RADIO NAME=\"option1\" VALUE="1" %if(%equal(%option1%, 1),
CHECKED)>Spread  <INPUT TYPE=RADIO NAME=\"option1\" VALUE="3"
%if(%equal(%option1%, 3), CHECKED)>Over  <INPUT TYPE=RADIO NAME=\"option1\"
VALUE="4" %if(%equal(%option1%, 4), CHECKED)>Under
    <SELECT NAME=\"team1\">
```

```
    %if(%not(%equal(%team1%, %null%)),
      <OPTION
VALUE=\"%gameid1%#%team1%#%name1%#%spread1%#%ovun1%\">%gameid1%:%name1%:%spread1
%:%ovun1%
      <OPTION VALUE=\"\">----------------------
    )
    <OPTION VALUE=\"\">Select a Team
    %teamlist%
    </SELECT>
  </TD>
  <TD VALIGN=TOP ALIGN=CENTER >
    <INPUT TYPE=RADIO NAME=\"option2\" VALUE="1" %if(%or(%equal(%option2%, 1),
%equal(%option2%, %null%)), CHECKED)>Spread  <INPUT TYPE=RADIO NAME=\"option2\"
VALUE="3" %if(%equal(%option2%, 3), CHECKED)>Over  <INPUT TYPE=RADIO
NAME=\"option2\" VALUE="4" %if(%equal(%option2%, 4), CHECKED)>Under
    <SELECT NAME=\"team2\">
    %if(%not(%equal(%team2%, %null%)),
      <OPTION
VALUE=\"%gameid2%#%team2%#%name2%#%spread2%#%ovun2%\">%gameid2%:%name2%:%spread2
%:%ovun2%
      <OPTION VALUE=\"\">----------------------
    )
    <OPTION VALUE="">Tease/Parlay/Reverse Selection
    %teamlist%
    </SELECT>
  </TD>
  <TD VALIGN=BOTTOM ALIGN=CENTER>
    <BR>
    <SELECT NAME=\"wager\">
    %if(%not(%equal(%wager%, %null%)),
      <OPTION VALUE=\"%wager%\">%wager% Pts.
      <OPTION VALUE=\"\">-------
    )
    <OPTION VALUE="">Wager
    <OPTION VALUE="250">250 Pts.
    <OPTION VALUE="500">500 Pts.
    <OPTION VALUE="750">750 Pts.
    <OPTION VALUE="1000">1000 Pts.
    </SELECT>
  </TD>  </TR>
  <TR>
    <TD BGCOLOR=#C0C0C0 ALIGN=CENTER COLSPAN=2><B> Click on the Football to
Submit your Pick </B></TD>
    <TD BGCOLOR=#C0C0C0 ALIGN=CENTER>%localtime(h:mm AA)</TD>
  </TR>
  </TABLE>
  <P>
)
%define(edit,
  %null(### START EDIT ###)
  <FORM METHOD=GET ACTION="profoot-verify.hmx">
  <INPUT TYPE=HIDDEN NAME="system" VALUE="InsideOdds">
  <INPUT TYPE=HIDDEN NAME="process" VALUE="EDIT">
  <INPUT TYPE=HIDDEN NAME="userinfo" VALUE="%form(userinfo)">
  %gset(count, 1)  %gset(recs, %form(records))
  %varload()  %options()
  %gset(error, %null%)  %fail()
```

```
  %set(step, 1)
  %while(%lte(%step%, %form(records)),
    <INPUT TYPE=HIDDEN NAME=\"pick%step%\" VALUE=\"%form(pick%step%)\">
    %set(step, %iadd(%step%, 1))
  )
)
%define(reviewpicks,
  %null(### START REVIEW PICKS ###)
  %expires:(%iadd(%time%,%imult(60,5)))
  <CENTER>
  <H3>Please choose either the CANCEL or SUBMIT button below.<BR>
  Print this page if you would like a copy of your picks.</H3>
  </CENTER>
  <FORM METHOD=POST ACTION="profoot-verify.hmx">
  <INPUT TYPE=HIDDEN NAME="system" VALUE="InsideOdds">
  <INPUT TYPE=HIDDEN NAME="process" VALUE="DONEPICKS">
  <INPUT TYPE=HIDDEN NAME="userinfo" VALUE="%form(userinfo)">
  %gset(bets, 0)  %gset(money, 0)
  %gset(recs, %form(records))
  %gset(number, %form(records))  %gset(step, 1)
  %while(%lte(%step%, %number%),
    %pickload()    %options()
    %gset(bets, %iadd(%bets%, 1))    %gset(money, %iadd(%money%, %wager%))
    %gset(error, %null%)    %gset(hideteam, "NO")
    %gset(hidepick, "YES")    %gset(temp, %step%)
    %if(%and(%equal(%team1%, %null%), %equal(%type%, %null%), %equal(%option1%,
%null%), %equal(%team2%, %null%), %equal(%option2%, %null%), %equal(%wager%,
%null%)),
      %gset(skip, "YES")
      ,
      %pass()
    )
    %gset(step, %iadd(%step%, 1))
  )
  %varload()  %options()
  %gset(bets, %iadd(%bets%, 1))    %gset(money, %iadd(%money%, %wager%))
  %gset(error, %null%)  %gset(hideteam, "NO")  %gset(hidepick, "YES")
  %gset(temp, %number%)  %gset(temp, %iadd(%temp%, 1))
  %pass()
  %gset(recs, %iadd(%recs%, 1))  %gset(ready, "NO")  %gset(done, "YES")
  <TABLE BORDER=3 CELLPADDING=3 WIDTH=98%>
    <TR><TD VALIGN=CENTER ALIGN=CENTER><B>Total Picks: <FONT
COLOR=#008000>%bets%</B></FONT></TD>
    <TD VALIGN=CENTER ALIGN=CENTER><B>Total Points Wagered: <FONT
COLOR=#008000>%money% </B></FONT></TD></TR>
  </TABLE>
  <P>

  <INPUT TYPE=HIDDEN NAME="records" VALUE="%recs%">
  <TABLE BORDER=3 CELLPADDING=3 WIDTH=98%>
  <TR><TD BGCOLOR=#008000 ALIGN=CENTER>
  <INPUT TYPE=IMAGE NAME="CANCEL" VALUE="CANCEL these Picks" SRC="cancel.gif"
BORDER=0>
  <INPUT TYPE=IMAGE NAME="SUBMIT" VALUE="SUBMIT these Picks" SRC="submit.gif"
BORDER=0>
  </TD></TR></TABLE>
  </FORM>
```

49

```
)
%define(cancelpicks,
  %null(### START CANCEL PICKS ###)
  <CENTER>
  <H2>*** <FONT COLOR=#FF0000>Pick Session Canceled</FONT> ***<BR>
  <A HREF="profoot-pool.hmx">Return to Pick Pools</A><HR></H2>
  </CENTER>
)
%define(submitpicks,
  %null(### START SUBMIT PICKS ###)
  %gset(found, %exists(D:/CBuilder/data/odds/profoot-picks.txt))
  %if(%equal(%found%, %null%),
    %copy(D:/CBuilder/data/odds/profoot-picks.bak,
D:/CBuilder/data/odds/profoot-picks.txt)
  )
  %set(user, %gettoken(%form(userinfo), "#", 0))
  %set(pool, %gettoken(%form(userinfo), "#", 1))
  <CENTER>
  <H2>Your picks have been submitted.</H2>
  <H3>*** <FONT COLOR=#FF0000>DO NOT RELOAD THIS PAGE!</FONT> ***<BR>
  *** <FONT COLOR=#FF0000>IT WILL RE-SUBMIT YOUR PICKS!</FONT> ***<HR></H3>
  <H2><A HREF="profoot-pool.hmx">Return to Pick Pools</A><HR></H2>
  </CENTER>

  %gset(bets, 0)  %gset(money, 0)
  %gset(step, 1)
  %while(%lte(%step%, %form(records)),
    %pickload()    %options()
    %gset(temp, %step%)
    %if(%equal(%type%, 2),
      %case(
        %equal(%option1%, 1),
          %gset(spread1, %fmt(%add(%spread1%, 6),1,".",))
          %if(%not(%equal(%left(%spread1%, 1), -)),
            %gset(spread1, +%spread1%)
          )
        ,
        %equal(%option1%, 3),  %gset(ovun1, %fmt(%sub(%ovun1%, 6),1,".",)),
        %equal(%option1%, 4),  %gset(ovun1, %fmt(%add(%ovun1%, 6),1,".",))
      )
      %case(
        %equal(%option2%, 1),
          %gset(spread2, %fmt(%add(%spread2%, 6),1,".",))
          %if(%not(%equal(%left(%spread2%, 1), -)),
            %gset(spread2, +%spread2%)
          )
        ,
        %equal(%option2%, 3),  %gset(ovun2, %fmt(%sub(%ovun2%, 6),1,".",)),
        %equal(%option2%, 4),  %gset(ovun2, %fmt(%add(%ovun2%, 6),1,".",))
      )
    )
    %csv-appendq(D:/CBuilder/data/odds/profoot-picks.txt, %user%, %pool%,
%type%, %wager%, %option1%, %gameid1%, %team1%, %spread1%, %ovun1%, %option2%,
%gameid2%, %team2%, %spread2%, %ovun2%)
    %gset(step, %iadd(%step%, 1))
  )
```

50

```
)

%case(
  %not(%equal(%form(CHECK.x), %null%)),       %maketeams()  %verify(),
  %not(%equal(%form(EDITONE.x), %null%)),     %maketeams()  %edit(),
  %not(%equal(%form(FINISHED.x), %null%)),    %maketeams()  %reviewpicks(),
  %not(%equal(%form(CANCEL.x), %null%)),      %cancelpicks(),
  %not(%equal(%form(SUBMIT.x), %null%)),      %maketeams()  %submitpicks()
)

%if(%equal(%ready%, "YES"),
  <INPUT TYPE=HIDDEN NAME="records" VALUE="%recs%">
  <TABLE BORDER=1 CELLPADDING=3 WIDTH=98%>
  <TR>
  %if(%and(%equal(%form(FINISHED.x), %null%), %equal(%form(VERIFY.x), %null%),
%equal(%form(SUBMIT.x), %null%)),
    <TD BGCOLOR=#008000 ALIGN=CENTER>
    <INPUT TYPE=IMAGE NAME="EDITONE" SRC="editone.gif" BORDER=0></TD>
  )
  <TD BGCOLOR=#008000 ALIGN=CENTER>
  %set(step, 1)
  %while(%lte(%step%, %form(records)),
    <INPUT TYPE=HIDDEN NAME=\"pick%step%\" VALUE=\"%form(pick%step%)\">
    %set(step, %iadd(%step%, 1))
  )
  <INPUT TYPE=IMAGE NAME="FINISHED" SRC="finished.gif" BORDER=0></TD></FORM>
  <TD BGCOLOR=#008000 ALIGN=CENTER>
  <FORM METHOD=GET ACTION="profoot-form.hmx">
  <INPUT TYPE=HIDDEN NAME="system" VALUE="InsideOdds">
  <INPUT TYPE=HIDDEN NAME="process" VALUE="ANOTHER">
  <INPUT TYPE=HIDDEN NAME="userinfo" VALUE="%form(userinfo)">
  %set(recs, %iadd(%recs%, 1))
  %if(%equal(%type%, 1),
    <INPUT TYPE=HIDDEN NAME=\"pick%recs%\"
VALUE=\"%wager%#%type%#%option1%#%gameid1%#%team1%#%name1%#%spread1%#%ovun1%####
##\">
  ,
    <INPUT TYPE=HIDDEN NAME=\"pick%recs%\"
VALUE=\"%wager%#%type%#%option1%#%gameid1%#%team1%#%name1%#%spread1%#%ovun1%#%op
tion2%#%gameid2%#%team2%#%name2%#%spread2%#%ovun2%\">
  )
  %set(step, 1)
  %while(%lte(%step%, %form(records)),
    <INPUT TYPE=HIDDEN NAME=\"pick%step%\" VALUE=\"%form(pick%step%)\">
    %set(step, %iadd(%step%, 1))
  )
  <INPUT TYPE=HIDDEN NAME="records" VALUE="%recs%">
  <INPUT TYPE=IMAGE NAME="ANOTHER" SRC="another.gif" BORDER=0></TD></FORM>
  </TR></TABLE>
,
  <INPUT TYPE=HIDDEN NAME="records" VALUE="%recs%">
)

<BR><BR>
<CENTER>
<A HREF="/index.html"><IMG SRC="/home.gif" BORDER="0" WIDTH="83"
HEIGHT="45"></A><BR>
```

```
| <A HREF="/index.html">Home Page</A> | <A HREF="index.html">Members Only</A> |
<A HREF="profoot-pool.hmx">Pick Pools</A> |
</CENTER>

<HR>
<P>
<FONT SIZE="2">
Please note this web site and the information contained herein is for
entertainment purposes only. Inside Odds is not responsible for any
associated errors or omissions. Any questions or comments? Drop us a line at
<A HREF="mailto:webmaster@insideodds.com">webmaster@insideodds.com</A>
</FONT>
</P>

</BODY>
</HTML>

PPPPPP  grp-profoot-form.hmx

<HTML>
<HEAD>
<BASE HREF="http://www.insideodds.com/members/">
<!-- BASE HREF="http://localhost/" -->
<META NAME="keywords" CONTENT="Sports, Football, NCAA, NFL, Basketball, NBA,
Odds, Spreads, Line, Picks, Scores, Statistics, Win, Loss">
<TITLE>Inside Odds - Members Only - Pick Pools '97</TITLE>
</HEAD>

<BODY BACKGROUND="back.gif" TEXT=#000000 BGCOLOR=#FFFFFF LINK=#0000FF
VLINK=#0000FF ALINK=#FF0000>

<!-- Inside Odds Home Page Revision 3 -->
<!-- Author: Bret Strachan -->
<!-- Web Design: Andrew Ventura/Bret Strachan -->
<!-- Programming: Dave Anderson -->

%gset(inc, D:/CBuilder/htdocs/odds/timing.inc)
%expand(%include(%inc%))
%setDT()
%if(%equal(%form(records), %null%),
  %gset(records, 0),  %gset(records, %form(records))
)

%define(showlogin,
  <FORM METHOD=POST ACTION="grp-profoot-form.hmx">
  <INPUT TYPE=HIDDEN NAME="system" VALUE="InsideOdds">
  <INPUT TYPE=HIDDEN NAME="process" VALUE="LOGIN">
  <H3>Make Picks for:</H3>
  <PRE>
  User Name... <INPUT TYPE=TEXT SIZE="30" MAXLENGTH="25" NAME="userid">
  Password.... <INPUT TYPE=PASSWORD SIZE="15" MAXLENGTH="10" NAME="password">
<INPUT TYPE=SUBMIT VALUE="SUBMIT">
  </PRE>
  </FORM>
)
%define(showform,
  %gset(teamlist, %null%)
```

```
%set(sqlstmt2, "SELECT * FROM ProfootLine ORDER BY GameID")
%set(async-sql, T)
%try(
  %sql(SportsTicker, %sqlstmt2%,
    %gset(spread, %null%)
    %if(%equal(%left(%column(Spread), 1), -),
      %gset(spread, %gettoken(%column(Spread), "-", 0))
      %gset(homespread, -%spread%)      %gset(awayspread, +%spread%)
    ,
      %gset(spread, %column(Spread))
      %gset(homespread, +%spread%)      %gset(awayspread, -%spread%)
    )
    %if(%equal(%column(OverUnder), 200.0), %gset(OvUn, 0.0), %gset(OvUn,
%column(OverUnder)))
    %checkone()
    %if(%equal(%show%, "YES"),
      %gset(teamlist, %teamlist%<OPTION
VALUE=\"%column(GameID)#%column(HomeID)#%column(HomeName)#%homespread%#%OvUn%\">
%column(GameID):%column(HomeName):%homespread%:%OvUn%%cr%)
      %gset(teamlist, %teamlist%<OPTION
VALUE=\"%column(GameID)#%column(AwayID)#%column(AwayName)#%awayspread%#%OvUn%\">
%column(GameID):%column(AwayName):%awayspread%:%OvUn%%cr%)
    )
  )
  <FORM METHOD=GET ACTION="grp-profoot-verify.hmx">
  <INPUT TYPE=HIDDEN NAME="system" VALUE="InsideOdds">
  <INPUT TYPE=HIDDEN NAME="process" VALUE="CHECK">
  <INPUT TYPE=HIDDEN NAME="userinfo" VALUE=\"%userinfo%\">
  <INPUT TYPE=HIDDEN NAME="records" VALUE=\"%records%\">
  %set(step, 1)
  %while(%lte(%step%, %records%),
    <INPUT TYPE=HIDDEN NAME=\"pick%step%\" VALUE=\"%form(pick%step%)\">
    %set(step, %iadd(%step%, 1))
  )
  <B>%userinfo%</B>
  <TABLE BORDER=1 WIDTH=98%>
  <TR><TH COLSPAN=3>%proweek%</TH></TR>
  <TR>
  <TD COLSPAN=2 ALIGN=CENTER>
    <FONT COLOR=#008000><B>Pick Type:</B></FONT>
    <INPUT TYPE=RADIO NAME=\"type\" VALUE="1" CHECKED>Straight
    <INPUT TYPE=RADIO NAME=\"type\" VALUE="2">Tease
    <INPUT TYPE=RADIO NAME=\"type\" VALUE="5">Parlay
    <INPUT TYPE=RADIO NAME=\"type\" VALUE="6">Reverse
  </TD>
  <TD ALIGN=CENTER><INPUT TYPE=IMAGE NAME="CHECK" SRC="fball.gif"
BORDER=0></TD>
  </TR>
  <TR>
  <TD VALIGN=TOP ALIGN=CENTER>
    <INPUT TYPE=RADIO NAME=\"option1\" VALUE="1" CHECKED>Spread  <INPUT
TYPE=RADIO NAME=\"option1\" VALUE="3">Over  <INPUT TYPE=RADIO NAME=\"option1\"
VALUE="4">Under
    <SELECT NAME=\"team1\">
      <OPTION VALUE="">Select a Team
      %teamlist%
    </SELECT>
```

53

```
--
    </TD>
    <TD VALIGN=TOP ALIGN=CENTER>
      <INPUT TYPE=RADIO NAME=\"option2\" VALUE="1" CHECKED>Spread  <INPUT
TYPE=RADIO NAME=\"option2\" VALUE="3">Over  <INPUT TYPE=RADIO NAME=\"option2\"
VALUE="4">Under
      <SELECT NAME=\"team2\">
        <OPTION VALUE="">Tease/Parlay/Reverse Selection
        %teamlist%
      </SELECT>
    </TD>
    <TD VALIGN=BOTTOM ALIGN=CENTER>
      <BR>
      <SELECT NAME=\"wager\">
        <OPTION VALUE="">Wager
        <OPTION VALUE="250">250 Pts.
        <OPTION VALUE="500">500 Pts.
        <OPTION VALUE="750">750 Pts.
        <OPTION VALUE="1000">1000 Pts.
      </SELECT>
    </TD>
    </TR>
    <TR>
      <TD BGCOLOR=#C0C0C0 ALIGN=CENTER COLSPAN=2><B> Click on the Football
button to Submit your Pick </B></TD>
      <TD BGCOLOR=#C0C0C0 ALIGN=CENTER>%showtime%</TD>
    </TR>
    </TABLE>
    </FORM>
  ,
    <H2><FONT COLOR=FF0000>ERROR Connecting to Game Database</FONT></H2>
    <H3>Message: %exception-msg%</H3>
    <H3>Please contact <A
HREF="mailto:webmaster@insideodds.com">webmaster@insideodds.com</A>
    immediately with this problem.<BR>Be sure to include the error message
above.</H3>
  )
)
%define(notfound,
  <H2><FONT COLOR=#FF0000>USER RECORD NOT FOUND!</FONT></H2>
  <B>Either your User Name does not exist or the Password you entered is
incorrect.</B><BR>
  <P>

  <H2><A HREF="grp-profoot-form.hmx?NEW">Click here to try again</A></H2>
)
%define(validate,
  %set(sqlstmt, "SELECT * FROM Signup WHERE UserID = '%form(userid)' AND
Password = '%form(password)'")
  %set(async-sql, T)
  %gset(uid, %null%)  %gset(pass, %null%)
  %try(
    %sql(IO Members, %sqlstmt%,
      %gset(uid, %column(UserID))    %gset(pass, %column(Password))
    ,,
      %if(%equal(%num-rows(), 0),
        %notfound()
      ,
```

```
        %set(async-sql, T)  %gset(passed, %null%)
        %set(sqlstmt2, "SELECT * FROM Profile WHERE UserID = '%form(userid)'")
        %try(
          %sql(IO Members, %sqlstmt2%,
            %if(%equal(%column(ProFootPick), 1),
              %gset(passed, "YES")  %gset(pickpool, %column(PickPool))
%gset(userid, %column(UserID))
            )
          )
          ,
          <FONT COLOR=FF0000>ERROR Connecting to Members Database<BR>
          Type: %exception-type% | %exception-msg%</FONT>
          Please contact <A
HREF="mailto:webmaster@insideodds.com">webmaster@insideodds.com</A>
          immediately with this problem.<BR> Be sure to include the error
message above.<P>
        )
        %if(%equal(%passed%, %null%),
          <H2><FONT COLOR=#FF0000>You have not registered for access to this
feature. </FONT></H2><P>
          <H3><FONT COLOR=#FF0000>If you believe you have received this message
in error please<BR>
          contact system administration at </FONT> <A
HREF="mailto:webmaster@insideodds.com">webmaster@insideodds.com</A></H3>
          ,
          %gset(userinfo, %userid%#%pickpool%)
          %showform()
        )
      )
    )
    ,
    <FONT COLOR=FF0000>ERROR Connecting to Members Database<BR>
    Type: %exception-type% | %exception-msg%</FONT>
    Please contact <A
HREF="mailto:webmaster@insideodds.com">webmaster@insideodds.com</A>
    immediately with this problem.<BR> Be sure to include the error message
above.<P>
  )
)

%case(
  %equal(%form(process), %null%),      %showlogin(),
  %equal(%form(process), "LOGIN"),     %validate(),
  %equal(%form(process), "ANOTHER"),   %showform()
)

<BR><BR>
<CENTER>
<A HREF="/index.html"><IMG SRC="/home.gif" BORDER="0" WIDTH="83"
HEIGHT="45"></A><BR>
| <A HREF="/index.html">Home Page</A> | <A HREF="index.html">Members Only</A> |
<A HREF="profoot-pool.hmx">Pick Pools</A> |
</CENTER>

<HR>
<P>
<FONT SIZE="2">
```

55

```
Please note this web site and the information contained herein is for
entertainment purposes only. Inside Odds is not responsible for any
associated errors or omissions. Any questions or comments? Drop us a line at
<A HREF="mailto:webmaster@insideodds.com">webmaster@insideodds.com</A>
</FONT>
</P>

</BODY>
</HTML>

PPPPPP  grp-profoot-verify.hmx

<HTML>
<HEAD>
<BASE HREF="http://www.insideodds.com/members/">
<!-- BASE HREF="http://localhost/" -->
<META NAME="keywords" CONTENT="Sports, Football, NCAA, NFL, Basketball, NBA,
Odds, Spreads, Line, Picks, Scores, Statistics, Win, Loss">
<TITLE>Inside Odds - Members Only - Pick Pools '97</TITLE>
</HEAD>

<BODY BACKGROUND="back.gif" TEXT=#000000 BGCOLOR=#FFFFFF LINK=#0000FF
VLINK=#0000FF ALINK=#FF0000>

<!-- Inside Odds Home Page Revision 3 -->
<!-- Author: Bret Strachan -->
<!-- Web Design: Andrew Ventura/Bret Strachan -->
<!-- Programming: Dave Anderson -->

%null(%enumform('%name%=%value%<BR>%crlf%))
%gset(inc, D:/CBuilder/htdocs/odds/timing.inc)
%expand(%include(%inc%))
%setDT()
<TABLE BORDER=1 CELLPADDING=3 WIDTH=98%>
  <TR><TH BGCOLOR=#C0C0C0 COLSPAN=3>%proweek%</TH></TR>
</TABLE>
%define(maketeams,
  %gset(teamlist, %null%)  %gset(gamenum, 0)
  %set(sqlstmt2, "SELECT * FROM ProfootLine ORDER BY GameID")
  %set(async-sql, T)
  %try(
    %sql(SportsTicker, %sqlstmt2%,
      %gset(gamenum, %iadd(%gamenum%, 1))
      %gset(spread, %null%)
      %if(%equal(%left(%column(Spread), 1), -),
        %gset(spread, %gettoken(%column(Spread), "-", 0))
        %gset(homespread, -%spread%)      %gset(awayspread, +%spread%)
      ,
        %gset(spread, %column(Spread))
        %gset(homespread, +%spread%)      %gset(awayspread, -%spread%)
      )
      %if(%equal(%column(OverUnder), 200.0), %gset(OvUn, 0.0), %gset(OvUn,
%column(OverUnder)))
      %checkone()
      %if(%equal(%show%, "YES"),
```

56

```
        %gset(teamlist, %teamlist%<OPTION
VALUE=\"%column(GameID)#%column(HomeID)#%column(HomeName)#%homespread%#%OvUn%\">
%column(GameID):%column(HomeName):%homespread%:%OvUn%%cr%)
        %gset(teamlist, %teamlist%<OPTION
VALUE=\"%column(GameID)#%column(AwayID)#%column(AwayName)#%awayspread%#%OvUn%\">
%column(GameID):%column(AwayName):%awayspread%:%OvUn%%cr%)
        %if(%lt(%gamenum%, 10), %gset(num, 0%gamenum%), %gset(num, %gamenum%))
        %gset(game%num%,
%column(Date)#%column(Time)#%column(AwayID)#%column(AwayName)#%awayspread%#%OvUn
%#%column(HomeID)#%column(HomeName)#%homespread%#%OvUn%)
      )
    )
   ,
    <H2><FONT COLOR=FF0000>ERROR Connecting to Game Database</FONT></H2>
    <H3>Message: %exception-msg%</H3>
    <H3>Please contact <A
HREF="mailto:webmaster@insideodds.com">webmaster@insideodds.com</A>
    immediately with this problem.<BR>Be sure to include the error message
above.</H3>
  )
)
%define(varload,
  %gset(type, %form(type))  %gset(wager, %form(wager))
  %gset(option1, %form(option1))  %gset(option2, %form(option2))
  %gset(gameid1, %gettoken(%form(team1), "#", 0))
  %gset(team1, %gettoken(%form(team1), "#", 1))
  %gset(name1, %gettoken(%form(team1), "#", 2))
  %gset(spread1, %gettoken(%form(team1), "#", 3))
  %gset(ovun1, %gettoken(%form(team1), "#", 4))
  %gset(gameid2, %gettoken(%form(team2), "#", 0))
  %gset(team2, %gettoken(%form(team2), "#", 1))
  %gset(name2, %gettoken(%form(team2), "#", 2))
  %gset(spread2, %gettoken(%form(team2), "#", 3))
  %gset(ovun2, %gettoken(%form(team2), "#", 4))
)
%define(pickload,
  %gset(wager, %gettoken(%form(pick%step%), "#", 0))
  %gset(type, %gettoken(%form(pick%step%), "#", 1))
  %gset(option1, %gettoken(%form(pick%step%), "#", 2))
  %gset(gameid1, %gettoken(%form(pick%step%), "#", 3))
  %gset(team1, %gettoken(%form(pick%step%), "#", 4))
  %gset(name1, %gettoken(%form(pick%step%), "#", 5))
  %gset(spread1, %gettoken(%form(pick%step%), "#", 6))
  %gset(ovun1, %gettoken(%form(pick%step%), "#", 7))
  %gset(option2, %gettoken(%form(pick%step%), "#", 8))
  %gset(gameid2, %gettoken(%form(pick%step%), "#", 9))
  %gset(team2, %gettoken(%form(pick%step%), "#", 10))
  %gset(name2, %gettoken(%form(pick%step%), "#", 11))
  %gset(spread2, %gettoken(%form(pick%step%), "#", 12))
  %gset(ovun2, %gettoken(%form(pick%step%), "#", 13))
)
%define(newload,
  %gset(type, %form(pick%step%type))  %gset(wager, %form(pick%step%wager))
  %gset(option1, %form(pick%step%option1))  %gset(option2,
%form(pick%step%option2))
  %gset(gameid1, %gettoken(%form(pick%step%team1), "#", 0))
  %gset(team1, %gettoken(%form(pick%step%team1), "#", 1))
```

```
  %gset(name1, %gettoken(%form(pick%step%team1), "#", 2))
  %gset(spread1, %gettoken(%form(pick%step%team1), "#", 3))
  %gset(ovun1, %gettoken(%form(pick%step%team1), "#", 4))
  %gset(gameid2, %gettoken(%form(pick%step%team2), "#", 0))
  %gset(team2, %gettoken(%form(pick%step%team2), "#", 1))
  %gset(name2, %gettoken(%form(pick%step%team2), "#", 2))
  %gset(spread2, %gettoken(%form(pick%step%team2), "#", 3))
  %gset(ovun2, %gettoken(%form(pick%step%team2), "#", 4))
)
%define(options,
  %gset(rdate, %gettoken(%expand(%game%gameid1%%), "#", 0))
  %gset(rtime, %gettoken(%expand(%game%gameid1%%), "#", 1))
  %gset(rteam1, %gettoken(%expand(%game%gameid1%%), "#", 2))
  %gset(rname1, %gettoken(%expand(%game%gameid1%%), "#", 3))
  %if(%equal(%team1%, %null%), %gset(name1, %rname1%))
  %gset(rspread1, %gettoken(%expand(%game%gameid1%%), "#", 4))
  %if(%equal(%team1%, %null%), %gset(spread1, %rspread1%))
  %gset(rovun1, %gettoken(%expand(%game%gameid1%%), "#", 5))
  %if(%equal(%team1%, %null%), %gset(ovun1, %rovun1%))
  %gset(rteam2, %gettoken(%expand(%game%gameid1%%), "#", 6))
  %gset(rname2, %gettoken(%expand(%game%gameid1%%), "#", 7))
  %if(%equal(%team2%, %null%), %gset(name2, %rname2%))
  %gset(rspread2, %gettoken(%expand(%game%gameid1%%), "#", 8))
  %gset(rovun2, %gettoken(%form(game%gameid1%), "#", 9))

  %gset(sdate, %gettoken(%expand(%game%gameid2%%), "#", 0))
  %gset(stime, %gettoken(%expand(%game%gameid2%%), "#", 1))
  %gset(steam1, %gettoken(%expand(%game%gameid2%%), "#", 2))
  %gset(sname1, %gettoken(%expand(%game%gameid2%%), "#", 3))
  %gset(sspread1, %gettoken(%expand(%game%gameid2%%), "#", 4))
  %gset(sovun1, %gettoken(%expand(%game%gameid2%%), "#", 5))
  %gset(steam2, %gettoken(%expand(%game%gameid2%%), "#", 6))
  %gset(sname2, %gettoken(%expand(%game%gameid2%%), "#", 7))
  %gset(sspread2, %gettoken(%expand(%game%gameid2%%), "#", 8))
  %gset(sovun2, %gettoken(%expand(%game%gameid2%%), "#", 9))
  %case(
    %equal(%type%, 1),
      %gset(showtype, "STRAIGHT")
      %gset(win, %wager%)      %gset(loss, %fmt(%mult(%wager%,-1.1),0,,))
    ,
    %equal(%type%, 2),
      %gset(showtype, "TEASE")
      %gset(win, %wager%)      %gset(loss, %fmt(%mult(%wager%,-1.2),0,,))
    ,
    %equal(%type%, 5),
      %gset(showtype, "PARLAY")
      %gset(win, %fmt(%mult(%div(%wager%, 5), 12),0,,))  %gset(loss,
%fmt(%mult(%wager%,-1.0),0,,))
    ,
    %equal(%type%, 6),
      %gset(showtype, "REVERSE")
      %gset(win, %fmt(%mult(%wager%, 4),0,,))
      %gset(loss, "<FONT COLOR=#008000>(miss 1)</FONT> ")
      %gset(loss1, %fmt(%mult(%wager%,-1.2),0,,))
      %gset(loss, %concat(%loss%, %loss1%))
      %gset(loss2, %fmt(%mult(%wager%,-2.4),0,,))
      %gset(loss, %concat(%loss%, " Pts. / "))
```

58

```
      %gset(loss, %concat(%loss%, "<FONT COLOR=#008000>(miss both)</FONT> "))
      %gset(loss, %concat(%loss%, %loss2%))
  )
  %if(%equal(%type%, 2),
    %case(
      %equal(%option1%, 1),  %gset(showspread1, %spread1%)  %gset(showspread1,
%fmt(%add(%showspread1%, 6),1,".",))
        %if(%not(%equal(%left(%showspread1%, 1), -)),
          %gset(showspread1, +%showspread1%)
        )
        %gset(showspread1, %concat(%showspread1%, "*"))
      ,
      %equal(%option1%, 3),  %gset(showovun1, %ovun1%)  %gset(showovun1,
%fmt(%sub(%showovun1%, 6),1,".",)) %gset(showovun1, %concat(%showovun1%, "*")),
      %equal(%option1%, 4),  %gset(showovun1, %ovun1%)  %gset(showovun1,
%fmt(%add(%showovun1%, 6),1,".",)) %gset(showovun1, %concat(%showovun1%, "*"))
    )
    %case(
      %equal(%option2%, 1),  %gset(showspread2, %spread2%)  %gset(showspread2,
%fmt(%add(%showspread2%, 6),1,".",))
        %if(%not(%equal(%left(%showspread2%, 1), -)),
          %gset(showspread2, +%showspread2%)
        )
        %gset(showspread2, %concat(%showspread2%, "*"))
      ,
      %equal(%option2%, 3),  %gset(showovun2, %ovun2%)  %gset(showovun2,
%fmt(%sub(%showovun2%, 6),1,".",)) %gset(showovun2, %concat(%showovun2%, "*")),
      %equal(%option2%, 4),  %gset(showovun2, %ovun2%)  %gset(showovun2,
%fmt(%add(%showovun2%, 6),1,".",)) %gset(showovun2, %concat(%showovun2%, "*"))
    )
  ,
    %gset(showspread1, %spread1%)     %gset(showspread2, %spread2%)
    %gset(showovun1, %ovun1%)         %gset(showovun2, %ovun2%)
  )
)
%define(verify,
  %null(### START VERIFY ###)
  <FORM METHOD=GET ACTION="grp-profoot-verify.hmx">
  <INPUT TYPE=HIDDEN NAME="system" VALUE="InsideOdds">
  <INPUT TYPE=HIDDEN NAME="process" VALUE="VERIFY">
  <INPUT TYPE=HIDDEN NAME="userinfo" VALUE="%form(userinfo)">
  %gset(hidepick, "NO")  %gset(hideteam, "YES")  %gset(ready, "YES")
  %gset(recs, %form(records))  %gset(number, %form(records))
  %gset(temp, %iadd(%number%, 1))
  %varload()  %options()  %checkdata()
  %if(%and(%equal(%error%, %null%), %equal(%skip%, "NO")),
    %pass()
  ,
    %if(%not(%equal(%error%, %null%)),
      %fail()
    )
  )
  %if(%equal(%errors%, "YES"),
    %set(step, 1)
    %while(%lte(%step%, %form(records)),
      <INPUT TYPE=HIDDEN NAME=\"pick%step%\" VALUE=\"%form(pick%step%)\">
      %set(step, %iadd(%step%, 1))
```

59

```
    )
  ,
    %if(%equal(%skip%, "YES"),
      <CENTER><H2>NO PICK SELECTED</H2></CENTER>
      %gset(ready, "NO")
    ,
      %gset(ready, "YES")
    )
  )
)
%define(checkdata,
  %null(### START CHECKDATA ###)
  %gset(skip, "NO")  %gset(error, %null%)  %gset(skip, "NO")
  %checktwo()
  %if(%equal(%show1%, "NO"),
    %gset(error, %error% <FONT COLOR=#FF0000>*** Selected game started @ %rtime%
***</FONT><BR>)
  )
  %if(%and(%not(%equal(%team2%, %null%)), %equal(%show2%, "NO")),
    %gset(error, %error% <FONT COLOR=#FF0000>*** Selected game started @ %stime%
***</FONT><BR>)
  )
  %if(%equal(%type%, 999),
     %gset(skip, "YES")      %gset(recs, %isub(%recs%, 1))
  )
  %if(%and(%equal(%team1%, %null%), %equal(%type%, %null%), %equal(%option1%,
%null%), %equal(%team2%, %null%), %equal(%option2%, %null%), %equal(%wager%,
%null%)),
     %gset(skip, "YES")
  )
  %if(%and(%equal(%team1%, %null%), %equal(%type%, 1), %equal(%option1%, 1),
%equal(%team2%, %null%), %equal(%option2%, 1), %equal(%wager%, %null%)),
    %gset(skip, "YES")
    ,
    %if(%or(%equal(%option1%, 3), %equal(%option1%, 4)),
      %if(%equal(%ovun1%, 0.0),
        %gset(error, %error% <FONT COLOR=#FF0000>*** Las Vegas has not set an
Over/Under for this game ***</FONT><BR>)
      )
    )
    %if(%or(%equal(%option2%, 3), %equal(%option2%, 4)),
      %if(%equal(%ovun2%, 0.0),
        %gset(error, %error% <FONT COLOR=#FF0000>*** Las Vegas has not set an
Over/Under for this game ***</FONT><BR>)
      )
    )
    %if(%equal(%wager%, %null%),
      %gset(error, %error% <FONT COLOR=#FF0000>*** Must choose a wager for this
pick ***</FONT><BR>)
    )
    %if(%equal(%team1%, %null%),
      %gset(error, %error% <FONT COLOR=#FF0000>*** Must choose a team from the
first drop down box for this pick ***</FONT><BR>)
    )
    %if(%and(%equal(%type%, 1), %not(%equal(%team2%, %null%))),
      %gset(error, %error% <FONT COLOR=#FF0000>*** Must choose a team ONLY from
the first drop down box ***</FONT><BR>)
```

```
    )
    %if(%or(%equal(%type%, 2), %equal(%type%, 5), %equal(%type%, 6)),
      %if(%equal(%team2%, %null%),
        %gset(error, %error% <FONT COLOR=#FF0000>*** Must choose a team in both
drop down boxes for this pick ***</FONT><BR>)
      )
      %if(%and(%equal(%gameid1%, %gameid2%) , %not(%equal(%team1%, %team2%)),
%equal(%option1%, %option2%)),
        %gset(error, %error% <FONT COLOR=#FF0000>*** Pick options CANNOT be
identical if the teams in the drop down boxes are playing each other
***</FONT><BR>)
      )
      %if(%and(%equal(%gameid1%, %gameid2%) , %equal(%team1%, %team2%),
%equal(%option1%, %option2%)),
        %gset(error, %error% <FONT COLOR=#FF0000>*** Pick options CANNOT be
identical if the teams in the drop down boxes are the same ***</FONT><BR>)
      )
    )
  )
)
%define(pass,
  %null(### START PASS ###)
  <TABLE BORDER=1 CELLPADDING=3 WIDTH=98%>
  %if(%equal(%type%, 1),
    <TR><TD COLSPAN=3><B>%showtype% Pick</B> <FONT COLOR=#008000><B>%wager%
Pts.</B></FONT> [Hit = <B>+%win% Pts.</B> | <FONT COLOR=#FF0000>Miss = <B>%loss%
Pts.</B></FONT>]</TD></TR>
    <TR><TD>(%rname2%/%rname1%)</TD>
    %case(
      %equal(%option1%, 1),  <TD ALIGN=CENTER><FONT
COLOR=#008000><B>%name1%</B></FONT></TD><TD ALIGN=CENTER>Spread = <FONT
COLOR=#008000><B>%spread1%<B></FONT> ,
      %equal(%option1%, 3),  <TD ALIGN=CENTER><FONT
COLOR=#008000><B>Over</B></FONT></TD><TD ALIGN=CENTER>Over/Under = <FONT
COLOR=#008000><B>%ovun1%</B></FONT> ,
      %equal(%option1%, 4),  <TD ALIGN=CENTER><FONT
COLOR=#008000><B>Under</B></FONT></TD><TD ALIGN=CENTER>Over/Under = <FONT
COLOR=#008000><B>%ovun1%</B></FONT>
    )
  ,
    %if(%or(%equal(%type%, 2), %equal(%type%, 5), %equal(%type%, 6)),
      <TR><TD COLSPAN=4><B>%showtype% Pick</B> <FONT COLOR=#008000><B>%wager%
Pts.</B></FONT> [Hit = <B>+%win% Pts.</B> | <FONT COLOR=#FF0000>Miss = <B>%loss%
Pts.</B></FONT>] %if(%or(%equal(%type%, 2), %equal(%type%, 5)), <FONT
COLOR=#008000><BR>*<B>You must hit both games to Hit this
pick</B>*</FONT>)</TD></TR>
      <TR><TD >(%rname2%/%rname1%)</TD>
      %case(
        %equal(%option1%, 1),  <TD ALIGN=CENTER><FONT
COLOR=#008000><B>%name1%</B></FONT></TD><TD ALIGN=CENTER >Spread = <FONT
COLOR=#008000><B>%showspread1%<B></FONT></TD><TD ALIGN=CENTER > <B>AND</B> </TD>
,
        %equal(%option1%, 3),  <TD ALIGN=CENTER><FONT
COLOR=#008000><B>Over</B></FONT></TD><TD ALIGN=CENTER >Over/Under = <FONT
COLOR=#008000><B>%showovun1%</B></FONT></TD><TD ALIGN=CENTER > <B>AND</B> </TD>
,
```

```
        %equal(%option1%, 4),  <TD ALIGN=CENTER><FONT
COLOR=#008000><B>Under</B></FONT></TD><TD ALIGN=CENTER >Over/Under = <FONT
COLOR=#008000><B>%showovun1%</B></FONT></TD><TD ALIGN=CENTER > <B>AND</B> </TD>
      )
      <TR><TD >(%sname2%/%sname1%)</TD>
      %case(
        %equal(%option2%, 1),  <TD ALIGN=CENTER ><FONT
COLOR=#008000><B>%name2%</B></FONT></TD><TD ALIGN=CENTER >Spread = <FONT
COLOR=#008000><B>%showspread2%<B></FONT></TD><TD ALIGN=CENTER > - ,
        %equal(%option2%, 3),  <TD ALIGN=CENTER ><FONT
COLOR=#008000><B>Over</B></FONT></TD><TD ALIGN=CENTER >Over/Under = <FONT
COLOR=#008000><B>%showovun2%</B></FONT></TD><TD ALIGN=CENTER > - ,
        %equal(%option2%, 4),  <TD ALIGN=CENTER ><FONT
COLOR=#008000><B>Under</B></FONT></TD><TD ALIGN=CENTER >Over/Under = <FONT
COLOR=#008000><B>%showovun2%</B></FONT></TD><TD ALIGN=CENTER > -
      )
    )
  )
  %if(%equal(%hideteam%, "YES"),
    <INPUT TYPE=HIDDEN NAME=\"type\" VALUE=\"%type%\">
    <INPUT TYPE=HIDDEN NAME=\"wager\" VALUE=\"%wager%\">
    <INPUT TYPE=HIDDEN NAME=\"option1\" VALUE=\"%option1%\">
    <INPUT TYPE=HIDDEN NAME=\"option2\" VALUE=\"%option2%\">
    <INPUT TYPE=HIDDEN NAME=\"team1\" VALUE=\"%form(team1)\">
    <INPUT TYPE=HIDDEN NAME=\"team2\" VALUE=\"%form(team2)\">
  )
  %if(%equal(%hidepick%, "YES"),
    %if(%equal(%type%, 1),
      <INPUT TYPE=HIDDEN NAME=\"pick%temp%\"
VALUE=\"%wager%#%type%#%option1%#%gameid1%#%team1%#%name1%#%spread1%#%ovun1%####
##\">
      ,
      <INPUT TYPE=HIDDEN NAME=\"pick%temp%\"
VALUE=\"%wager%#%type%#%option1%#%gameid1%#%team1%#%name1%#%spread1%#%ovun1%#%op
tion2%#%gameid2%#%team2%#%name2%#%spread2%#%ovun2%\">
    )
  )
  </TD></TR>
  </TABLE><BR>
)
%define(fail,
  %null(### START FAIL ###)
  %gset(ready, "NO")  %gset(errors, "YES")
  <TABLE BORDER=1 CELLPADDING=3 WIDTH=98%>
    %if(%not(%equal(%error%, %null%)),
      <TR><TD COLSPAN=3 ALIGN=CENTER> %error% </TD></TR>
    )
  <TR>
  <TD COLSPAN=2 ALIGN=CENTER >
    <FONT COLOR=#008000><B>Pick Type:</B></FONT>
    <INPUT TYPE=RADIO NAME=\"type\" VALUE=\"1\" %if(%equal(%type%, 1),
CHECKED)>Straight
    <INPUT TYPE=RADIO NAME=\"type\" VALUE=\"2\" %if(%equal(%type%, 2),
CHECKED)>Tease
    <INPUT TYPE=RADIO NAME=\"type\" VALUE=\"5\" %if(%equal(%type%, 5),
CHECKED)>Parlay
```

62

```
    <INPUT TYPE=RADIO NAME=\"type\" VALUE=\"6\" %if(%equal(%type%, 6),
CHECKED)>Reverse
  </TD>
  <TD ALIGN=CENTER ><INPUT TYPE=IMAGE NAME="CHECK" SRC="fball.gif"
BORDER=0></TD>
  </TR>
  <TR>
  <TD VALIGN=TOP ALIGN=CENTER >
    <INPUT TYPE=RADIO NAME=\"option1\" VALUE="1" %if(%equal(%option1%, 1),
CHECKED)>Spread  <INPUT TYPE=RADIO NAME=\"option1\" VALUE="3"
%if(%equal(%option1%, 3), CHECKED)>Over  <INPUT TYPE=RADIO NAME=\"option1\"
VALUE="4" %if(%equal(%option1%, 4), CHECKED)>Under
    <SELECT NAME=\"team1\">
    %if(%not(%equal(%team1%, %null%)),
      <OPTION
VALUE=\"%gameid1%#%team1%#%name1%#%spread1%#%ovun1%\">%gameid1%:%name1%:%spread1
%:%ovun1%
      <OPTION VALUE=\"\">----------------------
    )
    <OPTION VALUE=\"\">Select a Team
    %teamlist%
    </SELECT>
  </TD>
  <TD VALIGN=TOP ALIGN=CENTER >
    <INPUT TYPE=RADIO NAME=\"option2\" VALUE="1" %if(%or(%equal(%option2%, 1),
%equal(%option2%, %null%)), CHECKED)>Spread  <INPUT TYPE=RADIO NAME=\"option2\"
VALUE="3" %if(%equal(%option2%, 3), CHECKED)>Over  <INPUT TYPE=RADIO
NAME=\"option2\" VALUE="4" %if(%equal(%option2%, 4), CHECKED)>Under
    <SELECT NAME=\"team2\">
    %if(%not(%equal(%team2%, %null%)),
      <OPTION
VALUE=\"%gameid2%#%team2%#%name2%#%spread2%#%ovun2%\">%gameid2%:%name2%:%spread2
%:%ovun2%
      <OPTION VALUE=\"\">----------------------
    )
    <OPTION VALUE="">Tease/Parlay/Reverse Selection
    %teamlist%
    </SELECT>
  </TD>
  <TD VALIGN=BOTTOM ALIGN=CENTER>
    <BR>
    <SELECT NAME=\"wager\">
    %if(%not(%equal(%wager%, %null%)),
      <OPTION VALUE=\"%wager%\">%wager% Pts.
      <OPTION VALUE=\"\">-------
    )
    <OPTION VALUE="">Wager
    <OPTION VALUE="250">250 Pts.
    <OPTION VALUE="500">500 Pts.
    <OPTION VALUE="750">750 Pts.
    <OPTION VALUE="1000">1000 Pts.
    </SELECT>
  </TD>  </TR>
  <TR>
    <TD BGCOLOR=#C0C0C0 ALIGN=CENTER COLSPAN=2><B> Click on the Football to
Submit your Pick </B></TD>
    <TD BGCOLOR=#C0C0C0 ALIGN=CENTER>%localtime(h:mm AA)</TD>
```

63

```
  </TR>
  </TABLE>
  <P>
)
%define(edit,
  %null(### START EDIT ###)
  <FORM METHOD=GET ACTION="grp-profoot-verify.hmx">
  <INPUT TYPE=HIDDEN NAME="system" VALUE="InsideOdds">
  <INPUT TYPE=HIDDEN NAME="process" VALUE="EDIT">
  <INPUT TYPE=HIDDEN NAME="userinfo" VALUE="%form(userinfo)">
  %gset(count, 1)  %gset(recs, %form(records))
  %varload()  %options()
  %gset(error, %null%)  %fail()
  %set(step, 1)
  %while(%lte(%step%, %form(records)),
    <INPUT TYPE=HIDDEN NAME=\"pick%step%\" VALUE=\"%form(pick%step%)\">
    %set(step, %iadd(%step%, 1))
  )
)
%define(reviewpicks,
  %null(### START REVIEW PICKS ###)
  %expires:(%iadd(%time%,%imult(60,5)))
  <CENTER>
  <H3>Please choose either the CANCEL or SUBMIT button below.<BR>
  Print this page if you would like a copy of your picks.</H3>
  </CENTER>
  <FORM METHOD=POST ACTION="grp-profoot-verify.hmx">
  <INPUT TYPE=HIDDEN NAME="system" VALUE="InsideOdds">
  <INPUT TYPE=HIDDEN NAME="process" VALUE="DONEPICKS">
  <INPUT TYPE=HIDDEN NAME="userinfo" VALUE="%form(userinfo)">
  %gset(bets, 0)  %gset(money, 0)
  %gset(recs, %form(records))
  %gset(number, %form(records))  %gset(step, 1)
  %while(%lte(%step%, %number%),
    %pickload()    %options()
    %gset(bets, %iadd(%bets%, 1))    %gset(money, %iadd(%money%, %wager%))
    %gset(error, %null%)    %gset(hideteam, "NO")
    %gset(hidepick, "YES")    %gset(temp, %step%)
    %if(%and(%equal(%team1%, %null%), %equal(%type%, %null%), %equal(%option1%,
%null%), %equal(%team2%, %null%), %equal(%option2%, %null%), %equal(%wager%,
%null%)),
      %gset(skip, "YES")
      ,
      %pass()
    )
    %gset(step, %iadd(%step%, 1))
  )
  %varload()  %options()
  %gset(bets, %iadd(%bets%, 1))    %gset(money, %iadd(%money%, %wager%))
  %gset(error, %null%)  %gset(hideteam, "NO")  %gset(hidepick, "YES")
  %gset(temp, %number%)  %gset(temp, %iadd(%temp%, 1))
  %pass()
  %gset(recs, %iadd(%recs%, 1))  %gset(ready, "NO")  %gset(done, "YES")
  <TABLE BORDER=3 CELLPADDING=3 WIDTH=98%>
    <TR><TD VALIGN=CENTER ALIGN=CENTER><B>Total Picks: <FONT
COLOR=#008000>%bets%</B></FONT></TD>
```

64

```
    <TD VALIGN=CENTER ALIGN=CENTER><B>Total Points Wagered: <FONT
COLOR=#008000>%money% </B></FONT></TD></TR>
  </TABLE>
  <P>

  <INPUT TYPE=HIDDEN NAME="records" VALUE="%recs%">
  <TABLE BORDER=3 CELLPADDING=3 WIDTH=98%>
  <TR><TD BGCOLOR=#008000 ALIGN=CENTER>
  <INPUT TYPE=IMAGE NAME="CANCEL" VALUE="CANCEL these Picks" SRC="cancel.gif"
BORDER=0>
  <INPUT TYPE=IMAGE NAME="SUBMIT" VALUE="SUBMIT these Picks" SRC="submit.gif"
BORDER=0>
  </TD></TR></TABLE>
  </FORM>

)
%define(cancelpicks,
  %null(### START CANCEL PICKS ###)
  <CENTER>
  <H2>*** <FONT COLOR=#FF0000>Pick Session Canceled</FONT> ***<BR>
  <A HREF="profoot-pool.hmx">Return to Pick Pools</A><HR></H2>
  </CENTER>
)
%define(submitpicks,
  %null(### START SUBMIT PICKS ###)
  %gset(found, %exists(D:/CBuilder/data/odds/profoot-picks.txt))
  %if(%equal(%found%, %null%),
    %copy(D:/CBuilder/data/odds/profoot-picks.bak,
D:/CBuilder/data/odds/profoot-picks.txt)
  )
  %set(user, %gettoken(%form(userinfo), "#", 0))
  %set(pool, %gettoken(%form(userinfo), "#", 1))
  <CENTER>
  <H2>Your picks have been submitted.</H2>
  <H3>*** <FONT COLOR=#FF0000>DO NOT RELOAD THIS PAGE!</FONT> ***<BR>
  *** <FONT COLOR=#FF0000>IT WILL RE-SUBMIT YOUR PICKS!</FONT> ***<HR></H3>
  <H2><A HREF="profoot-pool.hmx">Return to Pick Pools</A><HR></H2>

  <H2><A HREF="grp-profoot-form.hmx">Enter another User's Picks</A><HR></H2>
  </CENTER>

  %gset(bets, 0)  %gset(money, 0)
  %gset(step, 1)
  %while(%lte(%step%, %form(records)),
    %pickload()    %options()
    %gset(temp, %step%)
    %if(%equal(%type%, 2),
      %case(
        %equal(%option1%, 1),
          %gset(spread1, %fmt(%add(%spread1%, 6),1,".",))
          %if(%not(%equal(%left(%spread1%, 1), -)),
            %gset(spread1, +%spread1%)
          )
        ,
        %equal(%option1%, 3),  %gset(ovun1, %fmt(%sub(%ovun1%, 6),1,".",)),
        %equal(%option1%, 4),  %gset(ovun1, %fmt(%add(%ovun1%, 6),1,".",))
      )
```

```
      %case(
        %equal(%option2%, 1),
          %gset(spread2, %fmt(%add(%spread2%, 6),1,".",))
          %if(%not(%equal(%left(%spread2%, 1), -)),
            %gset(spread2, +%spread2%)
          )
        ,
        %equal(%option2%, 3),  %gset(ovun2, %fmt(%sub(%ovun2%, 6),1,".",)),
        %equal(%option2%, 4),  %gset(ovun2, %fmt(%add(%ovun2%, 6),1,".",))
      )
    )
    %csv-appendq(D:/CBuilder/data/odds/profoot-picks.txt, %user%, %pool%,
%type%, %wager%, %option1%, %gameid1%, %team1%, %spread1%, %ovun1%, %option2%,
%gameid2%, %team2%, %spread2%, %ovun2%)
    %gset(step, %iadd(%step%, 1))
  )
)

%case(
  %not(%equal(%form(CHECK.x), %null%)),       %maketeams()  %verify(),
  %not(%equal(%form(EDITONE.x), %null%)),     %maketeams()  %edit(),
  %not(%equal(%form(FINISHED.x), %null%)),    %maketeams()  %reviewpicks(),
  %not(%equal(%form(CANCEL.x), %null%)),      %cancelpicks(),
  %not(%equal(%form(SUBMIT.x), %null%)),      %maketeams()  %submitpicks()
)

%if(%equal(%ready%, "YES"),
  <INPUT TYPE=HIDDEN NAME="records" VALUE="%recs%">
  <TABLE BORDER=1 CELLPADDING=3 WIDTH=98%>
  <TR>
  %if(%and(%equal(%form(FINISHED.x), %null%), %equal(%form(VERIFY.x), %null%),
%equal(%form(SUBMIT.x), %null%)),
    <TD BGCOLOR=#008000 ALIGN=CENTER>
    <INPUT TYPE=IMAGE NAME="EDITONE" SRC="editone.gif" BORDER=0></TD>
  )
  <TD BGCOLOR=#008000 ALIGN=CENTER>
  %set(step, 1)
  %while(%lte(%step%, %form(records)),
    <INPUT TYPE=HIDDEN NAME=\"pick%step%\" VALUE=\"%form(pick%step%)\">
    %set(step, %iadd(%step%, 1))
  )
  <INPUT TYPE=IMAGE NAME="FINISHED" SRC="finished.gif" BORDER=0></TD></FORM>
  <TD BGCOLOR=#008000 ALIGN=CENTER>
  <FORM METHOD=GET ACTION="grp-profoot-form.hmx">
  <INPUT TYPE=HIDDEN NAME="system" VALUE="InsideOdds">
  <INPUT TYPE=HIDDEN NAME="process" VALUE="ANOTHER">
  <INPUT TYPE=HIDDEN NAME="userinfo" VALUE="%form(userinfo)">
  %set(recs, %iadd(%recs%, 1))
  %if(%equal(%type%, 1),
    <INPUT TYPE=HIDDEN NAME=\"pick%recs%\"
VALUE=\"%wager%#%type%#%option1%#%gameid1%#%team1%#%name1%#%spread1%#%ovun1%####
##\">
  ,
    <INPUT TYPE=HIDDEN NAME=\"pick%recs%\"
VALUE=\"%wager%#%type%#%option1%#%gameid1%#%team1%#%name1%#%spread1%#%ovun1%#%op
tion2%#%gameid2%#%team2%#%name2%#%spread2%#%ovun2%\">
  )
```

66

```
  %set(step, 1)
  %while(%lte(%step%, %form(records)),
    <INPUT TYPE=HIDDEN NAME=\"pick%step%\" VALUE=\"%form(pick%step%)\">
    %set(step, %iadd(%step%, 1))
  )
  <INPUT TYPE=HIDDEN NAME="records" VALUE="%recs%">
  <INPUT TYPE=IMAGE NAME="ANOTHER" SRC="another.gif" BORDER=0></TD></FORM>
  </TR></TABLE>
,
  <INPUT TYPE=HIDDEN NAME="records" VALUE="%recs%">
)

<BR><BR>
<CENTER>
<A HREF="/index.html"><IMG SRC="/home.gif" BORDER="0" WIDTH="83"
HEIGHT="45"></A><BR>
| <A HREF="/index.html">Home Page</A> | <A HREF="index.html">Members Only</A> |
<A HREF="profoot-pool.hmx">Pick Pools</A> |
</CENTER>

<HR>
<P>
<FONT SIZE="2">
Please note this web site and the information contained herein is for
entertainment purposes only. Inside Odds is not responsible for any
associated errors or omissions. Any questions or comments? Drop us a line at
<A HREF="mailto:webmaster@insideodds.com">webmaster@insideodds.com</A>
</FONT>
</P>

</BODY>
</HTML>

PPPPPP  group.hmx

<HTML>
<HEAD>
<BASE HREF="http://www.insideodds.com/signup/">
<!-- BASE HREF="http://localhost/signup/" -->
<META NAME="keywords" CONTENT="Sports, Football, NCAA, NFL, Basketball, NBA,
Odds, Spreads, Line, Picks, Scores, Statistics, Win, Loss">
<TITLE>Inside Odds - Group Sign-up</TITLE>
</HEAD>

<BODY BACKGROUND="back.gif" TEXT=#000000 BGCOLOR=#FFFFFF LINK=#0000FF
VLINK=#0000FF ALINK=#FF0000>

<!-- Inside Odds Home Page Revision 3 -->
<!-- Author: Bret Strachan -->
<!-- Web Design: Andrew Ventura/Bret Strachan -->
<!-- Programming: Dave Anderson -->

%null(%enumform('%name%=%value%<BR>%crlf%))

%define(showform,
<H2><IMG SRC="/fball.gif"> Group Sign-up <IMG SRC="/fball.gif"><HR></H2>
```

```
<PRE>
User Name......... %uid%

<B>Please verify the following information:</B>

Name............. <INPUT TYPE=TEXT SIZE="50" NAME="fullname" VALUE="%name%">
<B>*</B>
Street Address 1.. <INPUT TYPE=TEXT SIZE="40" NAME="address1" VALUE="%add1%">
<B>*</B>
Street Address 2.. <INPUT TYPE=TEXT SIZE="40" NAME="address2" VALUE="%add2%">
City............. <INPUT TYPE=TEXT SIZE="40" NAME="city" VALUE="%city%">
<B>*</B>
State............ <INPUT TYPE=TEXT SIZE="4" MAXLENGTH="2" NAME="state"
VALUE="%state%"> <B>*</B>
ZIP/Postal Code... <INPUT TYPE=TEXT SIZE="15" MAXLENGTH="12" NAME="zip"
VALUE="%zip%"> <B>*</B>
E-Mail Address.... <INPUT TYPE=TEXT SIZE="40" NAME="email" VALUE="%email%">
<B>*</B>

<B>* All Fields required for Credit Card Validation</B>

<IMG SRC="master.gif" BORDER=0> <IMG SRC="visa.gif" BORDER=0>
Credit Card Number <INPUT TYPE=TEXT SIZE="5" MAXLENGTH="4" NAME="cardnum1"
VALUE="%form(cardnum1)"> <INPUT TYPE=TEXT SIZE="5" MAXLENGTH="4" NAME="cardnum2"
VALUE="%form(cardnum2)"> <INPUT TYPE=TEXT SIZE="5" MAXLENGTH="4" NAME="cardnum3"
VALUE="%form(cardnum3)"> <INPUT TYPE=TEXT SIZE="5" MAXLENGTH="4" NAME="cardnum4"
VALUE="%form(cardnum4)"> <B>[XXXX XXXX XXXX XXXX]</B>
Expiration Date... <INPUT TYPE=TEXT SIZE="15" NAME="expdate"
VALUE="%form(expdate)"> <B>[MM/YY]</B>

Enter the Username of each additional group member below.
</PRE>
<B>Additional Users</B><P>
%if(%gt(%users%, 1),
  %set(count, 1)  %set(loop, %users%)  %set(loop, %isub(%loop%, 1))
  %while(%lte(%count%, %loop%),
    <INPUT TYPE=TEXT SIZE="30" MAXLENGTH="25" NAME="user%count%"
VALUE=\"%form(%expand(user%count%))\">  %if(%equal(%expand(%user%count%%),
"NO"), <FONT COLOR=#FF0000><B>[User Name NOT Found]</B></FONT>)
    <BR>
    %set(count, %iadd(%count%, 1))
  )
  <P>

<INPUT TYPE=TEXT SIZE="30" MAXLENGTH="25" NAME="user1"><BR>
<INPUT TYPE=TEXT SIZE="30" MAXLENGTH="25" NAME="user2"><BR>
<INPUT TYPE=TEXT SIZE="30" MAXLENGTH="25" NAME="user3"><BR>
<INPUT TYPE=TEXT SIZE="30" MAXLENGTH="25" NAME="user4"><BR>
<INPUT TYPE=TEXT SIZE="30" MAXLENGTH="25" NAME="user5"><BR>
<INPUT TYPE=TEXT SIZE="30" MAXLENGTH="25" NAME="user6"><BR>
<INPUT TYPE=TEXT SIZE="30" MAXLENGTH="25" NAME="user7"><BR>
<INPUT TYPE=TEXT SIZE="30" MAXLENGTH="25" NAME="user8"><BR>
<INPUT TYPE=TEXT SIZE="30" MAXLENGTH="25" NAME="user9"><BR>
<INPUT TYPE=TEXT SIZE="30" MAXLENGTH="25" NAME="user10"><BR>
<INPUT TYPE=TEXT SIZE="30" MAXLENGTH="25" NAME="user11"><BR>
<INPUT TYPE=TEXT SIZE="30" MAXLENGTH="25" NAME="user12"><BR>
<INPUT TYPE=TEXT SIZE="30" MAXLENGTH="25" NAME="user13"><BR>
```

68

```
<INPUT TYPE=TEXT SIZE="30" MAXLENGTH="25" NAME="user14"><BR>
<INPUT TYPE=TEXT SIZE="30" MAXLENGTH="25" NAME="user15"><BR>
<INPUT TYPE=TEXT SIZE="30" MAXLENGTH="25" NAME="user16"><BR>
<INPUT TYPE=TEXT SIZE="30" MAXLENGTH="25" NAME="user17"><BR>
<INPUT TYPE=TEXT SIZE="30" MAXLENGTH="25" NAME="user18"><BR>
<INPUT TYPE=TEXT SIZE="30" MAXLENGTH="25" NAME="user19">
<P>
)
%if(%gte(%users%, 10),
<B>Groups of 10 or more may choose their Pool Name</B><P>
Pool Name... <INPUT TYPE=TEXT SIZE="15" MAXLENGTH="10" NAME="pool"
VALUE="%form(pool)">
<P>
)
<CENTER>
<H3>Please be patient. Credit Card Validation may take up to a minute.</H3>
<INPUT TYPE=SUBMIT VALUE="Complete Sign-up"> <INPUT TYPE=RESET VALUE="Reset ALL
Fields">
</CENTER>
</FORM>
)
%define(setmodified,
  '%regopenkey(HKEY_LOCAL_MACHINE\\Software\\InternetFactory\\CBuilder,
    '%regsetdwordvalue("LastMod",%time%)
  )
)
%define(checkother,
  %set(UserID, %sql-quote(%form(%expand(user%count%))))
  %set(sqlstmt, "SELECT UserID, Password FROM Signup WHERE UserID = %UserID%")
  %set(async-sql, T)
  %try(
    %sql(IO Members, %sqlstmt%,
      %gset(pass%count%, %column(Password))
    ,,
      %if(%equal(%num-rows(), 0),
        %gset(user%count%, "NO")
        ,
        %gset(user%count%, "YES")
      )
    )
  ,
    <FONT COLOR=FF0000>ERROR Connecting to Members Database<BR>
    Type: %exception-type% | %exception-msg%</FONT>
    Please contact <A
HREF="mailto:webmaster@insideodds.com">webmaster@insideodds.com</A>
    immediately with this problem.<BR> Be sure to include the error message
above.<P>
  )
)
%define(gocardin,
  %gset(input, %enumform('%name%=%url-encode(%value%)&))
  %gset(order, %null%)
  %try(
    %exec(perl d:\\cbuilder\\htdocs\\odds\\signup\\cardin.cgi %input%)
  ,
    <FONT COLOR=FF0000>ERROR executing Credit Card Validation<BR>
    Type: %exception-type% | %exception-msg%</FONT>
```

```
  )
  %if(%equal(%order%, %null%),
    %gset(date, %localtime(yymmdd))
    %gset(time, %localtime(hhmmss))
    %gset(order, IO-%date%-%time%)
  )
  %csv-appendq(D:/cbuilder/data/odds/payment.txt, %order%, %form(userid),
%form(option))
  %set(count, 1)  %set(loop, %users%)  %set(loop, %isub(%loop%, 1))
  %while(%lte(%count%, %loop%),
    %csv-appendq(D:/cbuilder/data/odds/payment.txt, %order%,
%form(%expand(user%count%)), %form(option))
    %set(count, %iadd(%count%, 1))
  )
  %if(%equal(%return%, "TRUE"),
    %set(async-sql, T)
    %null(UPDATE Members User: %form(userid)<BR>)
    %set(sqlstmt, UPDATE Signup SET Transaction = '%order%'\, Service =
'%form(option)' WHERE UserID = '%form(userid)')
    %try(
      %sql(IO Members, %sqlstmt%,
      )
    ,
      <FONT COLOR=FF0000>ERROR Updating Members Database<BR>
      Type: %exception-type% | %exception-msg%</FONT>
      Please contact <A
HREF="mailto:webmaster@insideodds.com">webmaster@insideodds.com</A>
      immediately with this problem.<BR> Be sure to include the error message
above.<P>
    )
    %set(count, 1)  %set(loop, %users%)  %set(loop, %isub(%loop%, 1))
    %while(%lte(%count%, %loop%),
      %null(UPDATE Members User: %form(%expand(user%count%))<BR>)
      %set(sqlstmt, UPDATE Signup SET Transaction = '%order%'\, Service =
'%form(option)' WHERE UserID = '%form(%expand(user%count%))')
      %try(
        %sql(IO Members, %sqlstmt%,
        )
      ,
        <FONT COLOR=FF0000>ERROR Updating Members Database<BR>
        Type: %exception-type% | %exception-msg%</FONT>
        Please contact <A
HREF="mailto:webmaster@insideodds.com">webmaster@insideodds.com</A>
        immediately with this problem.<BR> Be sure to include the error message
above.<P>
      )
      %set(count, %iadd(%count%, 1))
    )
    %if(%equal(%form(option), "BOTH"),
      %set(showopt, "PICK POOLS '97 AND GAME DAY '97")
      %if(%not(%equal(%form(pool), %null%)),
        %gset(pool, %form(pool))
      ,
        %gset(pool, %order%)
      )
      %gset(options, "GameDay = 1, ProFootDB = 1, ColgFootDB = 1, ProFootPick =
1, ColgFootPick = 1, PickPool = '%pool%'")
```

```
    )
    %null(UPDATE Access User: %form(userid)<BR>)
    %set(sqlstmt, UPDATE Profile SET %options% WHERE UserID = '%form(userid)')
    %try(
      %sql(IO Members, %sqlstmt%,
      )
      ,
      <FONT COLOR=FF0000>ERROR Updating Member Profile Database<BR>
      Type: %exception-type% | %exception-msg%</FONT>
      Please contact <A
HREF="mailto:webmaster@insideodds.com">webmaster@insideodds.com</A>
      immediately with this problem.<BR> Be sure to include the error message
above.<P>
    )
    %set(count, 1)  %set(loop, %users%)  %set(loop, %isub(%loop%, 1))
    %while(%lte(%count%, %loop%),
      %null(UPDATE Access User: %form(%expand(user%count%))<BR>)
      %set(sqlstmt, UPDATE Profile SET %options% WHERE UserID =
'%form(%expand(user%count%))')
      %try(
        %sql(IO Members, %sqlstmt%,
        )
        ,
        <FONT COLOR=FF0000>ERROR Updating Member Profile Database<BR>
        Type: %exception-type% | %exception-msg%</FONT>
        Please contact <A
HREF="mailto:webmaster@insideodds.com">webmaster@insideodds.com</A>
        immediately with this problem.<BR> Be sure to include the error message
above.<P>
      )
      %set(count, %iadd(%count%, 1))
    )
    %try(
      %set(CBPath,HKEY_LOCAL_MACHINE\\SOFTWARE\\InternetFactory\\CBuilder)
      %set(RegPath, 80:205.130.249.193)
      %set(UserKey,%cbpath%\\HTTP\\Servers\\%RegPath%\\Users)
      %regcreatekey(%UserKey%, %regsetstringvalue(%form(userid),
%form(password)))
      %set(UserKey,%cbpath%\\HTTP\\Servers\\%RegPath%\\Groups\\iomembers)
      %regcreatekey(%UserKey%, %regsetstringvalue(%form(userid), %null%))
      ,
      <FONT COLOR=FF0000>ERROR Adding Member to Access file<BR>
      Type: %exception-type% | %exception-msg%</FONT>
      Please contact <A
HREF="mailto:webmaster@insideodds.com">webmaster@insideodds.com</A>
      immediately with this problem.<BR> Be sure to include the error message
above.<P>
    )
    %set(count, 1)  %set(loop, %users%)  %set(loop, %isub(%loop%, 1))
    %while(%lte(%count%, %loop%),
      %try(
        %set(CBPath,HKEY_LOCAL_MACHINE\\SOFTWARE\\InternetFactory\\CBuilder)
        %set(RegPath, 80:205.130.249.193)
        %set(UserKey,%cbpath%\\HTTP\\Servers\\%RegPath%\\Users)
        %regcreatekey(%UserKey%, %regsetstringvalue(%form(%expand(user%count%)),
%expand(%pass%count%%)))
        %set(UserKey,%cbpath%\\HTTP\\Servers\\%RegPath%\\Groups\\iomembers)
```

71

```
        %regcreatekey(%UserKey%, %regsetstringvalue(%form(%expand(user%count%)),
%null%))
        ,
        <FONT COLOR=FF0000>ERROR Adding Member to Access file<BR>
        Type: %exception-type% | %exception-msg%</FONT>
        Please contact <A
HREF="mailto:webmaster@insideodds.com">webmaster@insideodds.com</A>
        immediately with this problem.<BR> Be sure to include the error message
above.<P>
       )
       %set(count, %iadd(%count%, 1))
     )
     %setmodified()

     <H2>Order Number %order% Accepted.</H2>
     %if(%not(%equal(%form(pool), %null%)), <H2>Pick Pool %form(pool)
Created.</H2>)
     The following User Names have been activated for access to <B>%showopt%</B>.
     <P>
     If any are unable to access the <B><I>Members Only</I></B> area
     please E-mail us at <A HREF="mailto:membership\@insideodds.com?Subject=Group
Access">Inside Odds Membership</A>.
     Be sure to include the User Name\, Password\, and Order Number in the
message.
     <H3>
     <FONT COLOR=#008000>Group Leader</FONT><BR>
     User Name: %form(userid)<BR>
     </H3>
     <P>
     %set(count, 1)  %set(loop, %users%)  %set(loop, %isub(%loop%, 1))
     %while(%lte(%count%, %loop%),
       <H3>
       User Name: %form(%expand(user%count%))<BR>
       </H3>
       %set(count, %iadd(%count%, 1))
     )
     <P>
   ,
     %text-append(D:/cbuilder/data/odds/payment.log, %input%%cr%)
     <H2>An error has occurred during Credit Card Validation</H2>
     <H3>The transaction for Order Number %order% was recorded</H3>
     Please E-mail us at <A HREF="mailto:membership\@insideodds.com?Subject=Group
Sign-up">Inside Odds Membership</A>.
     Be sure to include the User Names\, Passwords\, and Order Number in the
message.
   )
   %sql-flushconnection(IO Members)
)
%define(notfound,
  <H2><FONT COLOR=#FF0000>USER RECORD NOT FOUND!</FONT></H2>
  Either your User Name does not exist or the Password you entered is incorrect.

  <UL>
  <LI><A HREF="group.hmx?NEW">Re-enter your User Name and Password</A><P>
  <B>OR</B><P>
  <LI><A HREF="request.hmx">Goto Request a User Name and Password Form</A>
  </UL>
```

```
  <P>
  %sql-flushconnection(IO Members)
)
%define(check,
  %set(UserID, %sql-quote(%form(userid)))  %set(Password, %sql-
quote(%form(password)))
  %set(sqlstmt, "SELECT * FROM Signup WHERE UserID = %UserID% AND Password =
%Password%")
  %set(async-sql, T)
  %gset(recs, 0)
  %gset(uid, %null%)  %gset(pwd, %null%)
  %gset(name, %null%)  %gset(expdate, %null%)
  %gset(add1, %null%)  %gset(add2, %null%)  %gset(city, %null%)
  %gset(state, %null%)  %gset(zip, %null%)  %gset(email, %null%)
  %try(
    %sql(IO Members, %sqlstmt%,
      %gset(recs, %iadd(%recs%, 1))
      %gset(uid, %column(UserID))    %gset(pwd, %column(Password))
      %gset(name, %column(Name))
      %gset(add1, %column(Address1))  %gset(add2, %column(Address2))
      %gset(city, %column(City))  %gset(state, %column(State))
      %gset(zip, %column(Zip))  %gset(email, %column(EMail))
    ,,
      %if(%equal(%num-rows(), 0),
        %notfound()
      ,
        %if(%equal(%form(option), "BOTH"),
          %set(showopt, "PICK POOLS '97 AND GAME DAY '97")  %set(per, "30")
        )
        %case(
          %not(%equal(%form(user19), %null%)),
            %gset(users, 20),
          %not(%equal(%form(user18), %null%)),
            %gset(users, 19),
          %not(%equal(%form(user17), %null%)),
            %gset(users, 18),
          %not(%equal(%form(user16), %null%)),
            %gset(users, 17),
          %not(%equal(%form(user15), %null%)),
            %gset(users, 16),
          %not(%equal(%form(user14), %null%)),
            %gset(users, 15),
          %not(%equal(%form(user13), %null%)),
            %gset(users, 14),
          %not(%equal(%form(user12), %null%)),
            %gset(users, 13),
          %not(%equal(%form(user11), %null%)),
            %gset(users, 12),
          %not(%equal(%form(user10), %null%)),
            %gset(users, 11),
          %not(%equal(%form(user9), %null%)),
            %gset(users, 10),
          %not(%equal(%form(user8), %null%)),
            %gset(users, 9),
          %not(%equal(%form(user7), %null%)),
            %gset(users, 8),
          %not(%equal(%form(user6), %null%)),
```

73

```
            %gset(users, 7),
          %not(%equal(%form(user5), %null%)),
            %gset(users, 6),
          %not(%equal(%form(user4), %null%)),
            %gset(users, 5),
          %not(%equal(%form(user3), %null%)),
            %gset(users, 4),
          %not(%equal(%form(user2), %null%)),
            %gset(users, 3),
          %not(%equal(%form(user1), %null%)),
            %gset(users, 2),
          %equal(%form(user1), %null%),
            %gset(users, 1)
        )
        %set(count, 1)  %set(loop, %users%)  %set(loop, %isub(%loop%, 1))
        %gset(totalusers, %users%)
        %while(%lte(%count%, %loop%),
          %checkother()
          %if(%equal(%expand(%user%count%%), "NO"),
            %gset(usererr, "YES")
            %gset(totalusers, %isub(%totalusers%, 1))
          )
          %set(count, %iadd(%count%, 1))
        )
        %if(%equal(%userrerr%, "YES"), <B>One or more User Names NOT
Found!</B><HR>)
        %if(%equal(%form(user1), %null%),
          <B>You must enter at least one ADDITIONAL User Name!</B><HR>
          %gset(totalusers, 1)
        )
        %if(%not(%equal(%users%, %null%)),
          %gset(price, %imult(%per%, %totalusers%))
        ,
          %gset(price, "30")
        )
        %update_display()
      )
    )
   ,
    <FONT COLOR=FF0000>ERROR Connecting to Members Database<BR>
    Type: %exception-type% | %exception-msg%</FONT>
    Please contact <A
HREF="mailto:webmaster@insideodds.com">webmaster@insideodds.com</A>
    immediately with this problem.<BR> Be sure to include the error message
above.<P>
  )
)
%define(validate,
  %if(%equal(%form(fullname), %null%),
    <FONT COLOR=#FF0000><B>Name is a Required field!</B></FONT><BR>
    %gset(errors, "YES")
  )
  %if(%equal(%form(address1), %null%),
    <FONT COLOR=#FF0000><B>Street Address is a Required field!</B></FONT><BR>
    %gset(errors, "YES")
  )
  %if(%equal(%form(city), %null%),
```

```
    <FONT COLOR=#FF0000><B>City is a Required field!</B></FONT><BR>
    %gset(errors, "YES")
  )
  %if(%equal(%form(state), %null%),
    <FONT COLOR=#FF0000><B>State is a Required field!</B></FONT><BR>
    %gset(errors, "YES")
  )
  %if(%equal(%form(zip), %null%),
    <FONT COLOR=#FF0000><B>ZIP/Postal Code is a Required field!</FONT></B><BR>
    %gset(errors, "YES")
  )
  %if(%equal(%form(email), %null%),
    <FONT COLOR=#FF0000><B>E-Mail Address is a Required field!</B></FONT><BR>
    %gset(errors, "YES")
  )
  %gset(CardNo, %verify-
card(%form(cardnum1)%form(cardnum2)%form(cardnum3)%form(cardnum4)))
  %if(%or(%equal(%CardNo%, %null%), %equal(%CardNo%, "unknown")),
    <FONT COLOR=#FF0000><B>Invalid credit card number!</B></FONT><BR>
    %gset(errors, "YES")
  )
  %if(%equal(%form(expdate), %null%),
    <FONT COLOR=#FF0000><B>Expiration Date is a Required field!</B></FONT><BR>
    %gset(errors, "YES")
  )
  %if(%equal(%form(user1), %null%),
    <FONT COLOR=#FF0000><B>You must enter at least one ADDITIONAL User
Name!</B></FONT><BR>
    %gset(errors, "YES")
  )

  %if(%equal(%form(option), "BOTH"),
    %set(showopt, "PICK POOLS '97 AND GAME DAY '97")  %set(per, "30")
  )
  %case(
    %not(%equal(%form(user19), %null%)),
      %gset(users, 20),
    %not(%equal(%form(user18), %null%)),
      %gset(users, 19),
    %not(%equal(%form(user17), %null%)),
      %gset(users, 18),
    %not(%equal(%form(user16), %null%)),
      %gset(users, 17),
    %not(%equal(%form(user15), %null%)),
      %gset(users, 16),
    %not(%equal(%form(user14), %null%)),
      %gset(users, 15),
    %not(%equal(%form(user13), %null%)),
      %gset(users, 14),
    %not(%equal(%form(user12), %null%)),
      %gset(users, 13),
    %not(%equal(%form(user11), %null%)),
      %gset(users, 12),
    %not(%equal(%form(user10), %null%)),
      %gset(users, 11),
    %not(%equal(%form(user9), %null%)),
      %gset(users, 10),
```

75

```
    %not(%equal(%form(user8), %null%)),
      %gset(users, 9),
    %not(%equal(%form(user7), %null%)),
      %gset(users, 8),
    %not(%equal(%form(user6), %null%)),
      %gset(users, 7),
    %not(%equal(%form(user5), %null%)),
      %gset(users, 6),
    %not(%equal(%form(user4), %null%)),
      %gset(users, 5),
    %not(%equal(%form(user3), %null%)),
      %gset(users, 4),
    %not(%equal(%form(user2), %null%)),
      %gset(users, 3),
    %not(%equal(%form(user1), %null%)),
      %gset(users, 2),
    %equal(%form(user1), %null%),
      %gset(users, 1)
  )
  %set(count, 1)  %set(loop, %users%)  %set(loop, %isub(%loop%, 1))
  %gset(totalusers, %users%)
  %while(%lte(%count%, %loop%),
    %checkother()
    %if(%equal(%expand(%user%count%%), "NO"),
      %gset(usererr, "YES")
      %gset(totalusers, %isub(%totalusers%, 1))
    )
    %set(count, %iadd(%count%, 1))
  )
  %if(%equal(%userrerr%, "YES"), <B>One or more User Names NOT Found!</B><HR>)
  %if(%equal(%form(user1), %null%),
    <B>You must enter at least one ADDITIONAL User Name!</B><HR>
    %gset(totalusers, 1)
  )
  %if(%not(%equal(%users%, %null%)),
    %gset(price, %imult(%per%, %totalusers%))
  ,
    %gset(price, "30")
  )
  %if(%or(%equal(%errors%, "YES"), %equal(%usererr%, "YES")),
    %gset(uid, %form(userid))    %gset(pwd, %form(password))
    %gset(name, %form(fullname))
    %gset(add1, %form(address1))  %gset(add2, %form(address2))
    %gset(city, %form(city))  %gset(state, %form(state))
    %gset(zip, %form(zip))  %gset(email, %form(email))
    %update_display()
  ,
    %gocardin()
  )
)
%case(
  %equal(%form(process), %null%),       %showform(),
  %equal(%form(process), "CHECK"),      %check(),
  %equal(%form(process), "VALIDATE"),   %validate()
)

<BR><BR>
```

76

```
<CENTER>
<A HREF="/index.html"><IMG SRC="/home.gif" BORDER="0" WIDTH="83"
HEIGHT="45"></A><BR>
| <A HREF="/index.html">Home Page</A> | <A HREF="/signup/">Sign-up</A> |
</CENTER>

<HR>
<P>
<FONT SIZE="2">
Please note this web site and the information contained herein is for
entertainment purposes only. Inside Odds is not responsible for any
associated errors or omissions. Any questions or comments? Drop us a line at
<A HREF="mailto:webmaster\@insideodds.com">webmaster\@insideodds.com</A>
</FONT>
</P>

</BODY>
</HTML>

PPPPPP  request.hmx

<HTML>
<HEAD>
<BASE HREF="http://www.insideodds.com/signup/">
<!-- BASE HREF="http://localhost/signup/" -->
<META NAME="keywords" CONTENT="Sports, Football, NCAA, NFL, Basketball, NBA,
Odds, Spreads, Line, Picks, Scores, Statistics, Win, Loss">
<TITLE>Inside Odds - Request User Name and Password</TITLE>
</HEAD>

<BODY BACKGROUND="back.gif" TEXT=#000000 BGCOLOR=#FFFFFF LINK=#0000FF
VLINK=#0000FF ALINK=#FF0000>

<!-- Inside Odds Home Page Revision 3 -->
<!-- Author: Bret Strachan -->
<!-- Web Design: Andrew Ventura/Bret Strachan -->
<!-- Programming: Dave Anderson -->

%null(%enumform('%name%=%value%<BR>%crlf%))

%define(showform,
<H2><IMG SRC="/fball.gif"> Request a User Name and Password <IMG
SRC="/fball.gif"><HR></H2>

<FONT SIZE=+1>There is <B>NO CHARGE</B> for making this request!</FONT><BR>
<FONT COLOR=#FF0000>Your User Name and Password will ONLY be activated
once you complete the Sign-up process.</FONT>
Everyone who wishes to subscribe to one or more of our Membership services
must complete this process.  Once you have a User Name and Password you will
be able to Sign-up for our <FONT SIZE=+1><B>Pick Pool</B></FONT> and/or
<FONT SIZE=+1><B>Game Day</B></FONT> services\, as well as any future
services we may offer.
<P>

<FONT COLOR=#008000 SIZE=+1><B>Follow these simple instructions:</B></FONT>
<P>
```

```
<B>1.</B> Enter all the requested information below. Choose your preferred User
Name
and Password which should be at least 4 characters long. If the User Name is
already in use you will receive the message <FONT COLOR=#FF0000>Please choose a
different User Name
and Password</FONT>.
<P>

<B>2.</B> Once you have completed
this process\, simply click the "Sign-up" button on our home to sign-up for
our Game Day and/or Pick Pool services.
<P>

<FORM METHOD=POST ACTION="request.hmx">
<INPUT TYPE=HIDDEN NAME="system" VALUE="IO">
<INPUT TYPE=HIDDEN NAME="process" VALUE="CHECK">
<PRE>
User Name......... <INPUT TYPE=TEXT SIZE="30" MAXLENGTH="25" NAME="userid">
Password.......... <INPUT TYPE=TEXT SIZE="15" MAXLENGTH="10" NAME="password">
<B>[Remember: Your Password will be case-sensitive during login]</B>

Name.............. <INPUT TYPE=TEXT SIZE="40" NAME="fullname"> <B>*</B>
Street Address.... <INPUT TYPE=TEXT SIZE="40" NAME="address1"> <B>*</B>
                   <INPUT TYPE=TEXT SIZE="40" NAME="address2">
City.............. <INPUT TYPE=TEXT SIZE="40" NAME="city"> <B>*</B>
State............. <INPUT TYPE=TEXT SIZE="4" MAXLENGTH="2" NAME="state">
<B>*</B>
ZIP/Postal Code... <INPUT TYPE=TEXT SIZE="15" MAXLENGTH="12" NAME="zip">
<B>*</B>
E-Mail Address.... <INPUT TYPE=TEXT SIZE="40" NAME="email"> <B>*</B>
[will be used to send verification of sign-up]

<B>* These fields are required for Sign-up.
Your mailing address is for our records only.
This information will NOT be sold to any mailing lists.</B>
</PRE>

<CENTER><INPUT TYPE=SUBMIT VALUE="Submit Information"> <INPUT TYPE=RESET
VALUE="Clear ALL Fields"></CENTER>
</FORM>
)
%define(update_display,
  <FORM METHOD=POST ACTION="request.hmx">
  <INPUT TYPE=HIDDEN NAME="system" VALUE="IO">
  <INPUT TYPE=HIDDEN NAME="process" VALUE="VALIDATE">
  %if(%or(%equal(%found%, "YES"), %equal(%form(userid), %null%)),
    <HR>
    <PRE>
User Name......... <INPUT TYPE=TEXT SIZE="30" MAXLENGTH="25" NAME="userid">
Password.......... <INPUT TYPE=TEXT SIZE="15" MAXLENGTH="10" NAME="password">
<B>[Remember: Your Password will be case-sensitive during login]</B>
  ,
    <HR>
    <INPUT TYPE=HIDDEN NAME="userid" VALUE="%form(userid)">
    <INPUT TYPE=HIDDEN NAME="password" VALUE="%form(password)">
    <PRE>
User Name......... %form(userid)
```

78

```
Password.......... %form(password)
  )

Name.............. <INPUT TYPE=TEXT SIZE="40" NAME="fullname"
VALUE="%form(fullname)"> <B>*</B>
Street Address.... <INPUT TYPE=TEXT SIZE="40" NAME="address1"
VALUE="%form(address1)"> <B>*</B>
                   <INPUT TYPE=TEXT SIZE="40" NAME="address2"
VALUE="%form(address2)">
City.............. <INPUT TYPE=TEXT SIZE="40" NAME="city" VALUE="%form(city)">
<B>*</B>
State............. <INPUT TYPE=TEXT SIZE="4" MAXLENGTH="2" NAME="state"
VALUE="%form(state)"> <B>*</B>
ZIP/Postal Code... <INPUT TYPE=TEXT SIZE="15" MAXLENGTH="12" NAME="zip"
VALUE="%form(zip)"> <B>*</B>
E-Mail Address.... <INPUT TYPE=TEXT SIZE="40" NAME="email" VALUE="%form(email)">
<B>*</B>
[will be used to send verification of sign-up]

<B>* These fields are required for Sign-up.
Your mailing address is for our records only.
This information will NOT be sold to any mailing lists.</B>
</PRE>

<P>
<CENTER><INPUT TYPE=SUBMIT VALUE="Submit Information"> <INPUT TYPE=RESET
VALUE="Clear ALL Fields"></CENTER>
</FORM>
)
%define(check_user,
  %if(%not(%equal(%form(userid), %null%)),
    %set(sqlstmt, "SELECT UserID FROM Profile WHERE UserID = '%form(userid)'")
    %set(async-sql, T)   %gset(recs, 0)
    %try(
      %sql(IO Members, %sqlstmt%,
        %gset(recs, %iadd(%recs%, 1))
      ,,
        %if(%equal(%num-rows(), 0),
          %gset(found, "NO")
        ,
          %gset(found, "YES")
        )
      )
    ,
      <FONT COLOR=FF0000>ERROR Connecting to Members Database<BR>
      Type: %exception-type% | %exception-msg%</FONT>
      Please contact <A
HREF="mailto:webmaster@insideodds.com">webmaster@insideodds.com</A>
      immediately with this problem.<BR> Be sure to include the error message
above.<P>
    )
  )
)
%define(submit_user,
  %gset(Time, %localtime(hh:mm:ss))
  %gset(Date, %localtime(yy/mm/dd))
  %set(trans, "SIGNUP")
```

```
  %csv-appendq(D:/cbuilder/data/odds/signup.txt, %Date%, %Time%, %form(userid),
%form(password), %form(fullname), %form(address1), %form(address2), %form(city),
%form(state), %form(zip), %form(email), %trans%)
  %gset(sqlstmt1, "INSERT INTO Signup VALUES \('%Date%', '%Time%',
'%form(userid)', '%form(password)', '%form(fullname)', '%form(address1)',
'%form(address2)', '%form(city)', '%form(state)', '%form(zip)', '%form(email)',
'%trans%', ''\)")
  %set(async-sql, T)
  %try(
    %sql(IO Members, %sqlstmt1%,
    )
  ,
    <FONT COLOR=FF0000>ERROR Adding to Members Database<BR>
    Type: %exception-type% | %exception-msg%</FONT><BR>
    %sqlstmt1%<BR>
    Please contact <A
HREF="mailto:webmaster@insideodds.com">webmaster@insideodds.com</A>
    immediately with this problem.<BR> Be sure to include the error message
above.<P>
  )
  %gset(sqlstmt2, "INSERT INTO Profile VALUES \('%form(userid)', 0, 0, 0, 0, 0,
0, 0, 0, 0, 'HOLDING', '', 0\)")
  %set(async-sql, T)
  %try(
    %sql(IO Members, %sqlstmt2%,
    )
  ,
    <FONT COLOR=FF0000>ERROR Adding to Member Profile Database<BR>
    Type: %exception-type% | %exception-msg%</FONT><BR>
    %sqlstmt2%<BR>
    Please contact <A
HREF="mailto:webmaster@insideodds.com">webmaster@insideodds.com</A>
    immediately with this problem.<BR> Be sure to include the error message
above.<P>
  )
  <H2>User Name and Password accepted.</H2>
  <H3>
  User Name: %form(userid)<BR>
  Password:  %form(password)
  </H3>

  Now you are ready to Sign-up for any of our Member services.
  Simply click the "Sign Up Now" button on our home page and follow the
  instructions.  Once you have paid for a service you User Name and
  Password will be activated within minutes.
  <P>

  <H2><A HREF="/index.html">Return to Home Page</A></H2>
  <H2><A HREF="index.html">Choose a Sign-up Option</A></H2>
  %sql-flushconnection(IO Members)
)
%define(validate,
  %check_user()
  %if(%equal(%found%, "NO"),
    %if(%or(%equal(%form(fullname), %null%), %equal(%form(address1), %null%),
%equal(%form(city), %null%), %equal(%form(state), %null%), %equal(%form(zip),
%null%), %equal(%form(email), %null%)),
```

80

```
      %if(%equal(%form(fullname), %null%), <FONT COLOR=#FF0000><B>Name is a
Required field!</B></FONT><BR>)
      %if(%equal(%form(address1), %null%), <FONT COLOR=#FF0000><B>Street Address
is a Required field!</B></FONT><BR>)
      %if(%equal(%form(city), %null%), <FONT COLOR=#FF0000><B>City is a Required
field!</B></FONT><BR>)
      %if(%equal(%form(state), %null%), <FONT COLOR=#FF0000><B>State is a
Required field!</B></FONT><BR>)
      %if(%equal(%form(zip), %null%), <FONT COLOR=#FF0000><B>ZIP/Postal Code is
a Required field!</B></FONT><BR>)
      %if(%equal(%form(email), %null%), <FONT COLOR=#FF0000><B>E-Mail Address is
a Required field!</B></FONT><BR>)
      %update_display()
    ,
      %submit_user()
    )
   ,
    %if(%equal(%form(userid), %null%),
      <FONT COLOR=#FF0000><B>You did not select a User Name!</B></FONT><BR>
    ,
      <FONT COLOR=#FF0000><B>The User Name <FONT COLOR=#000000
SIZE=+1>%form(userid)</FONT> is already in use by a another
member!</B></FONT><BR>
      <FONT COLOR=#FF0000><B>Please choose a different User Name and
Password.</B></FONT><BR>
    )
    %if(%equal(%form(password), %null%),  <FONT COLOR=#FF0000><B>You did not
select a Password!</B></FONT><BR>)
    %update_display()
  )
)
%case(
  %equal(%form(process), %null%),      %showform(),
  %equal(%form(process), "CHECK"),     %validate()
  %equal(%form(process), "VALIDATE"),     %validate()
)

<BR><BR>
<CENTER>
<A HREF="/index.html"><IMG SRC="/home.gif" BORDER="0" WIDTH="83"
HEIGHT="45"></A><BR>
| <A HREF="/index.html">Home Page</A> | <A HREF="/signup/">Sign-up</A> |
</CENTER>

<HR>
<P>
<FONT SIZE="2">
Please note this web site and the information contained herein is for
entertainment purposes only. Inside Odds is not responsible for any
associated errors or omissions. Any questions or comments? Drop us a line at
<A HREF="mailto:webmaster\@insideodds.com">webmaster\@insideodds.com</A>
</FONT>
</P>

</BODY>
</HTML>
```

81

PPPPPP single.hmx

```
<HTML>
<HEAD>
<BASE HREF="http://www.insideodds.com/signup/">
<!-- BASE HREF="http://localhost/signup/" -->
<META NAME="keywords" CONTENT="Sports, Football, NCAA, NFL, Basketball, NBA,
Odds, Spreads, Line, Picks, Scores, Statistics, Win, Loss">
<TITLE>Inside Odds - Individual Sign-up</TITLE>
</HEAD>

<BODY BACKGROUND="back.gif" TEXT=#000000 BGCOLOR=#FFFFFF LINK=#0000FF
VLINK=#0000FF ALINK=#FF0000>

<!-- Inside Odds Home Page Revision 3 -->
<!-- Author: Bret Strachan -->
<!-- Web Design: Andrew Ventura/Bret Strachan -->
<!-- Programming: Dave Anderson -->

%null(%enumform('%name%=%value%<BR>%crlf%))

%define(showform,
<H2><IMG SRC="/fball.gif"> Individual Sign-up <IMG SRC="/fball.gif"><HR></H2>

  <FORM METHOD=POST ACTION="single.hmx">
  <INPUT TYPE=HIDDEN NAME="system" VALUE="IO">
  <INPUT TYPE=HIDDEN NAME="process" VALUE="CHECK">

  <PRE>
User Name... <INPUT TYPE=TEXT SIZE="30" MAXLENGTH="25" NAME="userid">
Password.... <INPUT TYPE=TEXT SIZE="15" MAXLENGTH="10" NAME="password">

<B>Membership Options:</B>
  <INPUT TYPE=RADIO NAME=\"option\" VALUE="PP">ONLY PICK POOLS '97 <FONT
COLOR=#008000><B>[$25.00]</B></FONT>
  <INPUT TYPE=RADIO NAME=\"option\" VALUE="GD">ONLY GAME DAY '97 <FONT
COLOR=#008000><B>[$20.00]</B></FONT>
  <INPUT TYPE=RADIO NAME=\"option\" VALUE="BOTH" CHECKED>BOTH PICK POOLS '97 &
GAME DAY '97 <FONT COLOR=#008000><B>[$45.00]</B></FONT>

  <B>Note:</B> If you have already signed-up for one service and
  would like to add another <B>DO NOT</B> select the <B>BOTH</B> option.

  </PRE>
  <CENTER><INPUT TYPE=SUBMIT VALUE="Submit Information"> <INPUT TYPE=RESET
VALUE="Clear ALL Fields"></CENTER>
  </FORM>
)
%define(notfound,
  <H2><FONT COLOR=#FF0000>USER RECORD NOT FOUND!</FONT></H2>
  Either your User Name does not exist or the Password you entered is
incorrect.<BR>
  <UL>
  <LI><A HREF="single.hmx?NEW">Re-enter your User Name and Password</A><P>
  <B>OR</B><P>
  <LI><A HREF="request.hmx">Goto Request a User Name and Password Form</A>
  </UL>
```

82

```
  <P>
  %sql-flushconnection(IO Members)
)
%define(verify,
  %case(
    %equal(%form(option), "BOTH"),
      %set(showopt, "BOTH PICK POOLS '97 & GAME DAY '97")  %set(price, "45"),
    %equal(%form(option), "GD"),
      %set(showopt, "ONLY GAME DAY '97")  %set(price, "20"),
    %equal(%form(option), "PP"),
      %set(showopt, "ONLY PICK POOLS '97")  %set(price, "25")
   )
  <CENTER>
  <H3>Your Credit Card will be billed <FONT COLOR=#008000>$%price%.00</FONT> by
Inside Odds<BR>
  for access to <FONT COLOR=#FF0000>%showopt%</FONT>.</H3>
  </CENTER>
  <HR>

  <FORM METHOD=POST ACTION="single.hmx">
  <INPUT TYPE=HIDDEN NAME="system" VALUE="IO">
  <INPUT TYPE=HIDDEN NAME="process" VALUE="VALIDATE">
  <INPUT TYPE=HIDDEN NAME="userid" VALUE=\"%uid%\">
  <INPUT TYPE=HIDDEN NAME="password" VALUE=\"%pass%\">
  <INPUT TYPE=HIDDEN NAME="option" VALUE=\"%form(option)\">
  <INPUT TYPE=HIDDEN NAME="price" VALUE=\"%price%\">

<PRE>
User Name......... %uid%

<B>Please verify the following information:</B>

Name.............. <INPUT TYPE=TEXT SIZE="40" NAME="fullname" VALUE="%name%">
<B>*</B>
Street Address 1.. <INPUT TYPE=TEXT SIZE="40" NAME="address1" VALUE="%add1%">
<B>*</B>
Street Address 2.. <INPUT TYPE=TEXT SIZE="40" NAME="address2" VALUE="%add2%">
City.............. <INPUT TYPE=TEXT SIZE="40" NAME="city" VALUE="%city%">
<B>*</B>
State............. <INPUT TYPE=TEXT SIZE="4" MAXLENGTH="2" NAME="state"
VALUE="%state%"> <B>*</B>
ZIP/Postal Code... <INPUT TYPE=TEXT SIZE="15" MAXLENGTH="12" NAME="zip"
VALUE="%zip%"> <B>*</B>
E-Mail Address.... <INPUT TYPE=TEXT SIZE="40" NAME="email" VALUE="%email%">
<B>*</B>

<B>* These fields required for Credit Card Validation</B>

<IMG SRC="master.gif" BORDER=0> <IMG SRC="visa.gif" BORDER=0>
Credit Card Number <INPUT TYPE=TEXT SIZE="5" MAXLENGTH="4" NAME="cardnum1">
<INPUT TYPE=TEXT SIZE="5" MAXLENGTH="4" NAME="cardnum2"> <INPUT TYPE=TEXT
SIZE="5" MAXLENGTH="4" NAME="cardnum3"> <INPUT TYPE=TEXT SIZE="5" MAXLENGTH="4"
NAME="cardnum4"> <B>[XXXX XXXX XXXX XXXX]</B>
Expiration Date... <INPUT TYPE=TEXT SIZE="15" NAME="expdate" VALUE="%expdate%">
<B>[MM/YY]</B>

</PRE>
```

```
<CENTER>
<H3>Please be patient. Credit Card Validation may take up to a minute.</H3>
<INPUT TYPE=SUBMIT VALUE="Complete Sign-up"> <INPUT TYPE=RESET VALUE="Reset ALL
Fields">
</CENTER>
</FORM>
)
%define(checkuser,
  %set(sqlstmt, "SELECT * FROM Signup WHERE UserID = '%form(userid)' AND
Password = '%form(password)'")
  %set(async-sql, T)  %gset(recs, 0)
  %gset(uid, %null%)  %gset(pass, %null%)
  %gset(name, %null%)  %gset(expdate, %null%)
  %gset(add1, %null%)  %gset(add2, %null%)  %gset(city, %null%)
  %gset(state, %null%)  %gset(zip, %null%)  %gset(email, %null%)
  %try(
    %sql(IO Members, %sqlstmt%,
      %gset(uid, %column(UserID))    %gset(pass, %column(Password))
      %gset(name, %column(Name))
      %gset(add1, %column(Address1))  %gset(add2, %column(Address2))
      %gset(city, %column(City))  %gset(state, %column(State))
      %gset(zip, %column(Zip))  %gset(email, %column(EMail))
    ,,
      %if(%equal(%num-rows(), 0),
        %notfound()
      ,
        %verify()
      )
    )
  ,
    <FONT COLOR=FF0000>ERROR Connecting to Members Database<BR>
    Type: %exception-type% | %exception-msg%</FONT>
    Please contact <A
HREF="mailto:webmaster@insideodds.com">webmaster@insideodds.com</A>
    immediately with this problem.<BR> Be sure to include the error message
above.<P>
  )
)

%define(setmodified,
  '%regopenkey(HKEY_LOCAL_MACHINE\\Software\\InternetFactory\\CBuilder,
    '%regsetdwordvalue("LastMod",%time%)
  )
)
%define(gocardin,
  %gset(input, %enumform('%name%=%url-encode(%value%)&))
  %gset(order, %null%)
  %try(
    %exec(perl d:\\cbuilder\\htdocs\\odds\\signup\\cardin.cgi %input%)
  ,
    <FONT COLOR=FF0000>ERROR executing Credit Card Validation<BR>
    Type: %exception-type% | %exception-msg%</FONT>
  )
  %if(%equal(%order%, %null%),
    %gset(date, %localtime(yymmdd))
    %gset(time, %localtime(hhmmss))
```

```
    %gset(order, IO-%date%-%time%)
  )
  %csv-appendq(D:/cbuilder/data/odds/payment.txt, %order%, %form(userid),
%form(option))
  %if(%equal(%return%, "TRUE"),
    %set(sqlstmt, UPDATE Signup SET Transaction = '%order%'\, Service =
'%form(option)' WHERE UserID = '%form(userid)')
    %set(async-sql, T)
    %try(
      %sql(IO Members, %sqlstmt%,
      )
    ,
      <FONT COLOR=FF0000>ERROR Updating Members Database<BR>
      Type: %exception-type% | %exception-msg%</FONT>
      Please contact <A
HREF="mailto:webmaster@insideodds.com">webmaster@insideodds.com</A>
      immediately with this problem.<BR> Be sure to include the error message
above.<P>
    )
    %case(
      %equal(%form(option), "BOTH"),    %set(options, "GameDay = 1, ProFootDB =
1, ColgFootDB = 1\, ProHoopDB = 1, ColgHoopDB = 1, ProFootPick = 1, ColgFootPick
= 1"),
      %equal(%form(option), "GD"),    %set(options, "GameDay = 1, ProFootDB = 1,
ColgFootDB = 1\, ProHoopDB = 1, ColgHoopDB = 1"),
      %equal(%form(option), "PP"),    %set(options, "ProFootPick = 1,
ColgFootPick = 1")
    )
    %set(sqlstmt, UPDATE Profile SET %options% WHERE UserID = '%form(userid)')
    %try(
      %sql(IO Members, %sqlstmt%,
      )
    ,
      <FONT COLOR=FF0000>ERROR Updating Member Profile Database<BR>
      Type: %exception-type% | %exception-msg%</FONT>
      Please contact <A
HREF="mailto:webmaster@insideodds.com">webmaster@insideodds.com</A>
      immediately with this problem.<BR> Be sure to include the error message
above.<P>
    )
    %try(
      %set(CBPath,HKEY_LOCAL_MACHINE\\SOFTWARE\\InternetFactory\\CBuilder)
      %set(RegPath, 80:205.130.249.193)
      %set(UserKey,%cbpath%\\HTTP\\Servers\\%RegPath%\\Users)
      %regcreatekey(%UserKey%, %regsetstringvalue(%form(userid),
%form(password)))
      %set(UserKey,%cbpath%\\HTTP\\Servers\\%RegPath%\\Groups\\iomembers)
      %regcreatekey(%UserKey%, %regsetstringvalue(%form(userid), %null%))
    ,
      <FONT COLOR=FF0000>ERROR Adding Member to Access file<BR>
      Type: %exception-type% | %exception-msg%</FONT>
      Please contact <A
HREF="mailto:webmaster@insideodds.com">webmaster@insideodds.com</A>
      immediately with this problem.<BR> Be sure to include the error message
above.<P>
    )
    %setmodified()
```

85

```
    <H2>Order Number %order% Accepted.</H2>
    Your User Name has been added to the Member Access file.
    If you are unable to access the <B><I>Members Only</I></B> area
    please E-mail us at <A
HREF="mailto:membership\@insideodds.com?Subject=Individual Access">Inside Odds
Membership</A>.
    Be sure to include your User Name\, Password\, and Order Number in the
message.

    <H3>
    User Name: %form(userid)<BR>
    Password:  %form(password)
    </H3>
   ,
    %text-append(D:/cbuilder/data/odds/payment.log, %input%%cr%)
    <H2>An error has occurred during Credit Card Validation</H2>
    <H3>The transaction for Order Number %order% was recorded</H3>
    Please E-mail us at <A
HREF="mailto:membership\@insideodds.com?Subject=Individual Sign-up">Inside Odds
Membership</A>.
    Be sure to include your User Name\, Password\, and Order Number in the
message.
  )
  %sql-flushconnection(IO Members)
)
%define(validate,
  %gset(errors, "NO")
  %if(%equal(%form(fullname), %null%),
    <FONT COLOR=#FF0000><B>Name is a Required field!</B></FONT><BR>
    %gset(errors, "YES")
  )
  %if(%equal(%form(address1), %null%),
    <FONT COLOR=#FF0000><B>Street Address is a Required field!</B></FONT><BR>
    %gset(errors, "YES")
  )
  %if(%equal(%form(city), %null%),
    <FONT COLOR=#FF0000><B>City is a Required field!</B></FONT><BR>
    %gset(errors, "YES")
  )
  %if(%equal(%form(state), %null%),
    <FONT COLOR=#FF0000><B>State is a Required field!</B></FONT><BR>
    %gset(errors, "YES")
  )
  %if(%equal(%form(zip), %null%),
    <FONT COLOR=#FF0000><B>ZIP/Postal Code is a Required field!</B></FONT><BR>
    %gset(errors, "YES")
  )
  %if(%equal(%form(email), %null%),
    <FONT COLOR=#FF0000><B>E-Mail Address is a Required field!</B></FONT><BR>
    %gset(errors, "YES")
  )
  %gset(CardNo, %verify-
card(%form(cardnum1)%form(cardnum2)%form(cardnum3)%form(cardnum4)))
  %if(%or(%equal(%CardNo%, %null%), %equal(%CardNo%, "unknown")),
    <FONT COLOR=#FF0000><B>Invalid credit card number!</B></FONT><BR>
    %gset(errors, "YES")
```

```
  )
  %if(%equal(%form(expdate), %null%),
    <FONT COLOR=#FF0000><B>Expiration Date is a Required field!</B></FONT><BR>
    %gset(errors, "YES")
  )

  %if(%equal(%errors%, "YES"),
    <HR>
    %gset(uid, %form(userid))   %gset(pass, %form(password))
    %gset(name, %form(fullname))
    %gset(addl, %form(address1))  %gset(add2, %form(address2))
    %gset(city, %form(city))  %gset(state, %form(state))
    %gset(zip, %form(zip))  %gset(email, %form(email))
    %gset(expdate, %form(expdate))
    %verify()
  ,
    %gocardin()
  )
)
%case(
  %equal(%form(process), %null%),       %showform(),
  %equal(%form(process), "CHECK"),      %checkuser(),
  %equal(%form(process), "VALIDATE"),   %validate()
)

<BR><BR>
<CENTER>
<A HREF="/index.html"><IMG SRC="/home.gif" BORDER="0" WIDTH="83"
HEIGHT="45"></A><BR>
| <A HREF="/index.html">Home Page</A> | <A HREF="/signup/">Sign-up</A> |
</CENTER>

<HR>
<P>
<FONT SIZE="2">
Please note this web site and the information contained herein is for
entertainment purposes only. Inside Odds is not responsible for any
associated errors or omissions. Any questions or comments? Drop us a line at
<A HREF="mailto:webmaster\@insideodds.com">webmaster\@insideodds.com</A>
</FONT>
</P>

</BODY>
</HTML>


PPPPPP  show.hmx

%define(show,
  %gset(iffile, D:/CBuilder/htdocs/odds/members/%form(file))
  %gset(found, %exists(%iffile%))
  %if(%not(%equal(%found%, %null%)),
    %expand(%include(%iffile%))
  ,
<HTML>
<HEAD>
<BASE HREF="http://www.insideodds.com/members/">
```

87

```
<!-- BASE HREF="http://localhost/" -->
<META NAME="keywords" CONTENT="Sports\, Football\, NCAA\, NFL\, Basketball\,
NBA\, Odds\, Spreads\, Line\, Picks\, Scores\, Statistics\, Win\, Loss">
<TITLE>Inside Odds - Pick Pool '97</TITLE>
</HEAD>

<BODY BACKGROUND="back.gif" TEXT=#000000 BGCOLOR=#FFFFFF LINK=#0000FF
VLINK=#0000FF ALINK=#FF0000>

<!-- Inside Odds Home Page Revision 3 -->
<!-- Author: Bret Strachan -->
<!-- Web Design: Andrew Ventura/Bret Strachan -->
<!-- Programming: Dave Anderson -->

<H2>The file you requested has not yet been generated.</H2>
<H3>If you believe you have received this message in error please<BR>
contact system administration at <A
HREF="mailto:webmaster\@insideodds.com">webmaster\@insideodds.com</A></H3>
<HR>

<H3>
<A HREF="profoot-demo-picks.html">View a sample Pick Pool Posting</A><BR>
<A HREF="profoot-demo-results.html">View a sample Pick Pool Results Posting</A>
</H3>

<P>
<HR>

<H3>NFL Weekend Posting Schedule</H3>
<BLOCKQUOTE>
Saturday games @ 1:00 pm EST<BR>
Sunday early games @ 1:30 pm EST<BR>
Sunday late game @ 8:30 pm EST<BR>
Monday Night game @ 9:30 pm EST
</BLOCKQUOTE>

<H3>NCAA Saturday Posting Schedule</H3>
<BLOCKQUOTE>
Games between 11:30 am - 4:00 pm EST @ 4:30 pm EST<BR>
Games between 4:00 pm - 1:30 am EST @ 9:30 pm EST
</BLOCKQUOTE>
<P>

<H3>Pick Pool Results Posting</H3>
<BLOCKQUOTE>
The results of each weeks picks will be compiled after Monday Nights
NFL game and then posted on Tuesday. Each results posting will remain
on the site until it is replaced with the next posting.
</BLOCKQUOTE>
<P>

<BR><BR>
<CENTER>
<A HREF="/index.html"><IMG SRC="/home.gif" BORDER="0" WIDTH="83"
HEIGHT="45"></A><BR>
| <A HREF="/index.html">Home Page</A> | <A HREF="index.html">Members Only</A> |
</CENTER>
```

```
<HR>
<P>
<FONT SIZE="2">
Please note this web site and the information contained herein is for
entertainment purposes only. Inside Odds is not responsible for any
associated errors or omissions. Any questions or comments? Drop us a line at
<A HREF="mailto:webmaster@insideodds.com">webmaster@insideodds.com</A>
</FONT>
</P>

</BODY>
</HTML>
  )
)

%gset(inc, D:/CBuilder/htdocs/odds/members/pickpool.inc)
%expand(%include(%inc%))
```

timing.inc

```
%gset(proweek, "'97 POST SEASON")
%gset(proresult, "'97 POST SEASON")
%gset(colgweek, "'97 SEASON")
%gset(colgresult, "'97 SEASON")

%define(setDT,
  %gset(Month, %localtime(mmm))  %gset(Day, %localtime(d))
  %gset(Time, %localtime(h:mm))
  %gset(Hour, %gettoken(%Time%, ":", 0))  %gset(Minute, %gettoken(%Time%, ":",
1))
  %gset(AmPm, %localtime(AA))
  %gset(showtime, %Hour%:%Minute% %AmPm%)
  %if(%and(%equal(%AmPm%, "PM"), %lt(%Hour%,12)), %gset(Hour, %iadd(%Hour%,
12)))
  %if(%and(%equal(%AmPm%, "AM"), %equal(%Hour%,12)), %gset(Hour, 0))
)
%define(checkone,
  %gset(show, "NO")
  %gset(GMonth, %gettoken(%column(Date), " ", 0))
  %gset(GDay, %gettoken(%column(Date), " ", 1))
  %gset(GHour, %gettoken(%column(Time), ":", 0))
  %gset(GMinute, %gettoken(%column(Time), ":", 1))
%null(Today: %Month% %Day% | %Hour%:%Minute% %AmPm%<BR>
%column(GameID) GameDay: %GMonth% %GDay% | %GHour%:%GMinute% %GAmPm%<BR>)
  %if(%equal(%Month%, %GMonth%),
    %null(MONTH EQUAL:)
    %if(%equal(%Day%, %GDay%),
      %null(DAY EQUAL:)
      %if(%lt(%Hour%, %GHour%),
        %gset(show, "YES")  %null(HOUR OK<P>)
      ,
        %if(%equal(%Hour%, %GHour%),
          %null(HOUR EQUAL :)
          %if(%lte(%Minute%, %GMinute%),
            %gset(show, "YES")  %null(PASS - MINUTES OK<P>)
          ,
            %gset(show, "NO")  %null(FAIL - MINUTES<P>)
          )
        )
      )
    ,
      %null(DAY NOT EQUAL:)
      %if(%lt(%Day%, %GDay%),
        %gset(show, "YES")  %null(PASS - DATE<P>)
      ,
        %gset(show, "NO")  %null(FAIL - DATE<P>)
      )
    )
  ,
    %if(%gte(%Day%, %GDay%),
      %gset(show, "YES")  %null(PASS - DATE<P>)
    ,
      %gset(show, "NO")  %null(FAIL - DATE<P>)
    )
```

```
  )
  %if(%not(%equal(%showall%, "TRUE")),
    %if(%equal(%column(Spread), 200.0), %gset(show, "NO"))
  )
)
%define(checktwo,
  %gset(show1, %null%)  %gset(show2, %null%)
  %gset(GMonth1, %gettoken(%rdate%, " ", 0))
  %gset(GDay1, %gettoken(%rdate%, " ", 1))
  %gset(GHour1, %gettoken(%rtime%, ":", 0))
  %gset(GMinute1, %gettoken(%rtime%, ":", 1))

  %gset(GMonth2, %gettoken(%sdate%, " ", 0))
  %gset(GDay2, %gettoken(%sdate%, " ", 1))
  %gset(GHour2, %gettoken(%stime%, ":", 0))
  %gset(GAmPm2, %gettoken(%stime%, " ", 1))
  %gset(GMinute2, %gettoken(%stime%, ":", 1))

%null(Today: %Month% %Day% | %Hour%:%Minute% %AmPm%<BR>
  %column(GameID) GameDay: %GMonth1% %GDay1% | %GHour1%:%GMinute1% %GAmPm1%<BR>)
  %if(%equal(%Month%, %GMonth1%),
    %if(%equal(%Day%, %GDay1%),
      %null(DAY EQUAL:)
      %if(%lt(%Hour%, %GHour1%),
        %gset(show1, "YES")  %null(HOUR OK<P>)
      ,
        %if(%equal(%Hour%, %GHour1%),
          %null(HOUR EQUAL :)
          %if(%lte(%Minute%, %GMinute1%),
            %gset(show1, "YES")  %null(PASS - MINUTES OK<P>)
          ,
            %gset(show1, "NO")  %null(FAIL - MINUTES<P>)
          )
        )
      )
    ,
      %if(%lt(%Day%, %GDay1%),
        %gset(show1, "YES")  %null(PASS - DATE<P>)
      ,
        %gset(show1, "NO")  %null(FAIL - DATE<P>)
      )
    )
  ,
    %if(%gte(%Day%, %GDay1%),
      %gset(show1, "YES")  %null(PASS - DATE<P>)
    ,
      %gset(show1, "NO")  %null(FAIL - DATE<P>)
    )
  )

%null(Today: %Month% %Day% | %Hour%:%Minute% %AmPm%<BR>
  %column(GameID) GameDay: %GMonth2% %GDay2% | %GHour2%:%GMinute2% %GAmPm2%<BR>)
  %if(%equal(%Month%, %GMonth2%),
    %if(%equal(%Day%, %GDay2%),
      %null(DAY EQUAL:)
      %if(%lt(%Hour%, %GHour2%),
        %gset(show2, "YES")  %null(HOUR OK<P>)
```

```
            ,
              %if(%equal(%Hour%, %GHour2%),
                %null(HOUR EQUAL :)
                %if(%lte(%Minute%, %GMinute2%),
                  %gset(show2, "YES")  %null(PASS - MINUTES OK<P>)
                ,
                  %gset(show2, "NO")  %null(FAIL - MINUTES<P>)
                )
              )
            )
          ,
            %if(%lt(%Day%, %GDay2%),
              %gset(show2, "YES")  %null(PASS - DATE<P>)
            ,
              %gset(show2, "NO")  %null(FAIL - DATE<P>)
            )
          )
        ,
          %if(%gte(%Day%, %GDay2%),
            %gset(show, "YES")  %null(PASS - DATE<P>)
          ,
            %gset(show, "NO")  %null(FAIL - DATE<P>)
          )
        )
      )
```

I claim:

1. A method of setting up pools and wagering points on sporting events so that at least one pool includes a plurality of different users that compete against one another with the user having the most points at the end of a predetermined period of time winning the pool, the method comprising:

providing at least one server;

providing an asynchronous packet switched digital data network, the digital data network being in communication with the server;

utilizing a plurality of computers which are in communication with the packet switched digital data network;

associating each of the plurality of computers with a user;

a user accessing the server via the asynchronous packet switched digital data network, via the user's computer;

the server assigning the user to a given pool so that the pool includes a plurality of users designated as being associated therewith, the users in the given pool to compete against other users in the pool with the user having the most points at the end of the predetermined period of time being considered the winner of the pool;

the server causing a pick screen to be displayed to the user on a display of the user's computer;

the pick screen enabling the user to browse through a plurality of different sporting events and review odds and over/under lines on the different sporting events;

the user utilizing the pick screen in picking a sporting event and wagering a number of points on the picked sporting event by way of at least one of a straight pick, a tease pick, a parlay pick and a reverse pick, so that for each pick the user determines and inputs the number of points that the user desires to wager on the pick via the pick screen, and the number of points to be wagered by the user for each pick being variable based upon the user's desire so that a different number of points can be wagered for different picks made by a user;

the user submitting the pick made in said picking step to the server;

the server causing the results of the pick to be displayed to the user via the packet switched digital data network at a point in time after the sporting event of said picking step has been completed;

the server causing results of picks made by other users in the pool to be displayed to the user via the packet switched digital data network at a point in time after the sporting event of said picking step has been completed; and the server causing the winner of the pool to be displayed after the predetermined period of time, the winner of the pool being the user of the pool who has the highest point total at the end of the predetermined period of time.

2. The method of step 1, wherein the recited steps are performed in the order in which they are recited.

3. The method of claim 1, further comprising the step of the server invalidating or not accepting picks from a given user that represent duplicates of another pick already made by the given user.

4. The method of claim 1, further comprising the step of the server invalidating or not accepting picks from a given user after the given user has made a predetermined number of picks within a predetermined time period.

5. A system for setting up pools and wagering points on sporting events so that one pool includes a plurality of different users that compete against one another with the user having the most points at the end of a predetermined period of time winning the pool, the system comprising:

at least one server;

an asynchronous packet switched digital data network, the digital data network being in communication with the server;

a plurality of computers which are in communication with the packet switched digital data network;

each of the plurality of computers associated with a user;

means for enabling a user access the server via the asynchronous packet switched digital data network, via the user's computer;

the server including means for assigning the user to a given pool so that the pool includes a plurality of users designated as being associated therewith, the users in the given pool to compete against one another in the pool with the user having the most points at the end of the predetermined period of time being considered the winner of the pool;

the server further including means for causing a pick screen to be displayed to the user on a display of the user's computer;

the pick screen enabling the user to browse through a plurality of different sporting events and review odds and over/under lines on the different sporting events;

means for enabling the user to utilize the pick screen in picking a sporting event and wagering a number of points on the picked sporting event by way of at least one of a tease pick, a parlay pick and a reverse pick, so that for each pick the user determines and inputs the number of points that the user desires to wager on the pick via the pick screen, and the number of points to be wagered by the user for each pick being variable based upon the user's desire so that a different number of points can be wagered for different picks made by a user;

means for enabling the user to submit the pick made in said picking step to the server;

the server including means for causing the results of the pick to be displayed to the user via the packet switched digital data network at a point in time after the sporting event of said picking step has been completed;

the server further including means for causing results of picks made by other users in the pool to be displayed to the user via the packet switched digital data network at a point in time after the sporting event of said picking step has been completed; and means for causing the winner of the pool to be displayed after the predetermined period of time, the winner of the pool being the user of the pool who has the highest point total at the end of the predetermined period of time.

6. A method of setting up pools and wagering points on sporting events so that at least one pool includes a plurality of different users that compete against one another with the user having the most points at the end of a predetermined period of time winning the pool, the method comprising:

a computer assigning a user to a pool so that the pool includes a plurality of users designated as being associated therewith, the users in the pool to compete against one another in the pool with the user having the most points at the end of the predetermined period of time being considered the winner of the pool;

the user utilizing a pick screen to browse through a plurality of different sporting events and review odds and over/under lines on the different sporting events;

the user utilizing the pick screen in picking a sporting event and wagering a number of points on the picked sporting event by way of at least one of a straight pick, a tease pick, a parlay pick and a reverse pick, so that for each pick the user determines and inputs the number of points that the user desires to wager on the pick, and the number of points to be wagered by the user for each pick being variable based upon the user's desire so that a different number of points can be wagered for different picks made by a user;

each of a plurality of users in the pool making at least one pick wagering points during the predetermined period of time; and displaying the winner of the pool after the predetermined period of time has ended, the winner of the pool being the user of the pool who has the highest point total at the end of the predetermined period of time.

7. The method of claim 6, wherein each pick made by a user results in the user gaining a number of points, losing a number of points, or keeping the same number of points, as a function of the outcome of the sporting event on which the pick is based.

8. The method of claim 1, wherein each pick made by a user results in the user gaining a number of points, losing a number of points, or keeping the same number of points, as a function of the outcome of the sporting event on which the pick is based.

* * * * *